(12) United States Patent
Nishijima

(10) Patent No.: US 12,079,089 B2
(45) Date of Patent: Sep. 3, 2024

(54) COMPUTER-READABLE RECORDING MEDIUM STORING RESOURCE MANAGEMENT PROGRAM, RESOURCE MANAGEMENT METHOD, AND RESOURCE MANAGEMENT DEVICE

(71) Applicant: Fujitsu Limited, Kawasaki (JP)

(72) Inventor: Takamichi Nishijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/158,484

(22) Filed: Jan. 24, 2023

(65) Prior Publication Data
US 2023/0401126 A1    Dec. 14, 2023

(30) Foreign Application Priority Data
Jun. 10, 2022  (JP) ................................ 2022-094488

(51) Int. Cl.
*G06F 11/14* (2006.01)
(52) U.S. Cl.
CPC ...... *G06F 11/1456* (2013.01); *G06F 11/1451* (2013.01); *G06F 11/1464* (2013.01)
(58) Field of Classification Search
CPC ............. G06F 11/1451; G06F 11/1456; G06F 11/1464; G06F 11/3433; G06F 11/3442
See application file for complete search history.

(56) References Cited

U.S. PATENT DOCUMENTS 6,934,724 B1 * 8/2005 Deshayes ............ G06F 11/1464
709/248
2018/0232253 A1    8/2018 Michimura et al.
2021/0117219 A1    4/2021 Iwasa et al.

FOREIGN PATENT DOCUMENTS

JP    2018-129003 A    8/2018
JP    2019-144717 A    8/2019

\* cited by examiner

*Primary Examiner* — Yong J Choe
(74) *Attorney, Agent, or Firm* — Fujitsu Intellectual Property Center

(57) ABSTRACT

A non-transitory computer-readable recording medium stores a resource management program for causing a computer to execute a process including: classifying backup processing devices for backup based on information representing a feature of each of a plurality of processing devices related to provision of one or more services such that, among the backup processing devices for backup that correspond to each of the plurality of processing devices, backup processing devices used at a same timing are not in a same group; and allocating resources to classified backup processing devices in a group in an overlapping manner such that resources are shared between the backup processing devices in a group.

10 Claims, 44 Drawing Sheets

FIG. 13

| SERVICE ID | FIRST STAGE | SECOND STAGE |
|---|---|---|
| A | A1a | A2a, A2b |
| B | B1a | B2a |

1300

(14-1)

| TYPE | ON | OFF |
|---|---|---|
| CPU |  | 1-16 |
| GPU |  | 1-10 |

(14-2)

| TYPE | ON | OFF |
|---|---|---|
| CPU | 1-7 | 8-16 |
| GPU | 1-4 | 5-10 |

(14-3)

| TYPE | ON | OFF |
|---|---|---|
| CPU | 1-10 | 11-16 |
| GPU | 1-6 | 7-10 |

FIG. 15A (15-1)

| CONTAINER ID | CPU NUMBER | GPU NUMBER | STATE |
|---|---|---|---|
| A1a | 1,2 | - | IN OPERATION |
| A2a | 3 | 1 | IN OPERATION |
| A2b | 4 | 2 | IN OPERATION |
| B1a | 5,6 | 3 | IN OPERATION |
| B2a | 7 | 4 | IN OPERATION |
| | | | |
| | | | |
| | | | |
| | | | |

1500

(15-2)

| CONTAINER | CPU NUMBER | GPU NUMBER | STATE |
|---|---|---|---|
| A1a | 1,2 | - | IN OPERATION |
| A2a | 3 | 1 | IN OPERATION |
| A2b | 4 | 2 | IN OPERATION |
| B1a | 5,6 | 3 | IN OPERATION |
| B2a | 7 | 4 | IN OPERATION |
| A1b | | | |
| A2c | | | |
| B1b | | | |
| B2b | | | |

| CONTAINER | CPU NUMBER | GPU NUMBER | STATE |
|---|---|---|---|
| A1a | 1,2 | - | IN OPERATION |
| A2a | 3 | 1 | IN OPERATION |
| A2b | 4 | 2 | IN OPERATION |
| B1a | 5,6 | 3 | IN OPERATION |
| B2a | 7 | 4 | IN OPERATION |
| A1b | 8,9 | - | BACKUP |
| A2c | 10 | 6 | BACKUP |
| B1b | 8,9 | 5 | BACKUP |
| B2b | 10 | 6 | BACKUP |

(15-3)

| CONTAINER | CPU NUMBER | GPU NUMBER | STATE |
|---|---|---|---|
| A1a | 1,2 | - | IN OPERATION |
| A2a | 3 | 1 | IN OPERATION |
| A2b | 4 | 2 | IN OPERATION |
| B1a | 5,6 | 3 | IN OPERATION |
| B2a | 7 | 4 | IN OPERATION |
| A1b | 8,9 | - | |
| A2c | 10 | 6 | |
| B1b | 8,9 | 5 | |
| B2b | 10 | 6 | |

| CONTAINER | CPU NUMBER | GPU NUMBER | STATE |
|---|---|---|---|
| A1a | 1,2 | - | IN OPERATION |
| A2a | 3 | 1 | IN OPERATION |
| A2b | 4 | 2 | IN OPERATION |
| B1a | 5,6 | 3 | IN OPERATION |
| B2a | 7 | 4 | IN OPERATION |
| A1b | 8,9 | - | IN OPERATION |
| A2c | 10 | 6 | BACKUP |
| B1b | - | - | DELETED |
| B2b | 10 | 6 | BACKUP |

| SERVICE NAME | FIRST STAGE | SECOND STAGE | CURRENT LOAD |
|---|---|---|---|
| A | A1a | A2a, A2b | 40Mbps |
| B | B1a | B2a | 50Mbps |

FIG. 30

| SERVICE NAME | FIRST STAGE | SECOND STAGE | DEMAND TENDENCY |
|---|---|---|---|
| A | A1a | A2a, A2b | NIGHTTIME TYPE |
| B | B1a | B2a | DAYTIME TYPE |
| C | C1a | C2a | NIGHTTIME TYPE |

FIG. 31

| APP | PERFORMANCE | CPU | GPU |
|---|---|---|---|
| A1 | 80Mbps | 2 | 0 |
| A2 | 30Mbps | 1 | 1 |
| B1 | 100Mbps | 2 | 1 |
| B2 | 50Mbps | 1 | 1 |
| C1 | 100Mbps | 1 | 0 |
| C2 | 50Mbps | 1 | 1 |

| TYPE | UPPER LIMIT |
|------|-------------|
| CPU  | 4           |
| GPU  | 3           |

| CONTAINER ID | CPU NUMBER | GPU NUMBER | STATE |
|---|---|---|---|
| A1a | 1,2 | - | IN OPERATION |
| A2a | 3 | 1 | IN OPERATION |
| A2b | 4 | 2 | IN OPERATION |
| B1a | 5,6 | 3 | IN OPERATION |
| B2a | 7 | 4 | IN OPERATION |
| C1a | 8 | - | IN OPERATION |
| C2a | 9 | 5 | IN OPERATION |
| A1b | | | |
| A2c | | | |
| B1b | | | |
| B2b | | | |
| C1b | | | |
| C2b | | | |

(37-2)

| CONTAINER ID | CPU NUMBER | GPU NUMBER | STATE |
|---|---|---|---|
| A1a | 1,2 | - | IN OPERATION |
| A2a | 3 | 1 | IN OPERATION |
| A2b | 4 | 2 | IN OPERATION |
| B1a | 5,6 | 3 | IN OPERATION |
| B2a | 7 | 4 | IN OPERATION |
| C1a | 8 | - | IN OPERATION |
| C2a | 9 | 5 | IN OPERATION |
| A1b | 10,11 | - | |
| A2c | 12 | 7 | |
| B1b | 10,11 | 6 | |
| B2b | 12 | 7 | |
| C1b | 10 | - | |
| C2b | 13 | 8 | |

(37-3)

| CONTAINER ID | CPU NUMBER | GPU NUMBER | STATE |
|---|---|---|---|
| A1a | 1,2 | - | IN OPERATION |
| A2a | 3 | 1 | IN OPERATION |
| A2b | 4 | 2 | IN OPERATION |
| B1a | 5,6 | 3 | IN OPERATION |
| B2a | 7 | 4 | IN OPERATION |
| C1a | 8 | - | IN OPERATION |
| C2a | 9 | 5 | IN OPERATION |
| A1b | 10,11 | - | BACKUP |
| A2c | 12 | 7 | BACKUP |
| B1b | 10,11 | 6 | BACKUP |
| B2b | 12 | 7 | BACKUP |
| C1b | 10 | - | BACKUP |
| C2b | 13 | 8 | BACKUP |

COMPUTER-READABLE RECORDING MEDIUM STORING RESOURCE MANAGEMENT PROGRAM, RESOURCE MANAGEMENT METHOD, AND RESOURCE MANAGEMENT DEVICE

CROSS-REFERENCE TO RELATED APPLICATION

This application is based upon and claims the benefit of priority of the prior Japanese Patent Application No. 2022-94488, filed on Jun. 10, 2022, the entire contents of which are incorporated herein by reference.

FIELD

The embodiment discussed herein is related to a computer-readable recording medium storing a resource management program, a resource management method, and a resource management device.

BACKGROUND

In related art, there is a disaggregated system in which various information and communication technology (ICT) resources are pooled across servers, and the resources are dynamically allocated and used according to an application. For example, in this system, when the performance of an application does not satisfy a condition, processing performance is secured by increasing resources.

Japanese Laid-open Patent Publication No. 2019-144717 and Japanese Laid-open Patent Publication No. 2018-129003 are disclosed as related art.

SUMMARY

According to an aspect of the embodiments, a non-transitory computer-readable recording medium stores a resource management program for causing a computer to execute a process including: classifying backup processing devices for backup based on information representing a feature of each of a plurality of processing devices related to provision of one or more services such that, among the backup processing devices for backup that correspond to each of the plurality of processing devices, backup processing devices used at a same timing are not in a same group; and allocating resources to classified backup processing devices in a group in an overlapping manner such that resources are shared between the backup processing devices in a group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is an explanatory diagram illustrating a specific example of service configuration information;

FIG. 15A is an explanatory diagram illustrating an example of changes in the contents stored in container management information (part 1);

FIG. 15B is an explanatory diagram illustrating an example of changes in the contents stored in container management information (part 2);

FIG. 25 is an explanatory diagram illustrating a specific example of service configuration information;

FIG. 30 is an explanatory diagram illustrating a specific example of service configuration information;

FIG. 31 is an explanatory diagram illustrating a specific example of app performance and resource information (part 2);

FIG. 36 is an explanatory diagram illustrating a specific example of resource upper limit information;

FIG. 37 is an explanatory diagram illustrating an example of changes in the contents stored in container management information;

DESCRIPTION OF EMBODIMENTS

As related art, there is a technique in which, in a state where a system is in operation, an occupied physical central processing unit (CPU) core is allocated to a virtual CPU core of an active virtual machine, and a shared physical CPU core is allocated to a virtual CPU core of a standby virtual machine. There is a technique in which the state of a virtual machine (VM) is shifted in advance to a standby state between a stopped state and an activated state, and when a processing request is received from a user, the state of a processing unit is shifted from the standby state to the activated state by using setting information specific to the user and information on the state of the processing unit in the standby state.

However, in related art, there is a problem that, when a container for backup or the like that executes an application is prepared in advance in order to shorten the time taken to increase resources, power consumption increases due to the standby power of an ICT resource allocated to the container for backup or the like.

In one aspect, an object of the present disclosure is to reduce power consumption related to a backup processing device.

Hereinafter, an embodiment of a resource management program, a resource management method, and a resource management device according to the present disclosure will be described in detail with reference to the drawings.

EMBODIMENT

Figure 1:
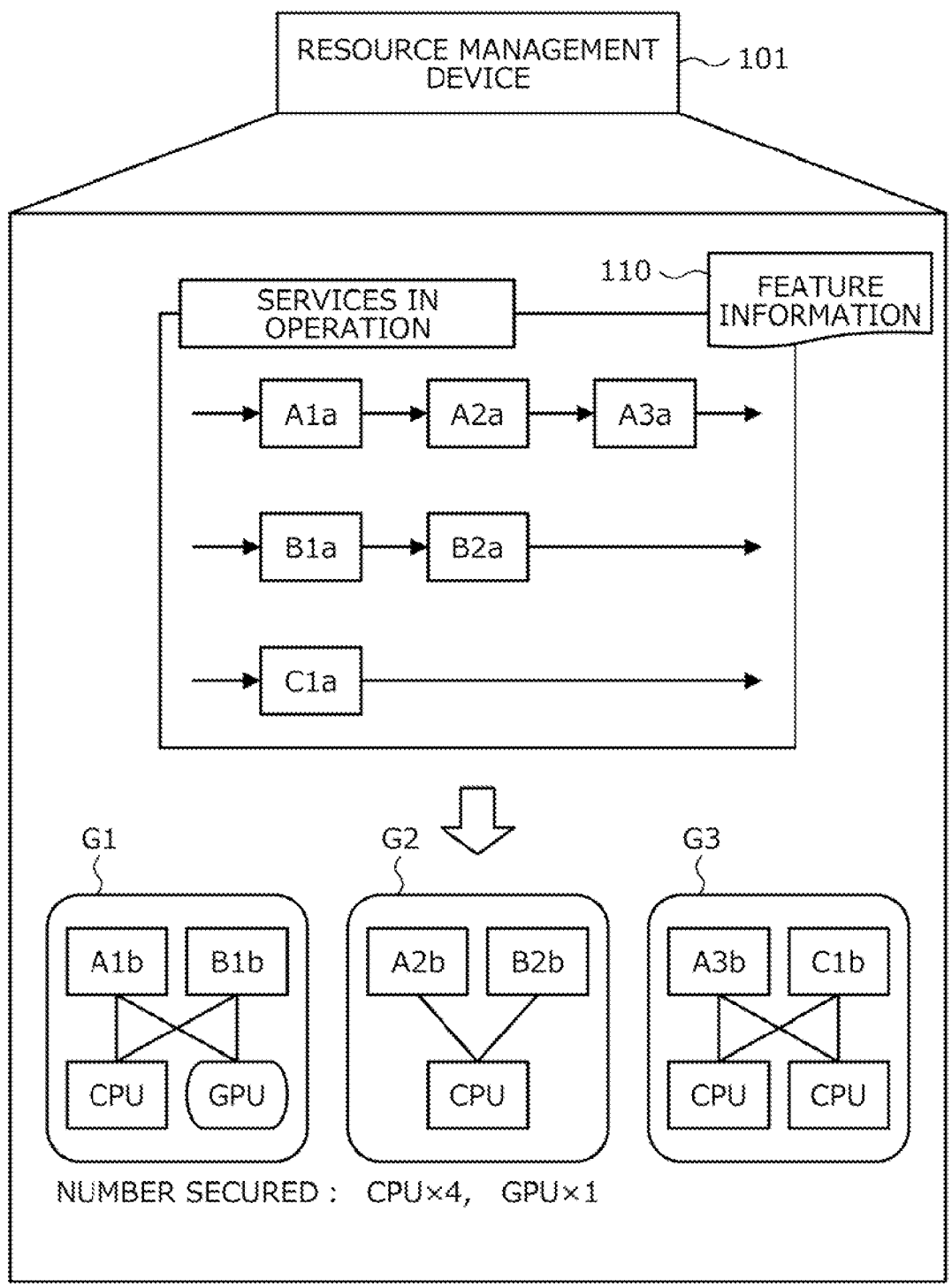
FIG. 1 is an explanatory diagram illustrating an exemplary embodiment of a resource management method according to an embodiment.

FIG. 1 is an explanatory diagram illustrating an exemplary embodiment of a resource management method according to the embodiment. In FIG. 1, a resource management device 101 is a computer that manages resources to be allocated to backup processing devices for backup corresponding to each of a plurality of processing devices related to provision of one or more services. A service is provided by one or a plurality of applications.

A processing device executes an application for providing a service. For example, a processing device is a container or a virtual machine. A container corresponds to a user space isolated from other spaces and created by internally dividing a kernel of an operating system (OS), and operates as one of processes of the OS.

A virtual machine is a virtual computer that operates in an execution environment constructed by dividing hardware resources of a physical computer. A processing device may be a physical server. For example, a backup processing device for backup is a processing device that is added to a service when increasing resources in response to performance insufficiency.

For example, a resource is an ICT resource such as a CPU, a memory, a storage, and an accelerator. For example, an accelerator is a graphics processing unit (GPU), a field-programmable gate array (FPGA), a smart network interface card (NIC), or the like.

For example, in a disaggregated system, when the performance of a service does not satisfy a condition, processing performance is secured by increasing resources. For example, when the traffic or load related to a service exceeds a threshold value, a new container or VM is added to the service.

On the other hand, in a case where a new container or the like is generated every time when resources are increased, the work of adding the container or the like takes time. For example, when adding a container to a disaggregated system, power-on of an ICT resource and setting of coupling to the container (for example, association of the container with the ICT resource) are performed, and the work of adding the container takes time.

For this reason, in order to shorten the time taken to increase resources, a method is conceivable in which a backup container or the like for executing an application for providing a service is prepared in advance. For example, it is conceivable that, at the time of deployment of containers for service provision, an ICT resource for a backup container is secured in advance in accordance with the service, and power-on and coupling setting are performed, and at the timing when a container has to be added, a backup container prepared in advance is added to the service.

However, this method has a problem in that standby power is generated for the ICT resource allocated to the backup container or the like and power consumption related to the backup container or the like increases. For example, in a case where one ICT resource is allocated to each of ten backup containers, ten ICT resources are caused to stand by. There is a low possibility that all the backup containers are used at the same time, and it is not efficient that all the ICT resources are powered on and caused to stand by.

Accordingly, in the present embodiment, a resource management method will be described in which the number of resources to be powered on and prepared in advance is reduced and power consumption related to a backup container or the like is reduced. An example of processing of the resource management device 101 will be described.

In the example of FIG. 1, services in operation are "services A, B, and C". Processing devices related to provision of service A are "processing devices A1a, A2a, and A3a". Processing devices related to provision of service B are "processing devices B1a and B2a". A processing device related to provision of service C is "processing device C1a".

Resources used in processing device A1a are "CPU: 1, GPU: 1". "CPU: 1" indicates one CPU. "GPU: 1" indicates one GPU. A resource used in processing device A2a is "CPU: 1". Resources used in processing device A3a are "CPU: 2". Resources used in the processing device B1a are "CPU: 1, GPU: 1". A resource used in the processing device B2a is "CPU: 1". Resources used in the processing device C1a are "CPU: 2".

A case is assumed in which, as the backup processing devices for backup corresponding to processing devices A1a, A2a, A3a, B1a, B2a, and C1a related to provision of services A, B, and C, "backup processing devices A1b, A2b, A3b, B1b, B2b, and C1b" are respectively generated.

In this case, the resource management device 101 classifies backup processing devices for backup A1b to C1b based on feature information 110 such that, among backup processing devices for backup A1b to C1b, the backup processing devices used at the same timing are not in the same group.

The feature information 110 is information representing the feature of each of processing devices A1a to C1a related to provision of services A, B, and C. For example, the feature information 110 represents the provision of a service among services A, B, and C to which each of processing devices A1a to C1a relates.

When popularity of a certain service is concentrated, there is a high possibility that resource increase has to be performed for all containers (processing devices) related to provision of the service. For this reason, for example, the resource management device 101 may classify backup processing devices for backup A1b to C1b based on the feature information 110 such that, among backup processing devices for backup A1b to C1b, the backup processing devices corresponding to the processing devices related to provision of the same service are not in the same group.

In the example of FIG. 1, processing devices A1a, A2a, and A3a are processing devices related to provision of service A. Backup processing devices corresponding to processing devices A1a, A2a, and A3a related to provision of service A are backup processing devices A1b, A2b, and A3b. The processing devices B1a and B2a are processing devices related to provision of service B. Backup processing devices corresponding to the processing devices B1a and B2a related to provision of service B are the backup processing devices B1b and B2b. The processing device C1a is a processing device related to provision of service C. A backup processing device corresponding to the processing device C1a related to provision of service C is the backup processing device C1b.

For this reason, the resource management device 101 classifies backup processing devices for backup A1b to C1b based on the feature information 110 such that backup processing devices A1b, A2b, and A3b corresponding to processing devices A1a, A2a, and A3a related to provision of service A are not in the same group. The resource management device 101 classifies backup processing devices for backup A1b to C1b based on the feature information 110 such that backup processing devices B1b and B2b corresponding to processing devices B1a and B2a related to provision of service B are not in the same group.

A case is assumed in which, among backup processing devices for backup A1b to C1b, backup processing devices A1b and B1b are classified into group G1, backup processing devices A2b and B2b are classified into group G2, and backup processing devices A3b and C1b are classified into group G3.

Next, the resource management device 101 allocates resources to the backup processing devices in groups G1 to G3 in an overlapping manner such that the resources are shared between the classified backup processing devices in groups G1 to G3. For example, the same amount of resources as that used in each of processing devices A1a to C1a is allocated to each of backup processing devices A1b to C1b.

For example, the same amount of resources as that of processing device A1a, "CPU: 1, GPU: 1", is allocated to backup processing device A1b. The same amount of resources as that of the processing device B1a, "CPU: 1, GPU: 1", is allocated to the backup processing device B1b. In this case, resources are allocated to backup processing devices A1b and B1b in group G1 such that the same resource is shared between backup processing devices A1b and B1b. In group G1, one CPU is shared between backup processing devices A1b and B1b. In group G1, one GPU is shared between backup processing devices A1b and B1b.

The same amount of resources as that of processing device A2a, "CPU: 1", is allocated to backup processing device A2b. The same amount of resources as that of the processing device B2a, "CPU: 1", is allocated to the backup processing device B2b. In this case, resources are allocated to backup processing devices A2b and B2b in group G2 such that the same resource is shared between backup processing devices A2b and B2b. In group G2, one CPU is shared between backup processing devices A2b and B2b.

The same amount of resources as that of processing device A3a, "CPU: 2", is allocated to backup processing device A3b. The same amount of resources as that of the processing device C1a, "CPU: 2", is allocated to the backup processing device C1b. In this case, resources are allocated to backup processing devices A3b and C1b in group G3 such that the same resource is shared between backup processing devices A3b and C1b. In group G3, two CPUs are shared between backup processing devices A3b and C1b.

As described above, with the resource management device 101, backup processing devices may be grouped such that backup processing devices with a high possibility of being used at the same timing use different resources (ICT resources). For example, the resource management device 101 may bring together backup processing devices with a low possibility of being used at the same timing, in the same group in which the same resource is shared. Accordingly, the resource management device 101 enables rapid resource increase in a case where the current configuration may not satisfy the performance, and may reduce power consumption by reducing the number of resources to be powered on and prepared in advance.

In the example of FIG. 1, the resource management device 101 may reduce the number of secured resources to four CPUs and one GPU. On the other hand, in a case where resources are not shared between backup processing devices and resources are secured for each backup processing device, there have to be eight CPUs and two GPUs. For this reason, the resource management device 101 may reduce power consumption corresponding to four CPUs and power consumption corresponding to one GPU, as compared with the case where resources are secured for each backup processing device. There is a low possibility that backup processing devices classified into the same group have to be used at the same timing, and resource contention is less likely to occur between containers to be added. For this reason, the resource management device 101 may perform rapid resource increase in a case where the current configuration may not satisfy the performance.

(Example of System Configuration of Information Processing System 200)

Next, description will be given for an example of a system configuration of an information processing system 200 including the resource management device 101 illustrated in FIG. 1. A case where the resource management device 101 illustrated in FIG. 1 is applied to a management server 201 in the information processing system 200 will be described as an example. For example, the information processing system 200 is applied to a disaggregated system.

In the following description, description will be given with a "container" as an example of a processing device related to provision of a service. Description will be given with a "backup container" as an example of a backup processing device for backup.

Figure 2:
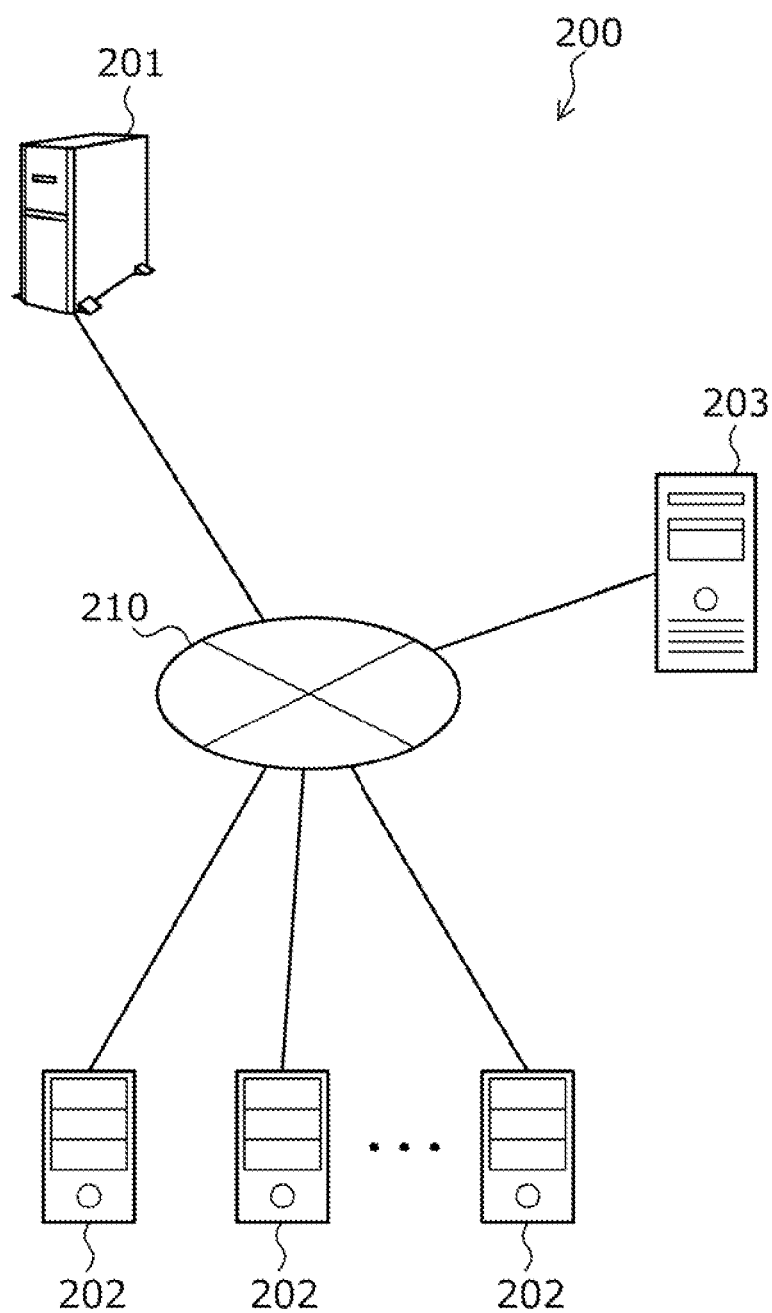
FIG. 2 is an explanatory diagram illustrating an example of a system configuration of an information processing system.

FIG. 2 is an explanatory diagram illustrating an example of a system configuration of the information processing system 200. In FIG. 2, the information processing system 200 includes the management server 201, a plurality of operation servers 202, and a container management device 203. In the information processing system 200, the management server 201, the operation servers 202, and the container management device 203 are coupled via a wired or wireless network 210. For example, the network 210 is the Internet, a local area network (LAN), a wide area network (WAN), or the like.

The management server 201 is a computer that manages resources to be allocated to backup containers corresponding to each of a plurality of containers related to provision of one or more services. For example, containers and backup containers are executed by the operation servers 202. For example, resources to be allocated to containers and backup containers are provided by the operation servers 202.

The operation servers 202 are computers capable of executing containers (including backup containers). The operation servers 202 may be capable of executing virtual machines (including backup virtual machines). The operation servers 202 may be computers that provide resources (ICT resources) to be allocated to containers via the network 210.

The container management device 203 is a computer that manages containers (including backup containers). For example, the container management device 203 deploys containers and backup containers on the operation servers 202 in accordance with the control of the management server 201.

Although the management server 201 and the container management device 203 are separately provided, the present disclosure is not limited to this case. For example, the container management device 203 may be realized by the management server 201. The container management device 203 may be realized by any operation server 202 of the plurality of operation servers 202.

(Example of Hardware Configuration of Management Server 201)

Next, an example of a hardware configuration of the management server 201 will be described.

Figure 3:
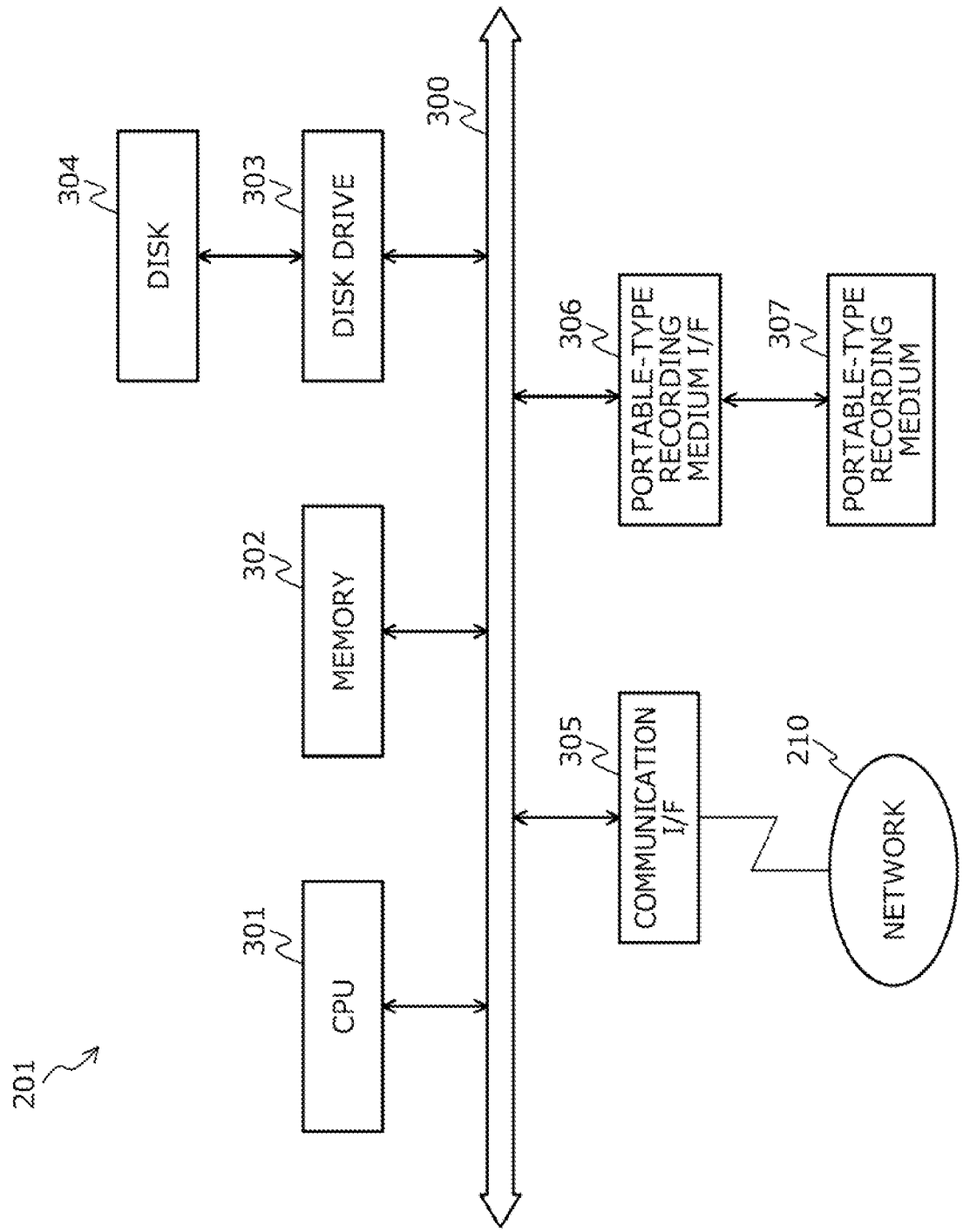
FIG. 3 is a block diagram illustrating an example of a hardware configuration of a management server.

FIG. 3 is a block diagram illustrating an example of a hardware configuration of the management server 201. In FIG. 3, the management server 201 includes a CPU 301, a memory 302, a disk drive 303, a disk 304, a communication interface (I/F) 305, a portable-type recording medium I/F 306, and a portable-type recording medium 307. These components are coupled to each other through a bus 300.

The CPU 301 controls the entire management server 201. The CPU 301 may include a plurality of cores. For example, the memory 302 includes a read-only memory (ROM), a random-access memory (RAM), a flash ROM, and the like. For example, the flash ROM stores a program of an OS, the ROM stores an application program, and the RAM is used as a work area of the CPU 301. The programs stored in the memory 302 are loaded into the CPU 301, thereby causing the CPU 301 to execute the coded processing.

The disk drive 303 controls reading and writing of data from and to the disk 304 in accordance with the control of the CPU 301. The disk 304 stores data written under the control of the disk drive 303. Examples of the disk 304 include a magnetic disk, an optical disk, and the like.

The communication I/F 305 is coupled to the network 210 through a communication line, and is coupled to external computers (for example, the operation servers 202 and the container management device 203 illustrated in FIG. 2) via the network 210. The communication I/F 305 functions as an interface between the network 210 and the inside of the device, and controls input and output of data from and to the external computers. For example, a modem, a LAN adapter, or the like may be used as the communication I/F 305.

The portable-type recording medium I/F 306 controls reading and writing of data from and to the portable-type recording medium 307 in accordance with the control of the CPU 301. The portable-type recording medium 307 stores data written under the control of the portable-type recording medium I/F 306. Examples of the portable-type recording medium 307 include a compact disc (CD)-ROM, a Digital Versatile Disk (DVD), a Universal Serial Bus (USB) memory, and the like.

In addition to the components described above, for example, the management server 201 may include an input device, a display, and the like. Of the components described above, for example, the management server 201 does not have to include the portable-type recording medium I/F 306 and the portable-type recording medium 307. The operation servers 202 and the container management device 203 illustrated in FIG. 2 may be realized by a hardware configuration similar to that of the management server 201. However, in addition to the components described above, for example, the operation servers 202 include various ICT resources (such as GPU and FPGA) that may be allocated to containers or the like.

(Example of Services)

Next, services provided in the information processing system 200 (see FIG. 2) will be described with reference to FIG. 4. Resources that may be allocated to containers (including backup containers) are referred to as "CPU, GPU". CPUs that may be allocated to containers (including backup containers) are referred to as "CPU 1 to CPU 16", and GPUs that may be allocated to containers (including backup containers) are referred to as "GPU 1 to GPU 10". "#" of CPU # is a number (identifier) for uniquely identifying the CPU. "#" of GPU # is an identifier for uniquely identifying the GPU.

Figure 4:
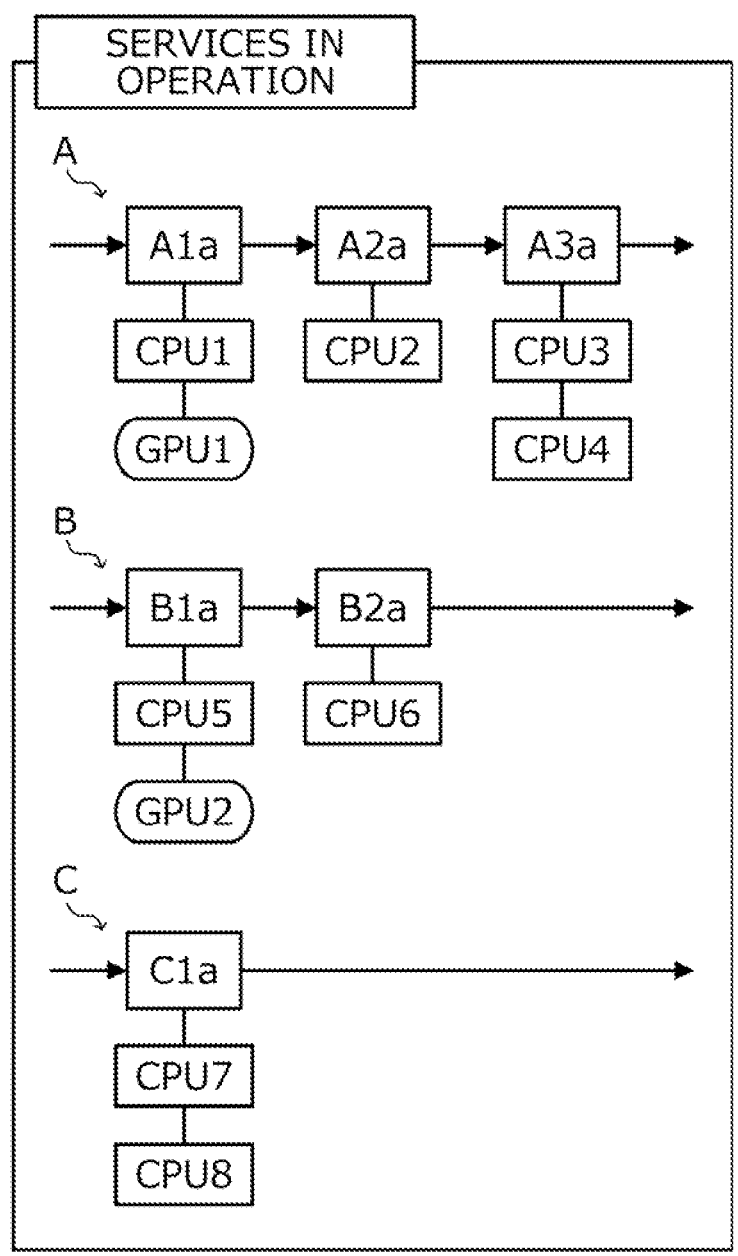
FIG. 4 is an explanatory diagram illustrating examples of services in operation.

FIG. 4 is an explanatory diagram illustrating examples of services in operation. In FIG. 4, services A, B, and C are examples of services in operation. Service A is a service of a three-stage configuration including app A1, app A2, and app A3. In FIG. 4, A1*a* indicates a container that executes app A1. A2*a* indicates a container that executes app A2. A3*a* indicates a container that executes app A3.

Containers A1*a*, A2*a*, and A3*a* are containers related to provision of service A. Resources that have to be used for the execution of app A1 are "CPU: 1, GPU: 1". CPU 1 and GPU 1 are allocated to container A1a. A resource that has to be used for the execution of app A2 is "CPU: 1". CPU 2 is allocated to container A2a. Resources that have to be used for the execution of app A3 are "CPU: 2". CPU 3 and CPU 4 are allocated to container A3a.

Service B is a service of a two-stage configuration including app B1 and app B2. In FIG. 4, B1a indicates a container that executes app B1. B2a indicates a container that executes app B2. Containers B1a and B2a are containers related to provision of service B. Resources that have to be used for the execution of app B1 are "CPU: 1, GPU: 1". CPU 5 and GPU 2 are allocated to container B1a. A resource that has to be used for the execution of app B2 is "CPU: 1". CPU 6 is allocated to container B2a.

Service C is a service of a one-stage configuration including app C1. In FIG. 4, C1a indicates a container that executes app C1. Container C1a is a container related to provision of service C. Resources that have to be used for the execution of app C1 are "CPU: 2". CPU 7 and CPU 8 are allocated to container C1a.

(Example of Functional Configuration of Management Server 201)

Next, an example of a functional configuration of the management server 201 will be described.

Figure 5:
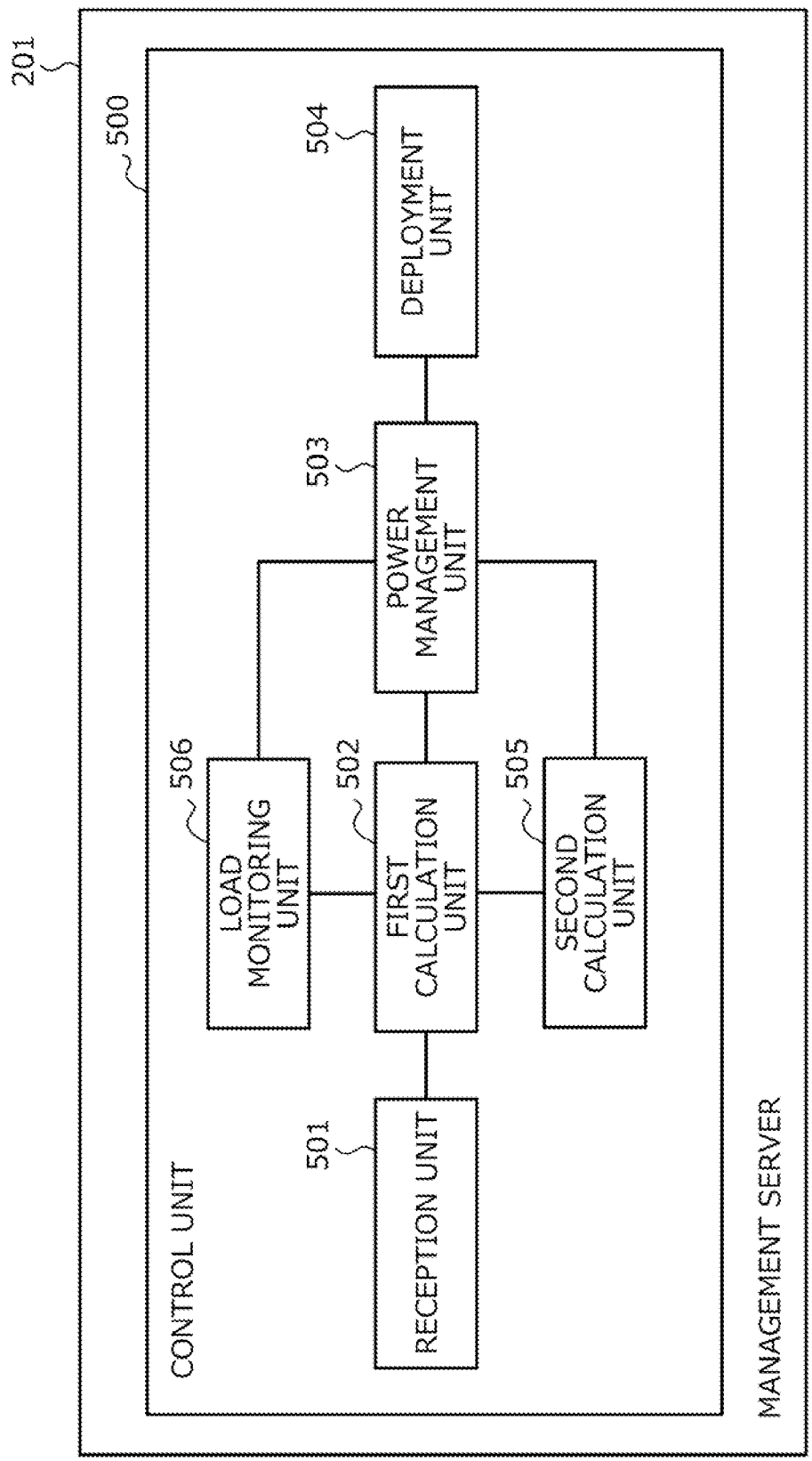
FIG. 5 is a block diagram illustrating an example of a functional configuration of the management server.

FIG. 5 is a block diagram illustrating an example of a functional configuration of the management server 201. In FIG. 5, the management server 201 includes a reception unit 501, a first calculation unit 502, a power management unit 503, a deployment unit 504, a second calculation unit 505, and a load monitoring unit 506. The reception unit 501 to the load monitoring unit 506 are functions constituting a control unit 500. For example, the functions are realized by the communication I/F 305 or by causing the CPU 301 to execute a program stored in a storage device such as the memory 302, the disk 304, or the portable-type recording medium 307 illustrated in FIG. 3. For example, processing results obtained by these functional units are stored in a storage device such as the memory 302 or the disk 304.

The reception unit 501 receives requested performance related to a service. A service is a service of a one-stage configuration or two or more-stage configuration provided by one or a plurality of apps. For example, service A illustrated in FIG. 4 is a service of a three-stage configuration provided by apps A1 to A3. Requested performance represents performance that is requested in providing a service. For example, requested performance is represented by requested performance of each app in each stage for providing a service.

For example, the reception unit 501 receives requested performance related to a service by reception from a client terminal (not illustrated). A client terminal is a computer used by a user who provides a service. The reception unit 501 may receive requested performance related to a service through user operation input using an input device (not illustrated).

The first calculation unit 502 calculates a container configuration related to provision of services. A container configuration represents containers related to provision of services. For example, a container configuration indicates containers in each stage that have to be used in providing a service. A container in each stage executes an app in each stage.

For example, the first calculation unit 502 calculates a container configuration related to provision of services based on the received requested performance related to a service and app performance and resource information. App performance and resource information indicates the performance of each app for providing a service and resources that have to be used. Resources that have to be used are the amount of resources that has to be used for the execution of an app.

For example, a service is a face recognition service that analyzes a camera video and recognizes a face. In this case, for example, an app for providing a service is an app that performs compression of data (image), an app that performs artificial intelligence (AI) analysis, an app that performs visualization, or the like.

For example, app performance and resource information may be acquired from a client terminal (not illustrated), or may be acquired through user operation input using an input device (not illustrated). A specific example of app performance and resource information will be described later with reference to FIG. 12, for example. For example, the calculated container configuration is stored in service configuration information 1300 such as that illustrated in FIG. 13 described later.

The first calculation unit 502 allocates resources to containers related to provision of services. For example, resources are ICT resources such as CPUs, memories, storages, and accelerators. For example, the first calculation unit 502 refers to resource allocation status information and allocates free resources to each container of the calculated container configuration.

Resource allocation status information is information from which an allocation status of each resource that may be allocated to a container (including a backup container) may be specified. For example, the amount of resources (resources that have to be used) to be allocated to containers is specified from app performance and resource information. For example, resources that have to be used for container A1a related to provision of service A illustrated in FIG. 4 are "CPU: 1, GPU: 1".

The contents stored in resource allocation status information will be described later with reference to FIG. 14, for example. For example, a resource allocation result of each container is stored in container management information 1500 such as that illustrated in FIG. 15A described later.

The power management unit 503 powers on the resources allocated to containers. For example, resources that may be allocated to containers (including backup containers) are powered off (power OFF) in an unallocated state in order to reduce power consumption. For example, the power management unit 503 transmits a resource power-on instruction to the operation server 202 including the resources allocated to containers.

As a result, in the operation server 202, the resources allocated to containers are powered on. For example, a power-on instruction is issued by executing a command for the operation server 202 or an application programming interface (API) of a Peripheral Component Interconnect Express (PCIe) switch.

The deployment unit 504 deploys containers related to provision of services. For example, the deployment unit 504 requests the container management device 203 illustrated in FIG. 2 to perform coupling setting of the resources allocated to each container and to deploy (activate) each container. In this case, for example, the deployment unit 504 may perform setting such as traffic distribution.

For example, the request to the container management device 203 is made by executing an API of existing container management software. As a result, the containers related to provision of services are activated. For example, when the containers are deployed, the container management information 1500 such as that illustrated in FIG. 15A described later is updated.

For example, when containers A1*a*, A2*a*, and A3*a* related to provision of service A illustrated in FIG. 4 are activated, the operation of service A is started. When containers B1*a* and B2*a* related to provision of service B are activated, the operation of service B is started. When container C1*a* related to provision of service C is activated, the operation of service C is started.

The second calculation unit 505 calculates a backup container configuration related to provision of services based on the calculated container configuration. A backup container configuration represents backup containers corresponding to containers related to provision of services. For example, a backup container configuration indicates backup containers in each stage prepared (generated) in providing a service. A backup container in each stage executes an app in each stage.

For example, the second calculation unit 505 refers to the calculated container configuration, and calculates a backup container configuration including a backup container having the same performance as that of a container that executes an app in each stage of a service. For example, the number of backup containers in each stage is one. However, the number of backup containers in each stage may be the same as the number of containers in each stage.

For example, the calculated backup container configuration is stored in the container management information 1500.

The second calculation unit 505 classifies backup containers for backup such that, among the backup containers for backup corresponding to each of a plurality of containers, the backup containers used at the same timing are not in the same group. A plurality of containers is a plurality of containers related to provision of one or more services. For example, one or more services are services A, B, and C illustrated in FIG. 4.

For example, the second calculation unit 505 classifies backup containers for backup based on feature information representing the feature of each of a plurality of containers. For example, feature information is information representing the provision of a service among one or more services to which each of a plurality of containers relates. For example, feature information may be acquired from a client terminal (not illustrated), or may be acquired through user operation input using an input device (not illustrated).

For example, it may be said that, when popularity of a certain service is concentrated, there is a high possibility that resource increase has to be performed for all containers related to provision of the service. For this reason, the second calculation unit 505 classifies, among backup containers for backup, the backup containers with a relatively high possibility of being used at the same timing into different groups in consideration of a service configuration.

Describing in more detail, for example, the second calculation unit 505 classifies backup containers for backup based on feature information such that, among the backup containers for backup, the backup containers corresponding to the containers related to provision of the same service are not in the same group (corresponding to exemplary embodiment 1 described later).

For example, feature information may be information representing a load state of each of a plurality of containers. For example, a load state of a container is represented by a data transfer rate (Mbps). For example, it may be said that there is a high possibility that resource increase has to be performed in the near future for a container with no margin in the processing performance. For this reason, the second calculation unit 505 classifies the backup containers, which may be said to have a high possibility of being used at the same timing, into different groups in consideration of a margin in the processing performance of containers.

Describing in more detail, for example, the second calculation unit 505 may classify backup containers for backup based on feature information such that, among the backup containers for backup, the backup containers corresponding to the containers whose degree of margin in processing performance is equal to or less than a threshold value are not in the same group (corresponding to exemplary embodiment 2 described later). For example, a degree of margin in processing performance is represented by a difference between the performance of an app and the current load (load state). For example, the current load is specified from a performance condition or a measurement value. The threshold value may be arbitrarily set.

The second calculation unit 505 may classify backup containers for backup based on feature information such that, among the backup containers for backup, the backup containers corresponding to the containers whose degree of margin in processing performance with respect to a performance condition is relatively low are not in the same group. For example, among a plurality of containers, a predetermined number of containers counted from the container with the lowest degree of margin are the containers whose degree of margin is relatively low. The predetermined number may be arbitrarily set.

For example, feature information may be information representing the demand tendency of a service corresponding to each of a plurality of containers. For example, it may be said that the peaks are likely to overlap each other between services with similar demand tendencies, and there is a high possibility that resource increase has to be performed at the same timing. For this reason, the second calculation unit 505 classifies the backup containers, which may be said to have a high possibility of being used at the same timing, into different groups in consideration of the demand tendencies of services.

Describing in more detail, for example, the second calculation unit 505 may classify backup containers for backup based on feature information such that, among the backup containers for backup, the backup containers corresponding to the containers related to provision of services with the same demand tendency are not in the same group (corresponding to exemplary embodiment 3 described later). For example, the demand tendency of a service may be determined from the content of the service.

For example, in a case where service A and service B are online games, both tend to have an increased load in the nighttime. In this case, for example, the second calculation unit 505 causes the backup containers for service A and the backup containers for service B to be in different groups. In a case where service C is a company system and service D is a video distribution system, service C tends to have an increased load in the daytime and service D tends to have an increased load in the nighttime. In this case, for example, the second calculation unit 505 may bring together the backup containers for service C and the backup containers for service D in the same group.

There is a case in which, from the viewpoint of power consumption and cost, it is desired to reduce the amount of resources to be allocated to backup containers for backup. In this case, the second calculation unit 505 may classify backup containers for backup based on resource upper limit information and feature information. Resource upper limit information is information representing an upper limit of the amount of resources that may be allocated to backup containers for backup. For example, resource upper limit information may be acquired from a client terminal (not illustrated), or may be acquired through user operation input using an input device (not illustrated).

For example, the second calculation unit 505 may classify backup containers for backup such that the amount of resources to be allocated to the backup containers for backup does not exceed an upper limit and that, among the backup containers for backup, the backup containers used at the same timing are not in the same group (corresponding to exemplary embodiment 4 described later).

Describing in more detail, for example, the second calculation unit 505 may classify backup containers for backup such that the amount of resources to be allocated to the backup containers for backup does not exceed an upper limit and that, among the backup containers for backup, the backup containers corresponding to the containers related to provision of the same service are not in the same group.

The second calculation unit 505 may classify backup containers for backup such that the amount of resources to be allocated to the backup containers for backup does not exceed an upper limit and that, among the backup containers for backup, the backup containers corresponding to the containers whose degree of margin in processing performance is equal to or less than a threshold value are not in the same group.

The second calculation unit 505 may classify backup containers for backup such that the amount of resources to be allocated to the backup containers for backup does not exceed an upper limit and that, among the backup containers for backup, the backup containers corresponding to the containers related to provision of services with the same demand tendency are not in the same group.

The second calculation unit 505 allocates resources to backup containers in a group in an overlapping manner such that the resources are shared between the classified backup containers in the group. For example, the amount of resources (resources that have to be used) to be allocated to backup containers is the same as that to be allocated to the containers corresponding to the backup containers.

For example, the second calculation unit 505 calculates an amount of resources that have to be used in each group from the amount of resources (resources that have to be used) to be allocated to the classified backup containers in the group. The amount of resources that have to be used in a group is an amount of resources that have to be used for allocating resources to backup containers in the group in an overlapping manner.

The second calculation unit 505 allocates resources to backup containers in a group in an overlapping manner based on the calculated amount of resources that have to be used in each group such that the resources are shared between the backup containers in the group. In this case, for example, the second calculation unit 505 refers to resource allocation status information and allocates free resources to the backup containers in the group. For example, any existing technique may be used as a method of sharing a resource between backup containers.

The power management unit 503 powers on the resources allocated to backup containers. For example, the power management unit 503 transmits a resource power-on instruction to the operation server 202 including the resources allocated to backup containers. As a result, in the operation server 202, the resources allocated to backup containers are powered on.

The deployment unit 504 deploys backup containers corresponding to containers related to provision of services. For example, the deployment unit 504 requests the container management device 203 to perform coupling setting of the resources allocated to each backup container and to deploy (activate) each backup container. In this case, for example, the deployment unit 504 may perform setting such as traffic distribution.

As a result, the backup containers corresponding to containers related to provision of services are activated. For example, when the backup containers are deployed, the container management information 1500 is updated.

The power management unit 503 may set the power of resources other than the resources that have already been allocated, among resources that may be allocated to containers (including backup containers), to a power saving mode. The power saving mode is a mode in which resources are set to a low power consumption state or a low performance state in order to reduce power consumption.

For example, the power management unit 503 transmits a power mode change instruction to the operation server 202 including resources other than the resources that have already been allocated. A power mode change instruction is an instruction to set the power modes of resources other than the resources that have already been allocated, to the power saving mode.

As a result, in the operation server 202, resources other than the resources that have already been allocated are set to the power saving mode. Accordingly, the power management unit 503 may shorten the time taken for transitioning to a normal state as compared with a case of being powered off when resources allocated to containers (including backup containers) are powered on.

The load monitoring unit 506 monitors the load of containers related to provision of a service, and determines whether to perform resource increase. For example, the load monitoring unit 506 may determine that resource increase is to be performed for a container when the traffic amount of the container exceeds a predetermined amount. The predetermined amount may be arbitrarily set.

When it is determined that resource increase is to be performed for a container related to provision of a service, the first calculation unit 502 specifies a backup container to be added to the service from backup containers for backup. The first calculation unit 502 adds the specified backup container to the service. The first calculation unit 502 updates the container configuration such that the added backup container occupies the resources shared with another backup container in the same group.

The power management unit 503 sets the power of a resource allocated only to the other backup container in the same group as the added backup container to an OFF state. For example, the power management unit 503 transmits a resource power off instruction to the operation server 202 including the resource allocated only to the other backup container. As a result, in the operation server 202, the power of the resource allocated only to the other backup container is in an OFF state.

The functional units of the management server 201 described above (the reception unit 501 to the load monitoring unit 506) may be realized by a plurality of computers in the information processing system 200 (for example, the management server 201 and the container management device 203)

(Example of Operation of Management Server 201)

Description will be given with reference to FIG. 6 for an example of the operation of the management server 201 when a backup container corresponding to a container related to provision of a service is generated. Description will be given with services A, B, and C illustrated in FIG. 4 as examples of services.

Figure 6:
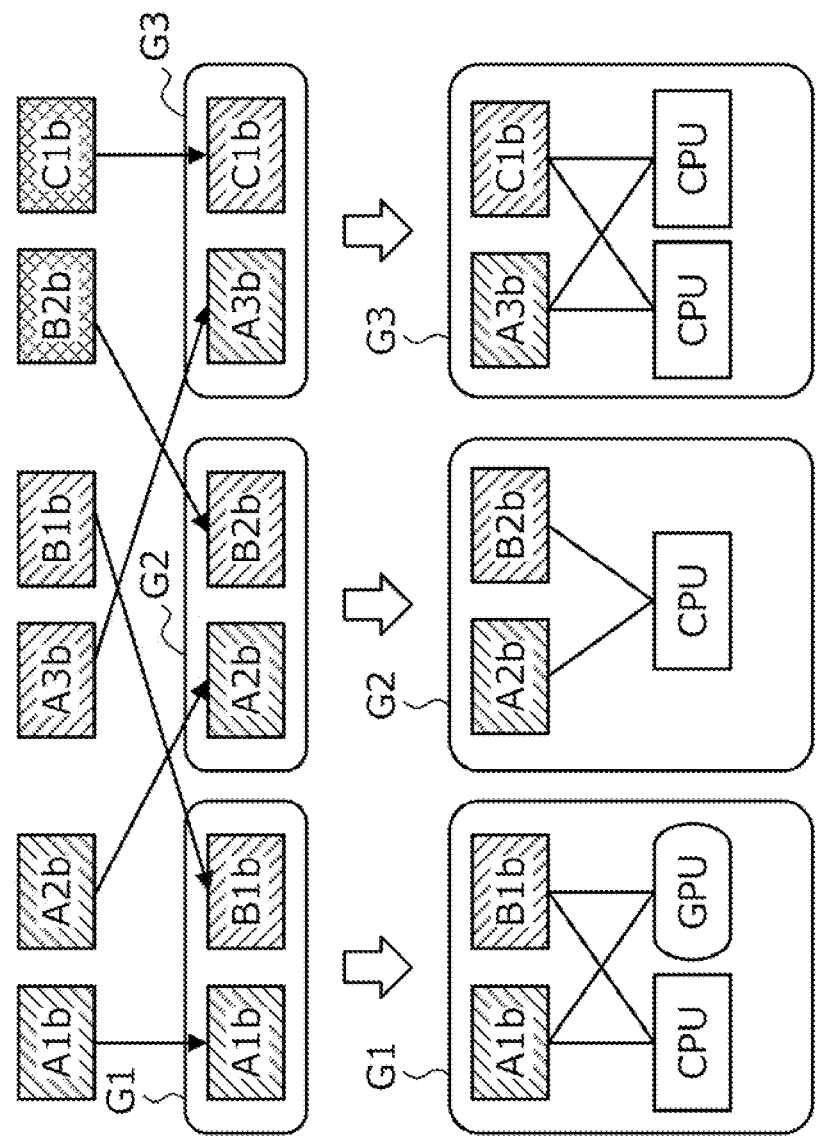
FIG. 6 is an explanatory diagram illustrating an example of the operation of the management server.

FIG. 6 is an explanatory diagram illustrating an example of the operation of the management server 201. In FIG. 6, the second calculation unit 505 calculates a backup container configuration related to provision of services A, B, and C, based on the container configuration related to provision of services A, B, and C.

The second calculation unit 505 generates backup containers A1b, A1b, A3b, B1b, B2b, and C1b corresponding to containers A1a, A2a, A3a, B1a, B2a, and C1a related to provision of services A, B, and C (see FIG. 4), respectively.

Next, the second calculation unit 505 classifies backup containers A1b to C1b such that, among backup containers A1b to C1b, the backup containers used at the same timing are not in the same group. For example, the second calculation unit 505 classifies backup containers A1b to C1b such that the backup containers for the same service are not in the same group.

Backup containers A1b and B1b are classified into group G1, backup containers A2b and B2b are classified into group G2, and backup containers A3b and C1b are classified into group G3.

Accordingly, the second calculation unit 505 may perform grouping such that the backup containers for the same service in which the timings of resource increase are likely to overlap are in different groups. For example, backup containers A1b, A2b, and A3b for service A are classified into different groups. Backup containers B1b and B2b for service B are classified into different groups.

The second calculation unit 505 allocates resources to the backup containers in groups G1 to G3 in an overlapping manner such that the resources are shared between the classified backup containers in groups G1 to G3. For example, the amount of resources (resources that have to be used) to be allocated to backup containers A1b to C1b is the same as that to be allocated to containers A1a to C1a corresponding to backup containers A1b to C1b.

For example, the second calculation unit 505 allocates one CPU and one GPU to backup containers A1b and B1b in group G1 in an overlapping manner so as to be shared between backup containers A1b and B1b in group G1. The second calculation unit 505 allocates one CPU to backup containers A2b and B2b in group G2 in an overlapping manner so as to be shared between backup containers A2b and B2b in group G2. The second calculation unit 505 allocates two CPUs to backup containers A3b and C1b in group G3 in an overlapping manner so as to be shared between backup containers A3b and C1b in group G3.

As described above, the management server 201 may group backup containers such that the backup containers with a high possibility of being used at the same timing use different ICT resources. Accordingly, the management server 201 may reduce the number of ICT resources to be powered on and prepared in advance, and reduce power consumption.

(Resource Management Processing Procedure of Management Server 201)

Next, a resource management processing procedure of the management server 201 will be described. For example, resource management processing of the management server 201 is executed when backup containers for backup corresponding to each of a plurality of containers related to provision of one or more services are generated.

Figure 7:
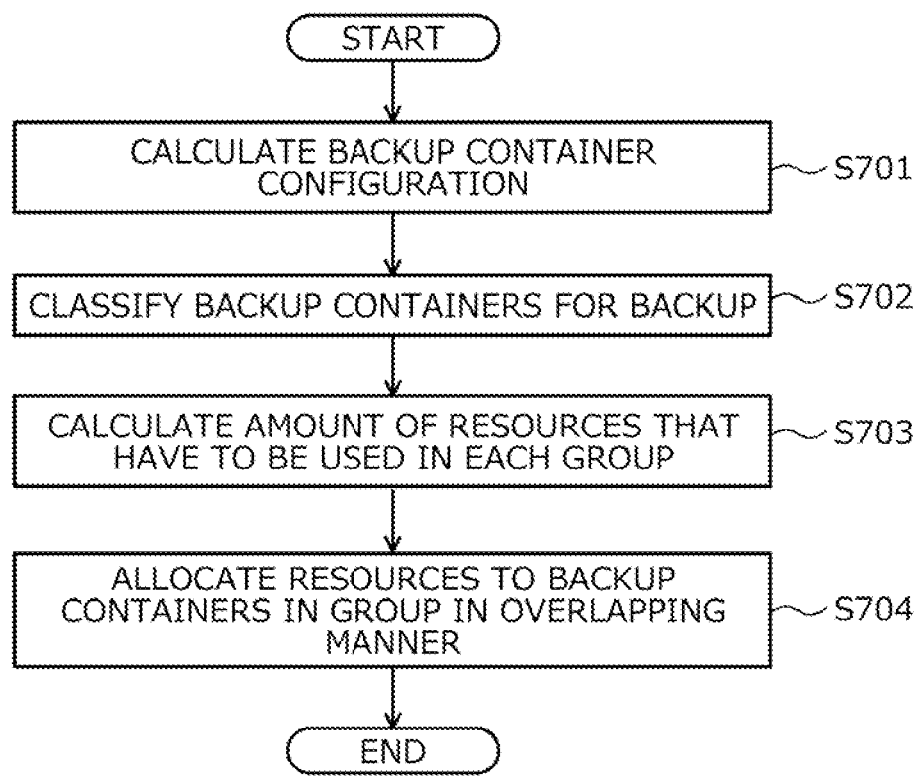
FIG. 7 is a flowchart illustrating an example of a resource management processing procedure of the management server.

FIG. 7 is a flowchart illustrating an example of the resource management processing procedure of the management server 201. In FIG. 7, the management server 201 calculates a backup container configuration related to provision of one or more services based on a container configuration related to provision of one or more services (step S701).

Next, the management server 201 classifies backup containers for backup based on the calculated backup container configuration such that, among the backup containers for backup, the backup containers used at the same timing are not in the same group (step S702). Backup containers for backup are backup containers corresponding to each of a plurality of containers related to provision of one or more services.

The management server 201 calculates an amount of resources that have to be used in each group from the amount of resources (resources that have to be used) to be allocated to the classified backup containers in the group (step S703). Next, the management server 201 allocates resources to backup containers in a group in an overlapping manner based on the calculated amount of resources that have to be used in each group such that the resources are shared between the backup containers in the group (step S704). The management server 201 ends the processing of this flowchart.

Accordingly, the management server 201 may group backup containers such that the backup containers with a high possibility of being used at the same timing use different resources.

(Examples of Comparison of Speed of Adding Container, Number of Secured ICT Resources, and Power Consumption)

Next, examples of comparison of the speed of adding a container, the number of secured ICT resources, and power consumption between different methods will be described with reference to FIGS. 8 to 10. Other method 1 is a method in which a container and an ICT resource are activated, coupled, and added when resource increase has to be performed. Other 2 is a method in which a backup container corresponding to each container and an ICT resource are prepared in advance, and a container is added when resource increase has to be performed. Present method corresponds to the present resource management method.

Figure 8:
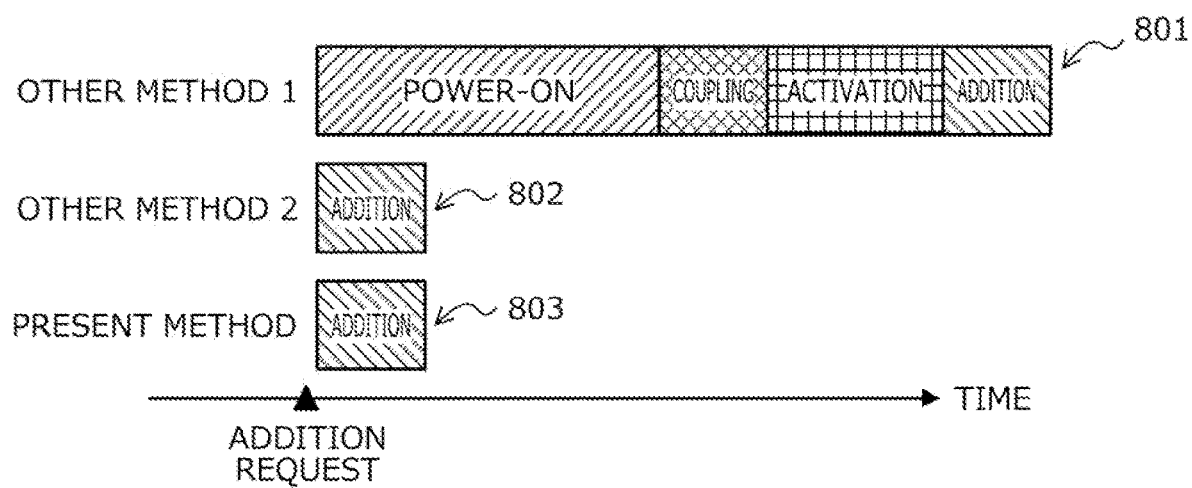
FIG. 8 is an explanatory diagram illustrating an example of comparison of the speed of adding a container.

FIG. 8 is an explanatory diagram illustrating an example of comparison of the speed of adding a container. In FIG. 8, graphs 801 to 803 represent the length of time in each method taken for adding a container related to provision of a service in response to a resource increase request. In FIG. 8, "power-on" indicates the time taken to power on an ICT resource. "Coupling" indicates the time taken to perform coupling setting of an ICT resource. "Activation" indicates the time taken to activate a container. "Addition" indicates the time taken to add a container.

According to graphs 801 to 803, it may be seen that, in the present method, the time taken for adding a container is shortened as compared with other method 1.

Figure 9:
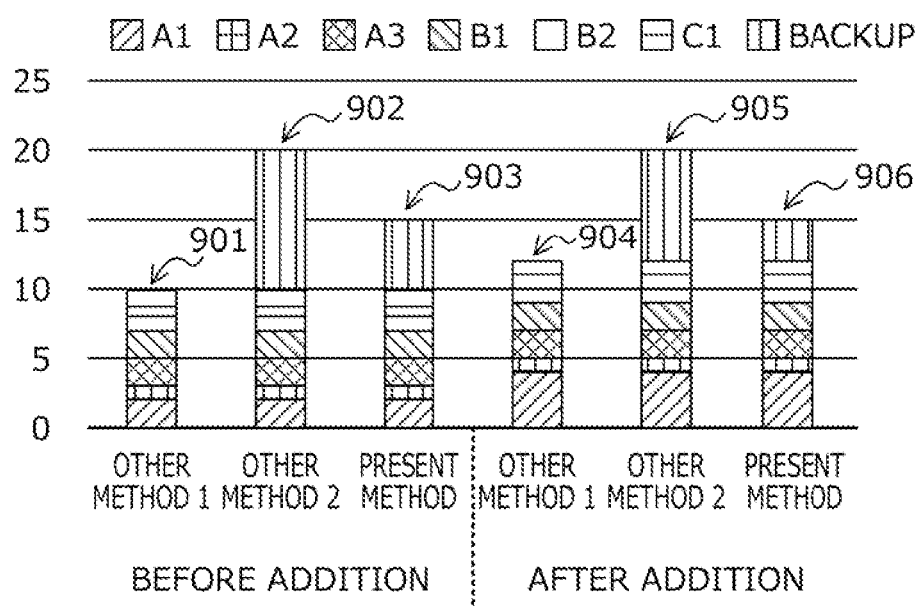
FIG. 9 is an explanatory diagram illustrating an example of comparison of the number of secured ICT resources.

FIG. 9 is an explanatory diagram illustrating an example of comparison of the number of secured ICT resources. In FIG. 9, graphs 901 to 903 represent the number of secured ICT resources before addition of a container (vertical: number of secured ICT resources, horizontal: method). Graphs 904 to 906 represent the number of secured ICT resources after addition of a container (vertical: number of secured ICT resources, horizontal: method).

In FIG. 9, A1 indicates the number of ICT resources used for the execution of app A1 (see FIG. 4). A2 indicates the number of ICT resources used for the execution of app A2 (see FIG. 4). A3 indicates the number of ICT resources used for the execution of app A3 (see FIG. 4). B1 indicates the number of ICT resources used for the execution of app B1 (see FIG. 4). B2 indicates the number of ICT resources used for the execution of app B2 (see FIG. 4). C1 indicates the number of ICT resources used for the execution of app C1 (see FIG. 4). Backup indicates the number of ICT resources used in backup containers.

According to graphs 901 to 906, it may be seen that, in the present method, the number of ICT resources is reduced by five as compared with other method 2 (by 25%: (10 for service+10 for backup) is reduced to (10 for service+5 for backup)).

Figure 10:
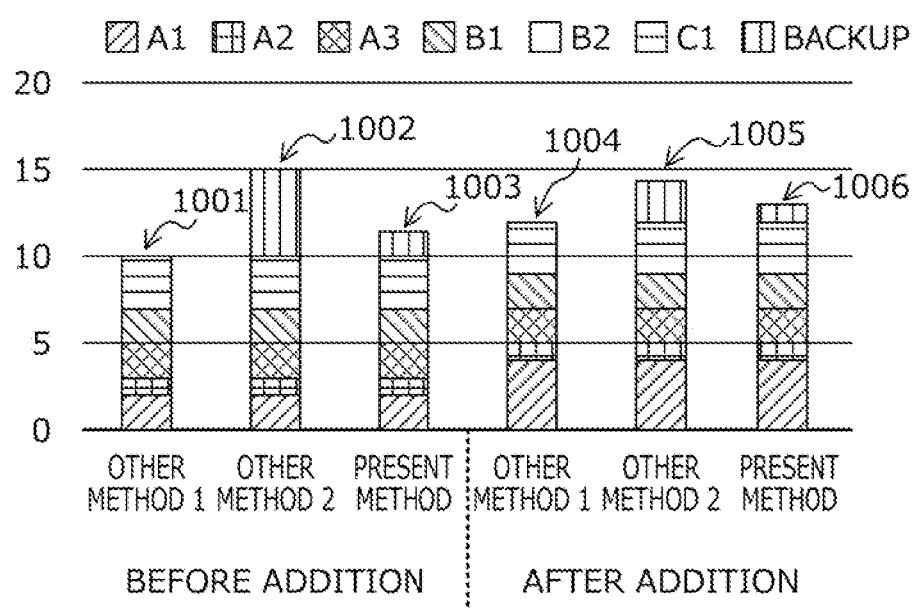
FIG. 10 is an explanatory diagram illustrating an example of comparison of power consumption.

FIG. 10 is an explanatory diagram illustrating an example of comparison of power consumption. In FIG. 10, graphs 1001 to 1003 represent power consumption before addition of a container (vertical: amount of power consumption, horizontal: method). Graphs 1004 to 1006 represent power consumption after addition of a container (vertical: amount of power consumption, horizontal: method). After addition, power consumption increases since one backup container is set in operation from the backup state.

In FIG. 10, A1 indicates power consumption related to the execution of app A1 (see FIG. 4). A2 indicates power consumption related to the execution of app A2 (see FIG. 4). A3 indicates power consumption related to the execution of app A3 (see FIG. 4). B1 indicates power consumption related to the execution of app B1 (see FIG. 4). B2 indicates power consumption related to the execution of app B2 (see FIG. 4). C1 indicates power consumption related to the execution of app C1 (see FIG. 4). Backup indicates power consumption related to backup containers.

According to graphs 1001 to 1006, it may be seen that, in the present method, power consumption is reduced by 1.5 (12% before addition and 14% after addition) as compared with other method 2.

As described above, with the management server 201 (resource management device 101) according to the embodiment, backup containers for backup may be classified based on feature information such that, among the backup containers for backup, the backup containers used at the same timing are not in the same group. Feature information is information representing the feature of each of a plurality of containers related to provision of one or more services. Backup containers for backup include backup containers corresponding to each of a plurality of containers. With the management server 201, resources may be allocated to backup containers in a group in an overlapping manner such that the resources are shared between the classified backup containers in the group. For example, resources are ICT resources such as CPUs, memories, storages, and accelerators.

Accordingly, the management server 201 may group backup containers such that the backup containers with a high possibility of being used at the same timing use different resources (ICT resources). Accordingly, the management server 201 enables rapid resource increase, and may reduce power consumption by reducing the number of ICT resources to be powered on and prepared in advance. For example, the management server 201 may avoid a situation in which resource contention occurs between containers to be added and addition of a container takes time when resource increase has to be performed.

With the management server 201, backup containers for backup may be classified based on feature information representing the provision of a service among one or more services to which each of a plurality of containers relates, such that, among the backup containers for backup, the backup containers corresponding to the containers related to provision of the same service are not in the same group.

Accordingly, the management server 201 may perform grouping such that the backup containers for the same service in which the timings of resource increase are likely to overlap are in different groups.

With the management server 201, backup containers for backup may be classified based on feature information representing a load state of each of a plurality of containers such that, among the backup containers for backup, the backup containers corresponding to the containers whose degree of margin in processing performance is equal to or less than a threshold value are not in the same group.

Accordingly, the management server 201 may perform grouping such that the backup containers corresponding to the containers with a small margin in the processing performance in the current service configuration are in different groups.

With the management server 201, backup containers for backup may be classified based on feature information representing the demand tendency of a service corresponding to each of a plurality of containers such that, among the backup containers for backup, the backup containers corresponding to the containers related to provision of services with the same demand tendency are not in the same group.

Accordingly, the management server 201 may perform grouping such that the backup containers for services with similar contents or demand tendencies are in different groups.

With the management server 201, backup containers for backup may be classified based on resource upper limit information and feature information such that the amount of resources to be allocated to the backup containers for backup does not exceed an upper limit and that, among the backup containers for backup, the backup containers used at the same timing are not in the same group. Resource upper limit information is information representing an upper limit of the amount of resources that may be allocated to backup containers for backup.

Accordingly, the management server 201 may group backup containers such that the backup containers with a high possibility of being used at the same timing use different resources (ICT resources) while reducing the number of ICT resources for backup from the viewpoint of power consumption, cost, and the like.

With the management server 201, among resources that may be allocated to backup containers for backup, resources allocated to backup containers in a group may be powered on. Resources that may be allocated to backup containers for backup are powered off (in a power OFF state) in an unallocated state.

Accordingly, the management server 201 may reduce power consumption related to ICT resources in an unallocated state.

With the management server 201, among resources that may be allocated to backup containers for backup, the power of resources other than the resources that have already been allocated may be set to the power saving mode (for example, a low power consumption state or a low performance state).

Accordingly, the management server 201 may shorten the time taken for transitioning to a normal state as compared with a case of being powered off when resources allocated to backup containers are powered on, while reducing power consumption related to ICT resources in an unallocated state.

For these reasons, with the management server 201 according to the embodiment, an infrastructure that satisfies the performance condition from a user may be constructed with low power consumption.

Exemplary Embodiment 1

Next, exemplary embodiment 1 of the management server 201 will be described. In exemplary embodiment 1, description will be given for a case in which backup containers for backup are classified such that, among the backup containers for backup, the backup containers corresponding to the containers related to provision of the same service are not in the same group.

(Services to be Deployed)

First, services to be deployed will be described with reference to FIG. 11.

Figure 11:
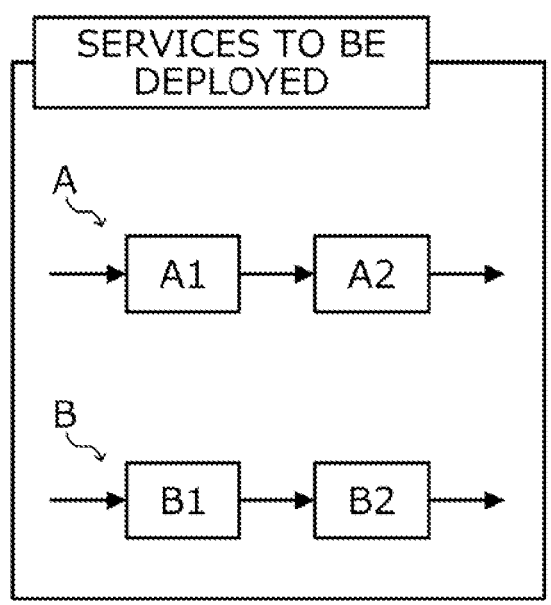
FIG. 11 is an explanatory diagram illustrating examples of services to be deployed.

FIG. 11 is an explanatory diagram illustrating examples of services to be deployed. In FIG. 11, services A and B are examples of services to be deployed. Service A is a service of a two-stage configuration including app A1 and app A2. Service B is a service of a two-stage configuration including app B1 and app B2.

(Specific Example of App Performance and Resource Information)

Next, a specific example of app performance and resource information will be described with reference to FIG. 12.

Figure 12:
FIG. 12 is an explanatory diagram illustrating a specific example of app performance and resource information (part 1)

FIG. 12 is an explanatory diagram illustrating a specific example of app performance and resource information (part 1). In FIG. 12, app performance and resource information 1200 indicates the correspondence between app, performance, and resources that have to be used (CPUs and GPUs). In FIG. 12, the number of CPUs indicates the number of CPUs having the same performance. The number of GPUs indicates the number of GPUs having the same performance.

For example, the app performance and resource information 1200 indicates that the performance of app A1 is "80 Mbps" and resources that have to be used for app A1 are "CPU: 2, GPU: 0".

Hereinafter, an example of operation according to exemplary embodiment 1 will be described.

First, the reception unit 501 receives requested performance related to services A and B. The requested performance related to service A is "40 Mbps", and the requested performance related to service B is "50 Mbps".

Next, the first calculation unit 502 calculates a container configuration related to provision of services A and B. For example, the first calculation unit 502 calculates a container configuration related to provision of service A based on the requested performance related to service A "40 Mbps" and the app performance and resource information 1200 illustrated in FIG. 12.

With respect to the requested performance of service A "40 Mbps", the performance of app A1 in the first stage of service A is "80 Mbps". For this reason, the first calculation unit 502 sets the number of containers in the first stage of service A to "1". With respect to the requested performance of service A "40 Mbps", the performance of app A2 in the second stage of service A is "30 Mbps". For this reason, the first calculation unit 502 sets the number of containers in the second stage of service A to "2".

The first calculation unit 502 calculates a container configuration related to provision of service B based on the requested performance related to service B "50 Mbps" and the app performance and resource information 1200. With respect to the requested performance of service B "50 Mbps", the performance of app B1 in the first stage of service B is "100 Mbps". For this reason, the first calculation unit 502 sets the number of containers in the first stage of service B to "1". With respect to the requested performance of service B "50 Mbps", the performance of app B2 in the second stage of service B is "50 Mbps". For this reason, the first calculation unit 502 sets the number of containers in the second stage of service B to "1".

For example, the calculated container configuration is stored in the service configuration information 1300 such as that illustrated in FIG. 13.

FIG. 13 is an explanatory diagram illustrating a specific example of the service configuration information 1300. In FIG. 13, the service configuration information 1300 indicates a container configuration related to provision of services A and B. The service configuration information 1300 indicates that, in providing service A, one container A1$a$ that executes app A1 in the first stage and two containers A2$a$ and A1$b$ that execute app A2 in the second stage have to be used.

The service configuration information 1300 indicates that, in providing service B, one container B1$a$ that executes app B1 in the first stage and one container B2$a$ that executes app B2 in the second stage have to be used. A1$a$, A2$a$, A2$b$, B1$a$, and B2$a$ are identifiers for uniquely identifying containers (including backup containers) given in the management server 201.

For example, container A1$a$ indicates the first container that executes app A1. Container A2$a$ indicates the first container that executes app A2. Container A2$b$ indicates the second container that executes app A2.

Next, the first calculation unit 502 allocates resources to containers A1a to B2$a$ related to provision of services A and B. For example, the first calculation unit 502 refers to the app performance and resource information 1200 and specifies the amount of resources (resources that have to be used) to be allocated to containers A1$a$ to B2$a$.

For example, the amount of resources of container A1$a$ corresponds to the resources that have to be used for app A1 "CPU: 2, GPU: 0". The amount of resources of container B1$a$ corresponds to the resources that have to be used for app B1 "CPU: 2, GPU: 1".

Figure 14:
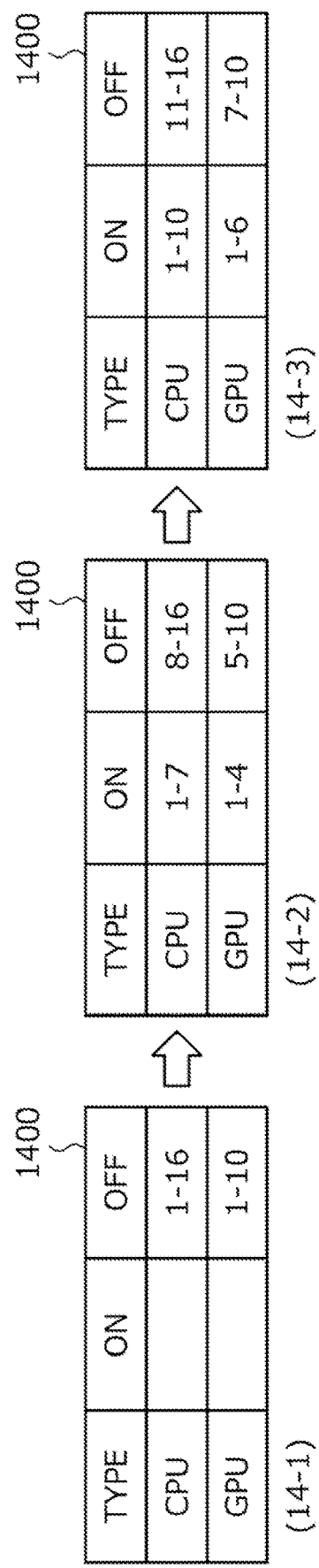
FIG. 14 is an explanatory diagram illustrating an example of changes in the contents stored in resource allocation status information.

The first calculation unit 502 refers to resource allocation status information 1400 such as that illustrated in FIG. 14 and allocates free resources of the specified amount of resources to containers A1$a$ to B2$a$. The contents stored in the resource allocation status information 1400 will be described. Resources that may be allocated to containers (including backup containers) are "CPU 1 to CPU 16 and GPU 1 to GPU 10".

FIG. 14 is an explanatory diagram illustrating an example of changes in the contents stored in the resource allocation status information 1400. In FIG. 14, the resource allocation status information 1400 indicates an allocation status of each resource that may be allocated to a container (including a backup container). Type indicates the type of a resource. ON indicates an already-allocated state. OFF indicates an unallocated state.

The resource allocation status information 1400 illustrated in (14-1) indicates that CPU 1 to CPU 16 and GPU 1 to GPU 10 are in an unallocated state. For example, the first calculation unit 502 refers to the resource allocation status information 1400 and allocates unallocated resources to containers A1$a$ to B2$a$ in ascending order of numbers.

For example, the first calculation unit 502 allocates CPU 1 and CPU 2 to container A1a. The first calculation unit 502 allocates CPU 3 and GPU 1 to container A2a. The first calculation unit 502 allocates CPU 4 and GPU 2 to container A1b. The first calculation unit 502 allocates CPU 5, CPU 6, and GPU 3 to container B1a. The first calculation unit 502 allocates CPU 7 and GPU 4 to container B2a.

As a result, as in the resource allocation status information 1400 illustrated in (14-2), CPU 1 to CPU 7 are ON, and GPU 1 to GPU 4 are ON. Next, the power management unit 503 powers on the resources allocated to containers A1a to B2a. The deployment unit 504 deploys containers A1a to B2a related to provision of services A and B.

Figure 15C:
FIG. 15C is an explanatory diagram illustrating an example of changes in the contents stored in container management information (part 3)

For example, the operation states of containers A1a to B2a are managed by the container management information 1500 such as that illustrated in FIGS. 15A to 15C.

FIGS. 15A to 15C are explanatory diagrams illustrating an example of changes in the contents stored in the container management information 1500. In FIGS. 15A to 15C, the container management information 1500 indicates resource allocation results and operation states of containers related to provision of services A and B. In FIGS. 15A to 15C, container ID is an identifier of a container. CPU number is an identifier of a CPU allocated to a container. GPU number is an identifier of a GPU allocated to a container. State indicates an operation state of a container.

The container management information 1500 illustrated in (15-1) of FIG. 15A indicates resource allocation results and operation states of containers A1a to B2a. The state "operation" indicates that a container is in operation.

Description will be given with reference to FIGS. 16 to 18 for the use state of resources allocated to containers (including backup containers) related to provision of services A and B.

Figure 16:
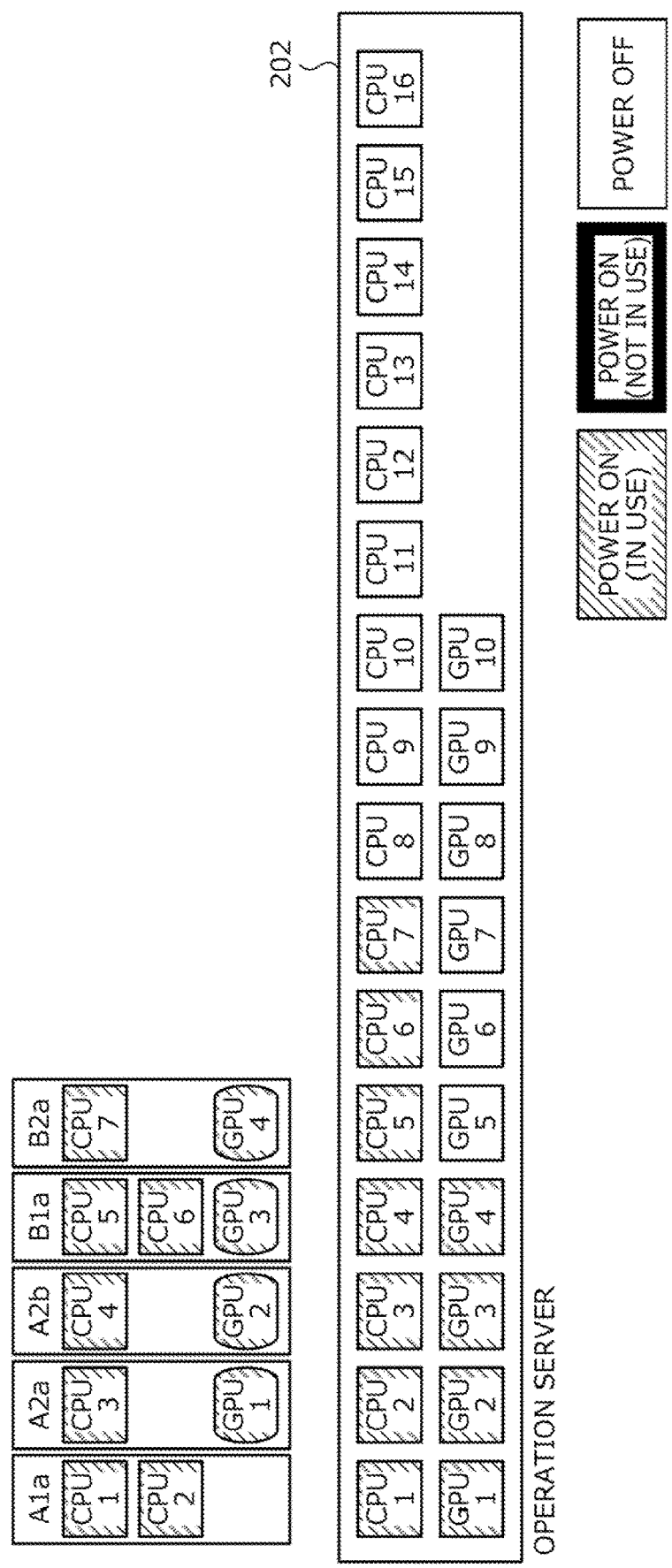
FIG. 16 is an explanatory diagram illustrating the use state of resources according to exemplary embodiment 1 (part 1)
Figure 17:
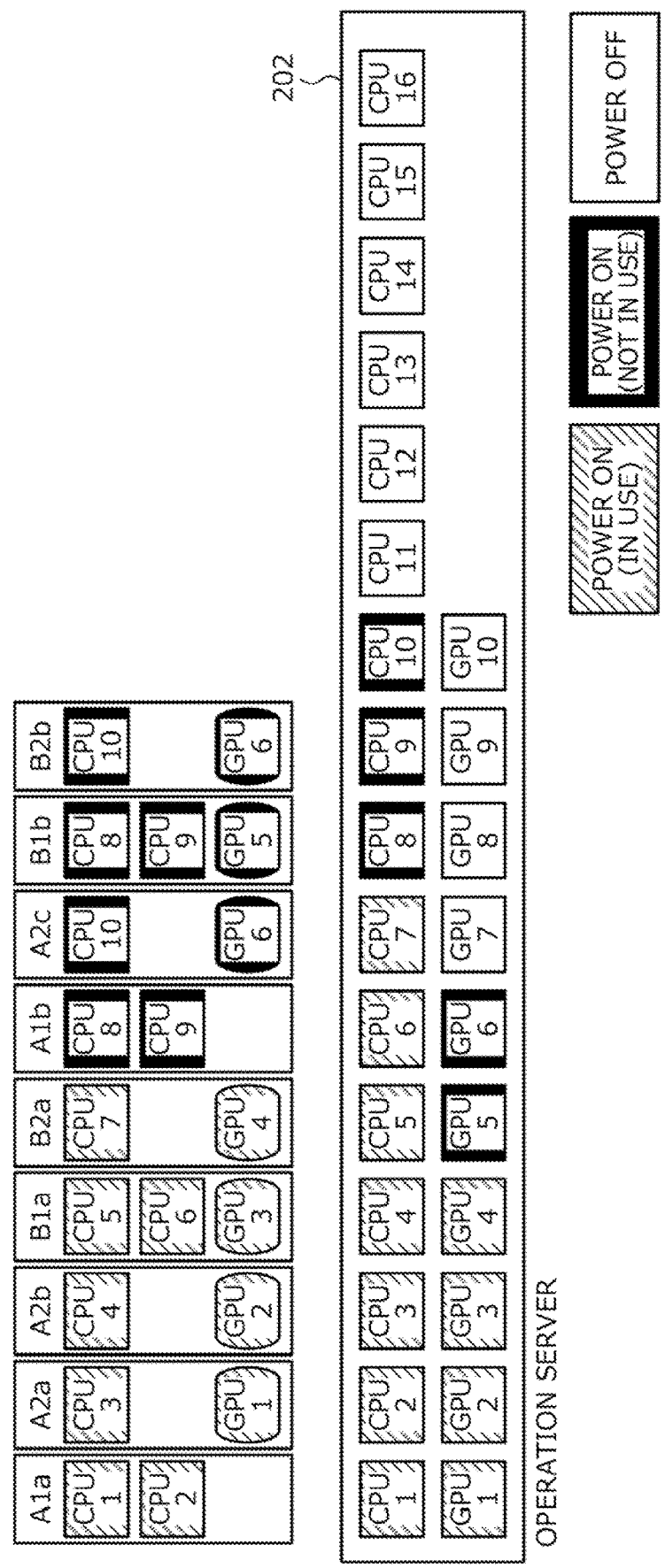
FIG. 17 is an explanatory diagram illustrating the use state of resources according to exemplary embodiment 1 (part 2)
Figure 18:
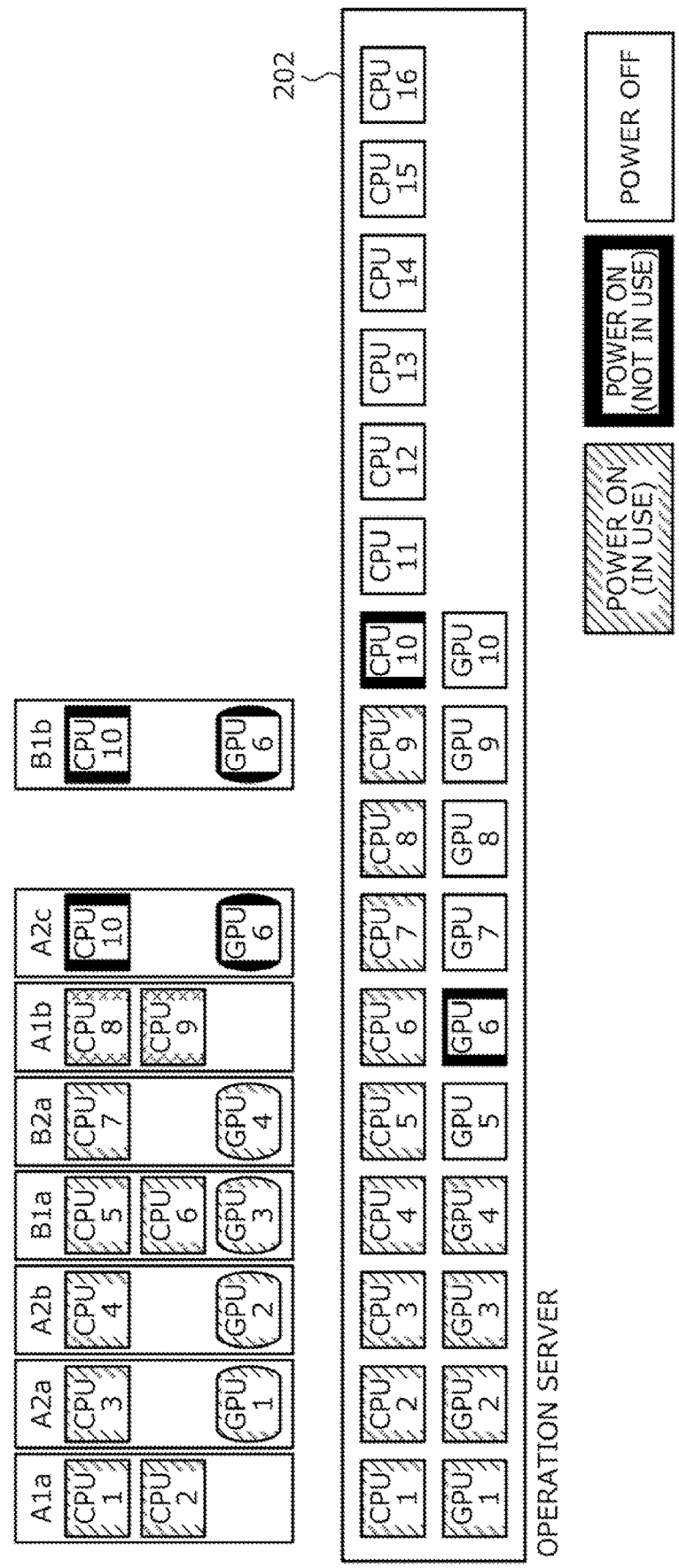
FIG. 18 is an explanatory diagram illustrating the use state of resources according to exemplary embodiment 1 (part 3)

FIGS. 16 to 18 are explanatory diagrams illustrating the use state of resources according to exemplary embodiment 1. In FIGS. 16 to 18, CPU 1 to CPU 16 and GPU 1 to GPU 10 in the operation server 202 represent resources that may be allocated to containers (including backup containers). In FIGS. 16 to 18, the operation server 202 represents one or more operation servers 202. CPU 1 to CPU 16 are CPUs having the same performance. GPU 1 to GPU 10 are GPUs having the same performance.

In the example illustrated in FIG. 16, the use state of the resources allocated to containers A1a to B2a is "power ON (in use)". The use state "power ON (in use)" indicates a state in which a resource is powered on and is being used for a service. The use state of resources other than the resources allocated to containers A1a to B2a is "power OFF". The use state "power OFF" indicates a state in which a resource is not powered on.

When deployment of containers A1a to B2a is completed, services A and B may be provided.

Next, the second calculation unit 505 calculates a backup container configuration related to provision of services A and B based on the service configuration information 1300 illustrated in FIG. 13. For example, the second calculation unit 505 determines to generate backup containers A1b and A2c having the same performance as that of containers A1a and A2a that execute apps A1 and A2 in the stages of service A.

The second calculation unit 505 determines to generate backup containers B1b and B2b having the same performance as that of containers B1a and B2a that execute apps B1 and B2 in the stages of service B. For example, backup container configuration is stored in the container management information 1500. In the container management information 1500 illustrated in (15-2) of FIG. 15A, backup containers A1b, A2c, B1b, and B2b are added.

Next, the second calculation unit 505 classifies backup containers A1b, A2c, B1b, and B2b based on the service configuration information 1300 such that, among backup containers A1b, A2c, B1b, and B2b, the backup containers corresponding to the containers related to provision of the same service are not in the same group.

An example of classification of backup containers A1b, A2c, B1b, and B2b will be described with reference to FIG. 19.

Figure 19:
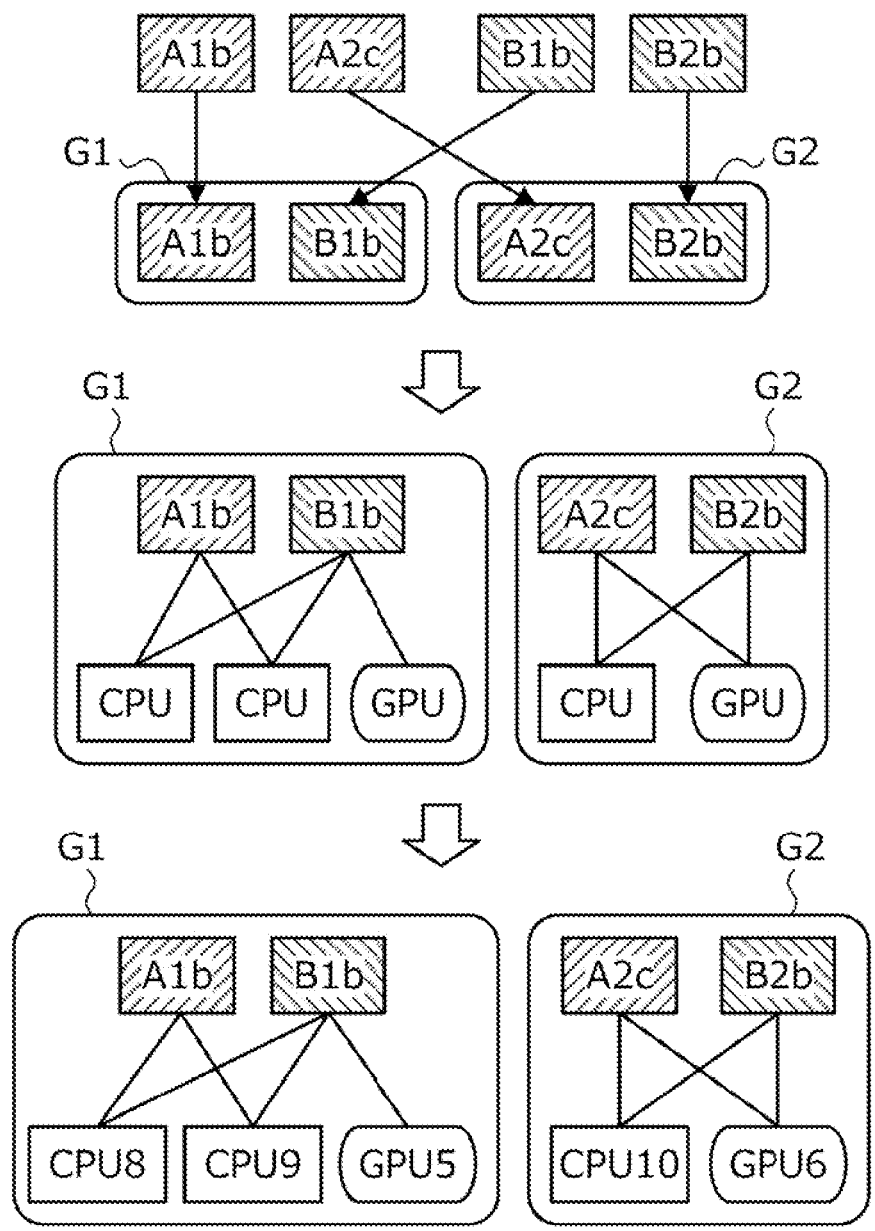
FIG. 19 is an explanatory diagram illustrating a first example of classification of backup containers.

FIG. 19 is an explanatory diagram illustrating a first example of classification of backup containers. In FIG. 19, backup containers A1b, A2c, B1b, and B2b are containers for backup related to provision of services A and B. For example, the second calculation unit 505 sequentially groups backup containers A1b, A2c, B1b, and B2b such that the backup containers of the same service are not in the same group.

First, the second calculation unit 505 classifies backup container A1b into group G1. Next, the second calculation unit 505 classifies backup container A2c into group G2 different from the group to which backup container A1b of the same service A belongs. Next, the second calculation unit 505 classifies backup container B1b into group G1. The second calculation unit 505 classifies backup container B2b into group G2 different from the group to which backup container B1b of the same service B belongs.

Accordingly, the second calculation unit 505 may group backup containers A1b, A2c, B1b, and B2b such that the backup containers of the same service are not in the same group.

Next, the second calculation unit 505 allocates resources to the backup containers in groups G1 and G2 in an overlapping manner such that the resources are shared between the classified backup containers in groups G1 and G2. For example, first, the second calculation unit 505 calculates an amount of resources that have to be used in each of groups G1 and G2 from the amount of resources (resources that have to be used) to be allocated to the backup containers in groups G1 and G2.

Resources that have to be used for backup container A1b in group G1 are "CPU: 2". Resources that have to be used for backup container B1b in group G1 are "CPU: 2, GPU: 1". For this reason, in a case where resources are shared between the backup containers in group G1, the amount of resources that have to be used in group G1 is "CPU: 2, GPU: 1" (for example, see FIG. 19).

Resources that have to be used for backup container A2c in group G2 are "CPU: 1, GPU: 1". Resources that have to be used for backup container B2b in group G2 are "CPU: 1, GPU: 1". For this reason, in a case where resources are shared between the backup containers in group G2, the amount of resources that have to be used in group G2 is "CPU: 1, GPU: 1" (for example, see FIG. 19).

Next, the second calculation unit 505 determines the resources to be allocated to groups G1 and G2 based on the amount of resources that have to be used in each of groups G1 and G2. For example, the second calculation unit 505 refers to the resource allocation status information 1400 illustrated in (14-2) of FIG. 14 and allocates, to groups G1 and G2, free resources corresponding to the amount of resources that have to be used.

CPU 8, CPU 9, and GPU 5 are allocated to group G1. CPU 10 and GPU 6 are allocated to group G2. As a result, as in the resource allocation status information 1400 illustrated in (14-3), CPU 8 to CPU 10 are ON, and GPU 5 and GPU 6 are ON.

The second calculation unit 505 allocates the resources to the backup containers in groups G1 and G2 in an overlapping manner such that the resources are shared between the backup containers in groups G1 and G2. For example, the second calculation unit 505 allocates, in an overlapping manner to the backup containers in groups G1 and G2, the resources allocated to groups G1 and G2. In this case, when the number of resources allocated to each of groups G1 and G2 is larger than the number of resources that have to be used for the backup containers, the second calculation unit 505 selects as many resources as the number of resources that have to be used.

CPU 8 and CPU 9 are allocated to backup container A1b in group G1 (for example, see FIG. 19). CPU 8, CPU 9, and GPU 5 are allocated to backup container B1b in group G1 (for example, see FIG. 19). CPU 8 and CPU 9 are allocated to backup containers A1b and B1b in an overlapping manner.

CPU 10 and GPU 6 are allocated to backup container A2c in group G2 (for example, see FIG. 19). CPU 10 and GPU 6 are allocated to backup container B2b in group G2 (for example, see FIG. 19). CPU 10 and GPU 6 are allocated to backup containers A2c and B2b in an overlapping manner.

As a result, as illustrated in (15-3) of FIG. 15B, CPU numbers and GPU numbers of the resources allocated to each of backup containers A1b, A2c, B1b, and B2b are added to the container management information 1500.

Next, the power management unit 503 powers on the resources allocated to backup containers A1b, A2c, B1b, and B2b. The deployment unit 504 deploys backup containers A1b, A2c, B1b, and B2b related to provision of services A and B. As a result, as illustrated in (15-4) of FIG. 15B, "backup" is set as the state of backup containers A1b, A2c, B1b, and B2b in the container management information 1500. The state "backup" indicates that a container is standing by as a backup container.

As illustrated in FIG. 17, regarding the use state of resources, the use state of the resources allocated to backup containers A1b, A2c, B1b, and B2b is "power ON (not in use)". The use state "power ON (not in use)" indicates a state in which a resource is powered on, but is not being used for a service. Since a resource in the use state "power ON (not in use)" is in a standby state, the resource uses power as compared with power OFF, but consumes less power as compared with power ON (in use).

A case is assumed in which the performance of container A1a in the first stage of service A is insufficient due to an increase in traffic amount or the like, and resource increase has to be performed.

Figure 20:
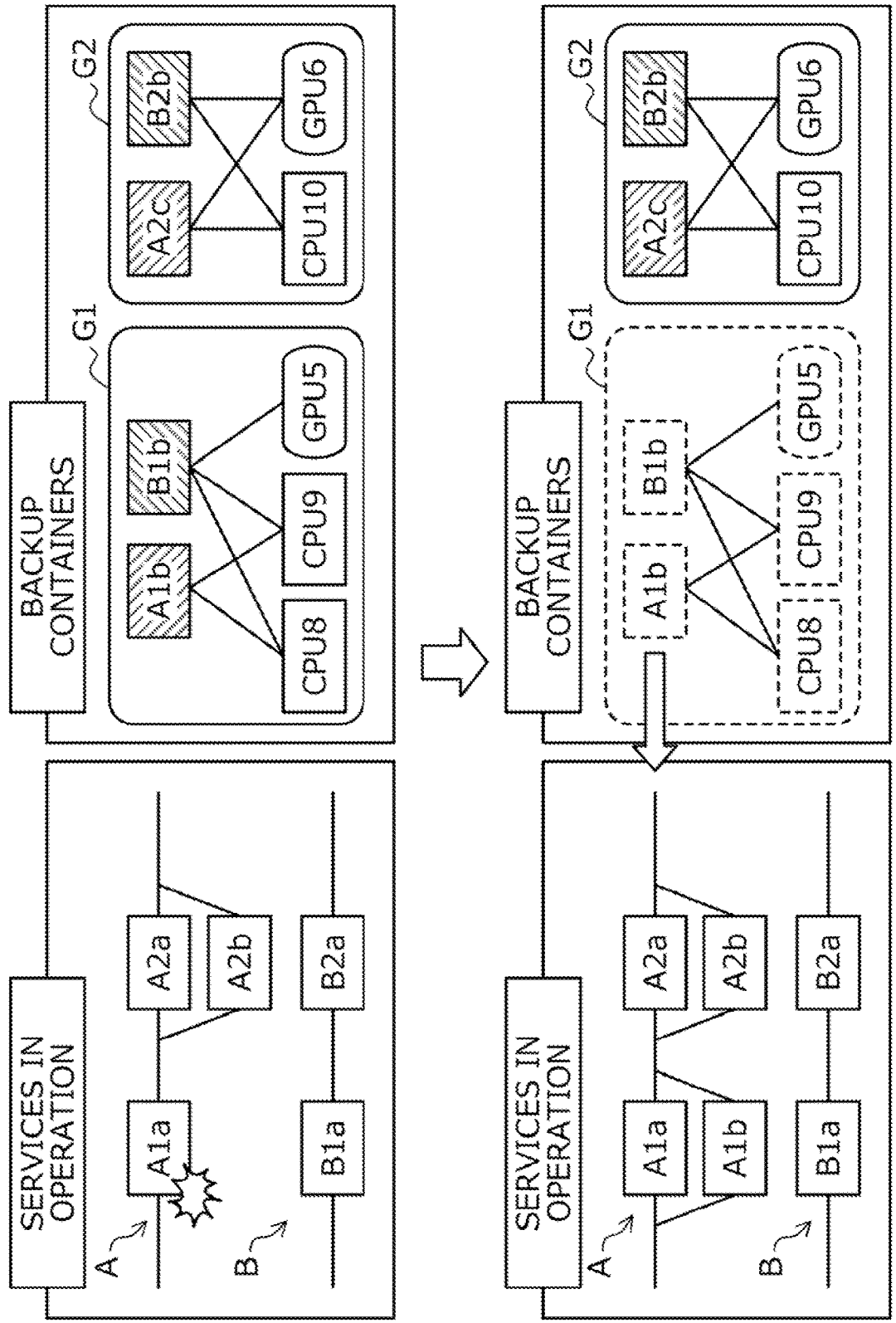
FIG. 20 is an explanatory diagram illustrating an example of a container configuration and a backup container configuration.

FIG. 20 is an explanatory diagram illustrating an example of a container configuration and a backup container configuration. In FIG. 20, containers A1a, A2a, and A1b related to provision of service A and containers B1a and B2a related to provision of service B are indicated. Backup containers A1b and B1b classified into group G1 and backup containers A2c and B2b classified into group G2 are indicated.

The performance of container A1a in the first stage of service A is insufficient. In this case, the first calculation unit 502 specifies a backup container to be added to service A from backup containers A1b, A2c, B1b, and B2b. Backup container A1b corresponding to container A1a for which resource increase has to be performed is specified.

The first calculation unit 502 adds the specified backup container A1b to service A. The first calculation unit 502 updates the container configuration such that the added backup container A1b occupies the resources shared with another backup container B1b in the same group G1.

For example, the first calculation unit 502 causes the deployment unit 504 to request the container management device 203 to perform coupling setting of CPU 8 and CPU 9 occupied by backup container A1b and delete the other backup container B1b in group G1. In this case, for example, the deployment unit 504 may perform setting such as changing of traffic distribution.

The power management unit 503 sets the power of the resource allocated only to the other backup container B1b in group G1 to an OFF state. For example, the power management unit 503 transmits a power off instruction for GPU 5 to the operation server 202 including GPU 5 allocated only to the other backup container B1b.

As a result, in the operation server 202, the power of GPU 5 allocated only to the other backup container B1b is in an OFF state, and GPU 5 in the resource allocation status information 1400 is OFF. As illustrated in FIG. 18, regarding the use state of resources, the use state of the resources allocated to backup container A1b (CPU 8 and CPU 9) is "power ON (in use)", and the use state of GPU 5 is "power OFF". As illustrated in (15-5) of FIG. 15C, "in operation" is set as the state of backup container A1b in the container management information 1500. "- (null)" is set as the CPU number and the GPU number of backup container B1b, and "deleted" is set as the state of backup container B1b.

Accordingly, the management server 201 completes the resource increase for service A using backup container A1b. In the example of FIG. 20, backup container A1b in group G1 is added to the first stage of service A, and resource increase is performed. After that, for example, the management server 201 may perform repreparation of backup container B1b that had been sharing resources with backup container A1b or preparation of backup container A1c for the first stage of service A.

(Resource Management Processing Procedure of Management Server 201)

Next, description will be given for a specific processing procedure of resource management processing of the management server 201 according to exemplary embodiment 1.

Figure 21:
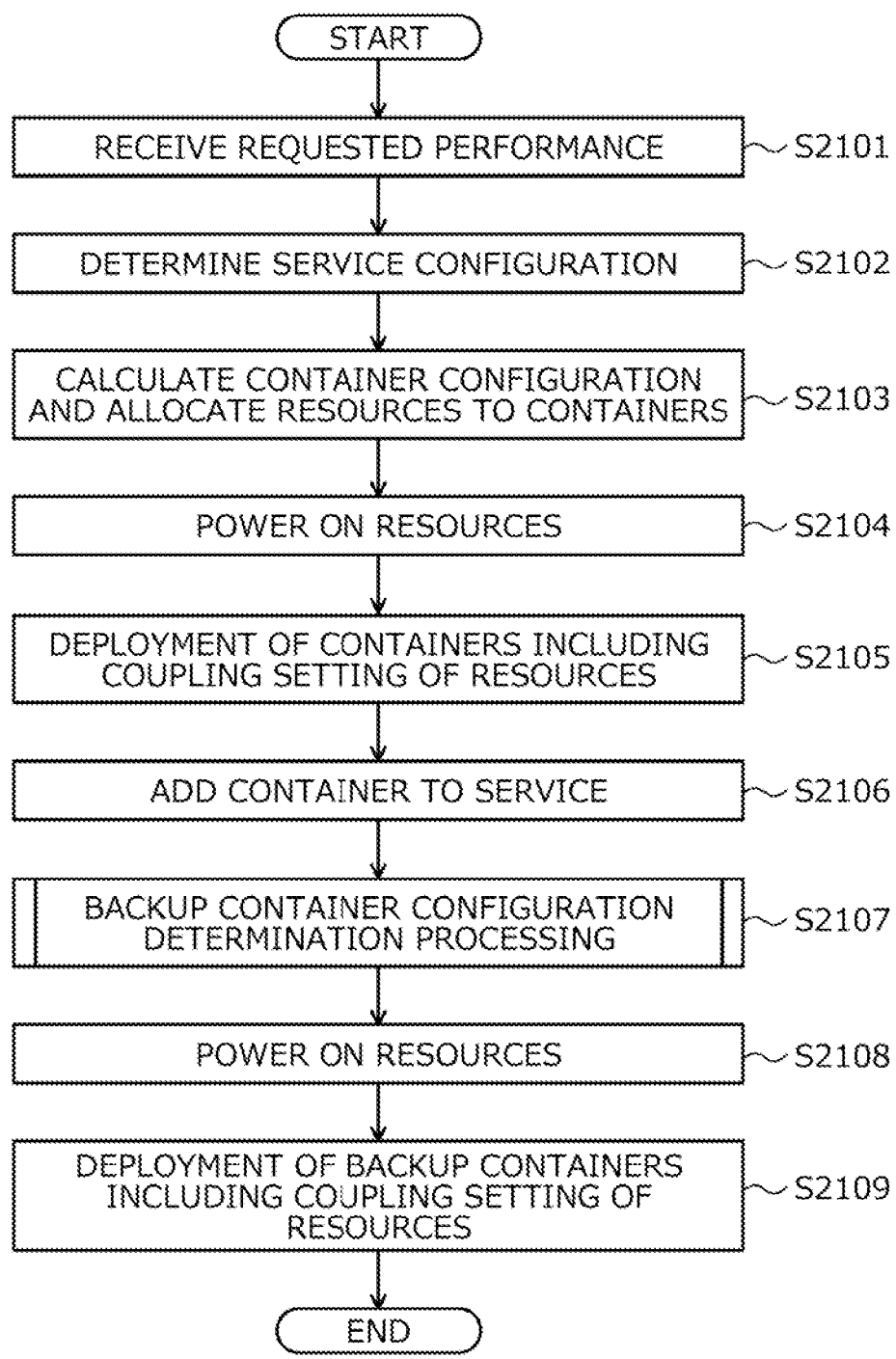
FIG. 21 is a flowchart illustrating an example of a specific processing procedure of resource management processing of the management server.

FIG. 21 is a flowchart illustrating an example of the specific processing procedure of resource management processing of the management server 201. In the flowchart of FIG. 21, first, the management server 201 receives requested performance of each service (step S2101). Next, the management server 201 determines the service configuration of each service based on the received requested performance (step S2102). For example, a service configuration indicates the number of containers in each stage satisfying the requested performance of a service.

The management server 201 calculates a container configuration related to provision of each service based on the determined service configuration, and allocates resources to the containers related to provision of each service (step S2103). Next, the management server 201 powers on the resources allocated to each container (step S2104).

The management server 201 performs deployment of containers including coupling setting of resources (step S2105). Next, the management server 201 adds a container to each service (step S2106). In this case, for example, the management server 201 performs setting such as changing of traffic distribution.

The management server 201 executes backup container configuration determination processing (step S2107). A specific processing procedure of the backup container configuration determination processing will be described later with reference to FIG. 22. Next, the management server 201 powers on the resources allocated to each backup container (step S2108).

The management server 201 performs deployment of backup containers including coupling setting of resources (step S2109), and ends the processing of this flowchart. Accordingly, the management server 201 may add a container related to provision of each service in accordance with the requested performance of each service and deploy backup containers.

Next, a specific processing procedure of the backup container configuration determination processing in step S2107 will be described with reference to FIG. 22.

Figure 22:
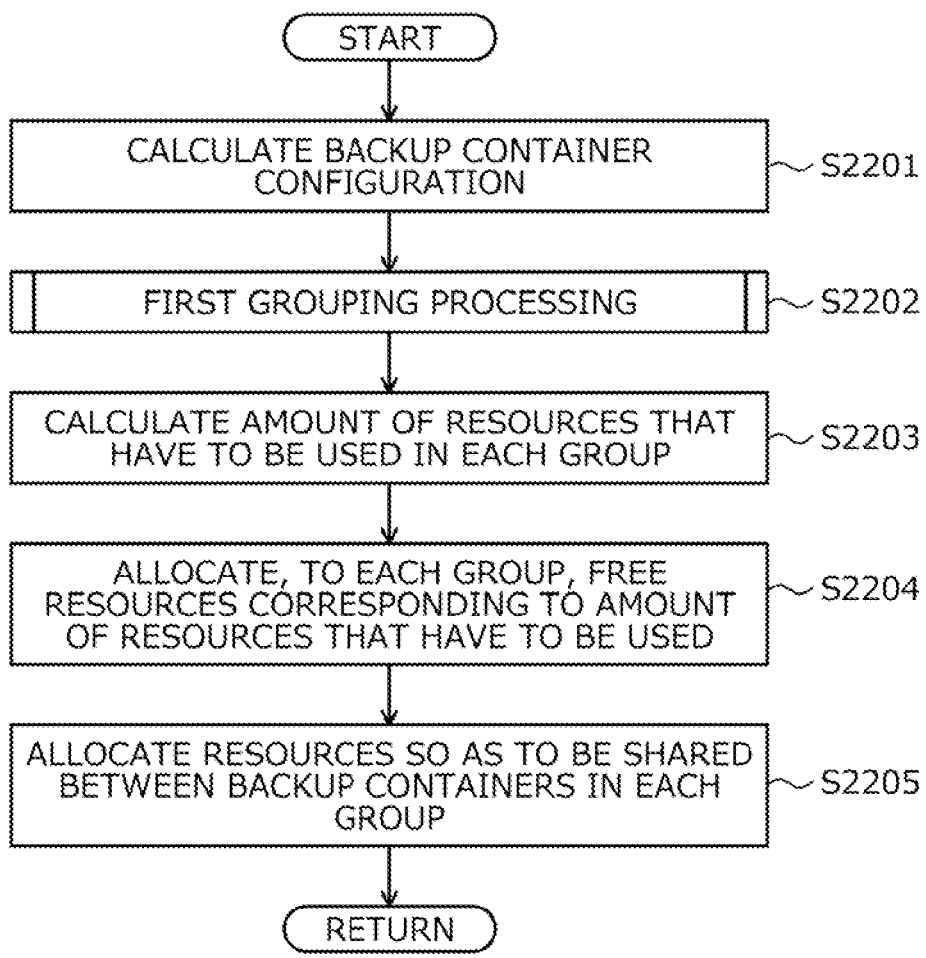
FIG. 22 is a flowchart illustrating an example of a specific processing procedure of backup container configuration determination processing.

FIG. 22 is a flowchart illustrating an example of the specific processing procedure of the backup container configuration determination processing. In the flowchart of FIG. 22, first, the management server 201 calculates a backup container configuration related to provision of each service based on the service configuration of each service (step S2201).

Next, the management server 201 executes first grouping processing based on the calculated backup container configuration (step S2202). A specific processing procedure of the first grouping processing will be described later with reference to FIG. 23. The management server 201 calculates an amount of resources that have to be used in each group from the resources that have to be used for the backup containers in each group (step S2203).

Next, the management server 201 allocates, to each group, free resources corresponding to the amount of resources that have to be used, based on the calculated amount of resources that have to be used in each group (step S2204). The management server 201 allocates resources to the backup containers in each group in an overlapping manner such that the resources are shared between the backup containers in each group (step S2205), and returns to the step in which the backup container configuration determination processing is invoked.

Next, a specific processing procedure of the first grouping processing in step S2202 will be described with reference to FIG. 23.

Figure 23:
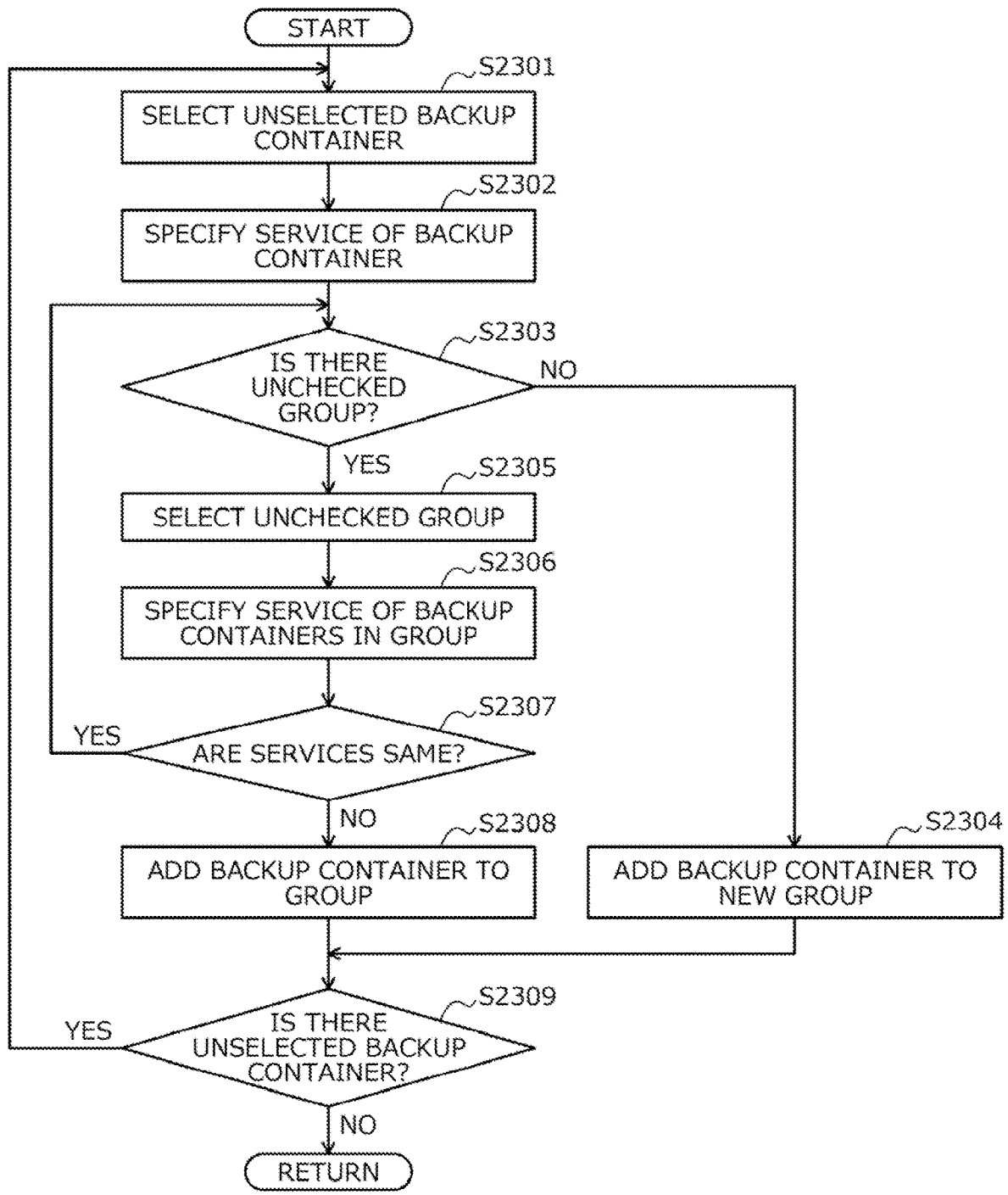
FIG. 23 is a flowchart illustrating an example of a specific processing procedure of first grouping processing.

FIG. 23 is a flowchart illustrating an example of the specific processing procedure of the first grouping processing. In the flowchart of FIG. 23, first, the management server 201 selects an unselected backup container that is not selected among backup containers for backup (step S2301). Next, the management server 201 specifies the service of the selected backup container based on service configuration information (step S2302).

The management server 201 determines whether there is an unchecked group (step S2303). When there is no unchecked group (step S2303: No), the management server 201 adds the selected backup container to a new group (step S2304), and proceeds to step S2309.

On the other hand, when there is an unchecked group (step S2303: Yes), the management server 201 selects the unchecked group (step S2305). Next, the management server 201 specifies the service of the backup containers in the group (step S2306). The management server 201 determines whether the specified service is the same as the service specified in step S2302 (step S2307).

When the services are the same (step S2307: Yes), the management server 201 returns to step S2303. On the other hand, when the services are different from each other (step S2307: No), the management server 201 adds the selected backup container to the selected group (step S2308).

The management server 201 determines whether there is an unselected backup container that is not selected among backup containers for backup (step S2309). When there is an unselected backup container (step S2309: Yes), the management server 201 returns to step S2301. On the other hand, when there is no unselected backup container (step S2309: No), the management server 201 returns to the step in which the first grouping processing is invoked.

Accordingly, the management server 201 may group backup containers such that the backup containers of the same service are not in the same group.

(Resource Increase Processing Procedure of Management Server 201)

Next, a resource increase processing procedure of the management server 201 will be described.

Figure 24:
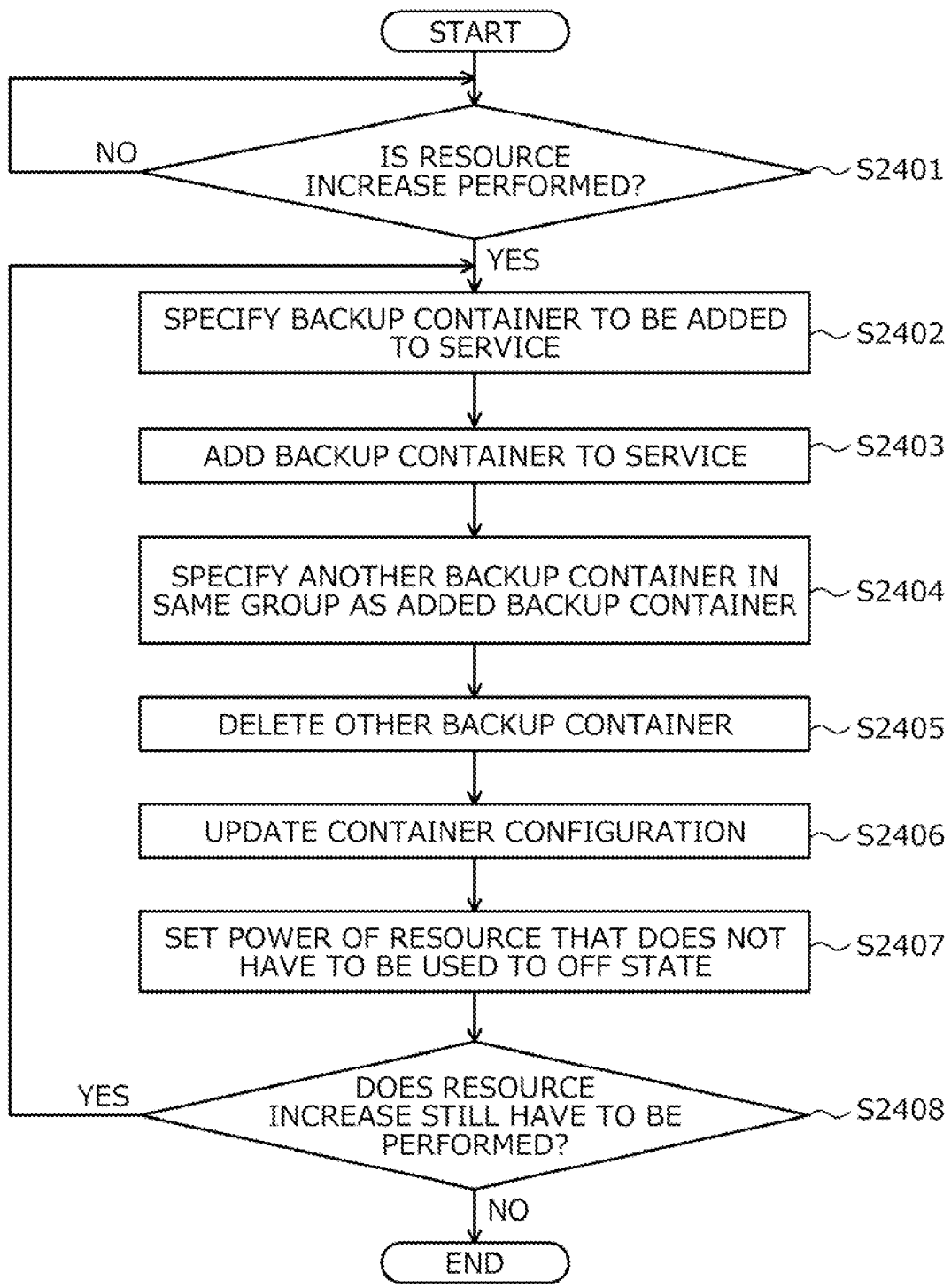
FIG. 24 is a flowchart illustrating an example of a resource increase processing procedure of the management server.

FIG. 24 is a flowchart illustrating an example of the resource increase processing procedure of the management server 201. In the flowchart of FIG. 24, first, the management server 201 monitors the load of containers related to provision of a service, and determines whether resource increase is to be performed (step S2401).

The management server 201 waits until it is determined that resource increase is to be performed (step S2401: No). When it is determined that resource increase is to be performed (step S2401: Yes), the management server 201 specifies a backup container to be added to the service among backup containers for backup (step S2402).

Next, the management server 201 adds the specified backup container to the service (step S2403). In this case, for example, the management server 201 performs setting such as changing of traffic distribution. The management server 201 specifies another backup container in the same group as the added backup container (step S2404).

Next, the management server 201 deletes the specified other backup container (step S2405). The management server 201 updates the container configuration such that the added backup container occupies the resources shared with the other backup container in the same group (step S2406).

Next, the management server 201 sets the power of the resource that does not have to be used allocated only to the other backup container to an OFF state (step S2407). The management server 201 determines whether resource increase still has to be performed (step S2408). When resource increase has to be performed (step S2408: Yes), the management server 201 returns to step S2402.

On the other hand, when resource increase does not have to be performed (step S2408: No), the management server 201 ends the processing of this flowchart. Accordingly, the management server 201 may perform resource increase for a service by using backup containers when performance insufficiency occurs due to an increase in traffic amount or the like.

As described above, with the management server 201 according to exemplary embodiment 1, grouping may be performed such that the backup containers for the same service in which the timings of resource increase are likely to overlap are in different groups. Accordingly, the management server 201 enables rapid resource increase, and may reduce power consumption by reducing the number of ICT resources to be powered on and prepared in advance.

Exemplary Embodiment 2

Next, exemplary embodiment 2 of the management server 201 will be described. In exemplary embodiment 2, description will be given for a case in which backup containers for backup are classified such that, among the backup containers for backup, the backup containers corresponding to the containers whose degree of margin in processing performance is equal to or less than a threshold value are not in the same group.

Hereinafter, an example of operation according to exemplary embodiment 2 will be described. However, services to be deployed are the same as those in exemplary embodiment 1 (see FIG. 11). Since the service deployment and resource increase according to exemplary embodiment 2 are similar to those in exemplary embodiment 1, illustration and description thereof will be omitted. An example of operation performed when backup containers are prepared according to exemplary embodiment 2 will be described.

First, the load monitoring unit 506 monitors the load of containers related to provision of services A and B, and records the current load in service configuration information 2500 such as that illustrated in FIG. 25.

FIG. 25 is an explanatory diagram illustrating a specific example of the service configuration information 2500. In FIG. 25, the service configuration information 2500 indicates a container configuration related to provision of services A and B and current load. Current load indicates the load of containers in each stage related to provision of services A and B.

The second calculation unit 505 calculates a backup container configuration related to provision of services A and B based on the service configuration information 2500 illustrated in FIG. 25. For example, the second calculation unit 505 determines to generate backup containers A1$b$ and A2$c$ having the same performance as that of containers A1$a$ and A2$a$ that execute apps A1 and A2 in the stages of service A.

The second calculation unit 505 determines to generate backup containers B1$b$ and B2$b$ having the same performance as that of containers B1$a$ and B2$a$ that execute apps B1 and B2 in the stages of service B. For example, the backup container configuration is stored in container management information 2600 such as that illustrated in FIG. 26.

Figure 26:
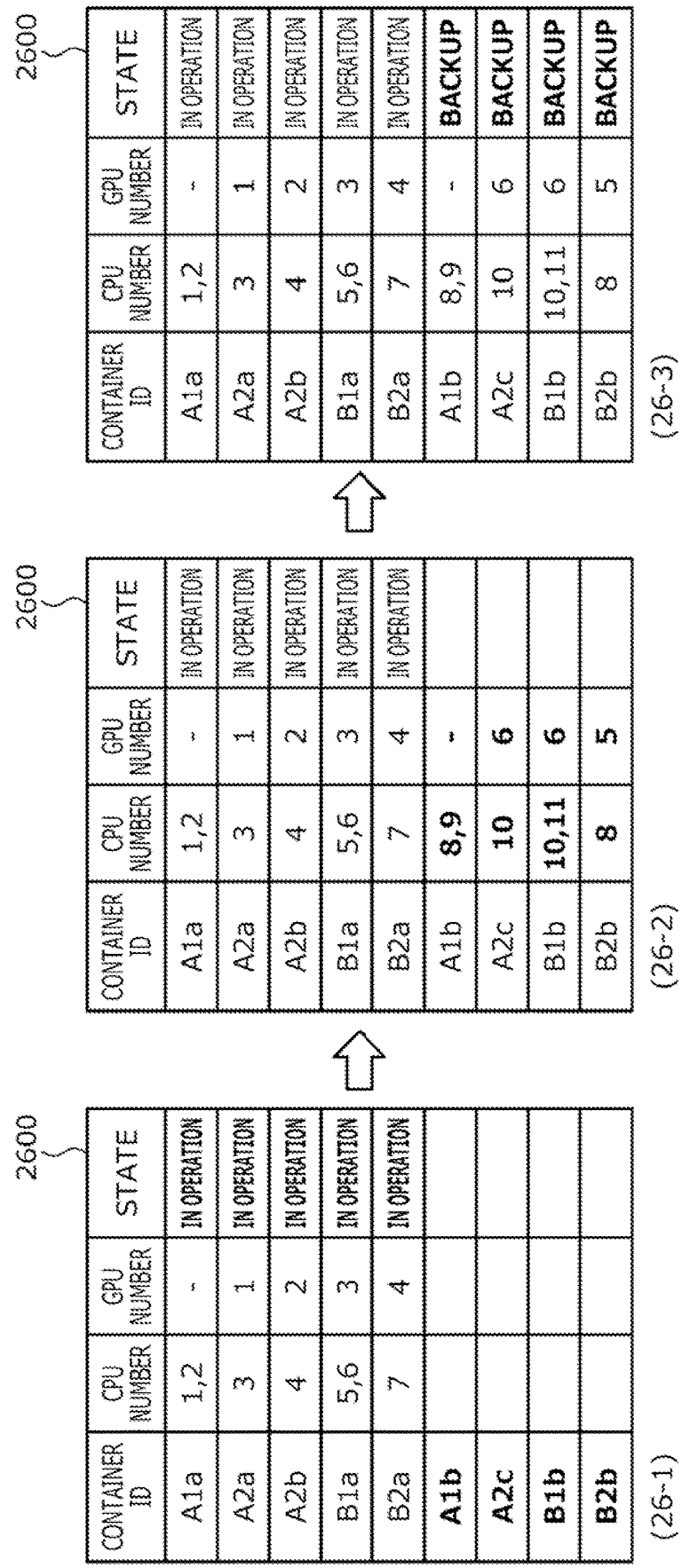
FIG. 26 is an explanatory diagram illustrating an example of changes in the contents stored in container management information.

FIG. 26 is an explanatory diagram illustrating an example of changes in the contents stored in the container management information 2600. In FIG. 26, the container management information 2600 indicates resource allocation results and operation states of containers related to provision of services A and B. In the container management information 2600 illustrated in (26-1), backup containers A1$b$, A2$c$, B1$b$, and B2$b$ are added.

Next, the second calculation unit 505 classifies backup containers A1$b$, A2$c$, B1$b$, and B2$b$ based on the service configuration information 2500 such that, among backup containers A1$b$, A2$c$, B1$b$, and B2$b$, the backup containers corresponding to the containers whose degree of margin in processing performance is equal to or less than a threshold value are not in the same group.

An example of classification of backup containers A1$b$, A2$c$, B1$b$, and B2$b$ will be described with reference to FIG. 27A and FIG. 27B.

Figure 27A:
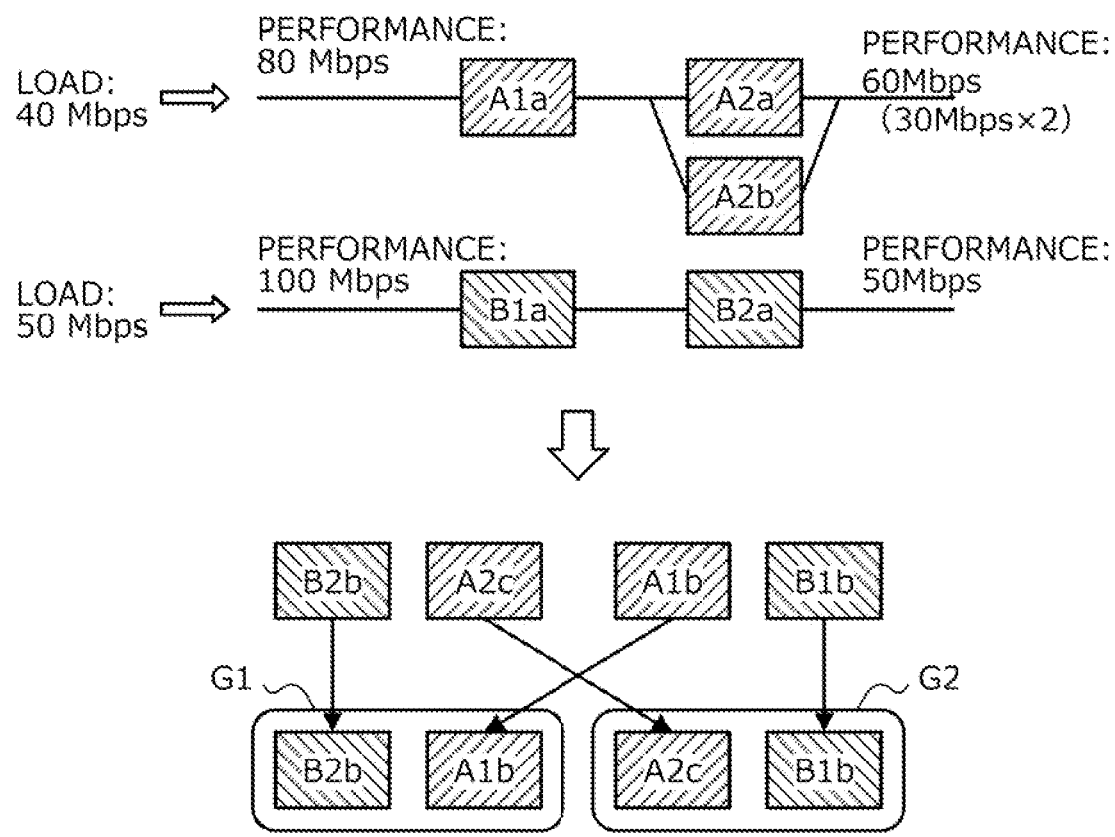
FIG. 27A is an explanatory diagram illustrating a second example of classification of backup containers (part 1)
Figure 27B:
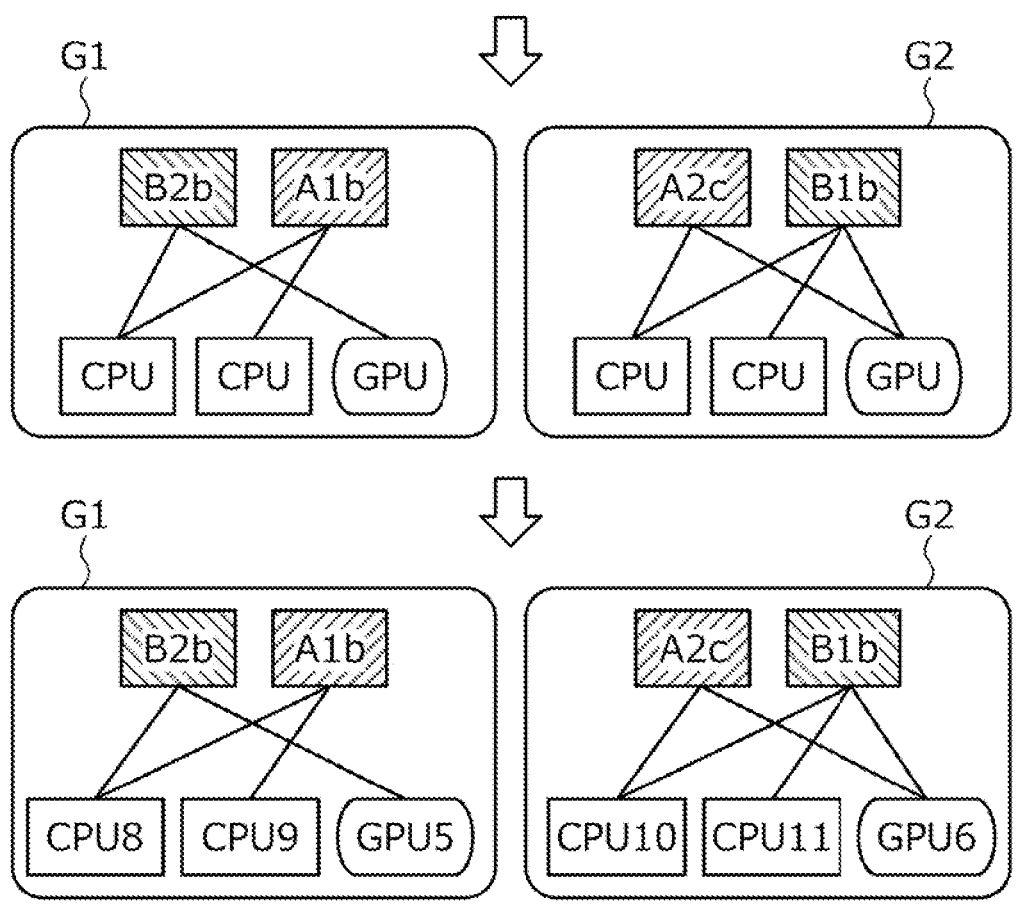
FIG. 27B is an explanatory diagram illustrating a second example of classification of backup containers (part 2)

FIG. 27A and FIG. 27B are explanatory diagrams illustrating a second example of classification of backup containers. In FIG. 27A, containers A1$a$, A2$a$, A2$b$, B1$a$, and B2$a$ are containers related to provision of services A and B. Backup containers A1$b$, A2$c$, B1$b$, and B2$b$ are containers for backup related to provision of services A and B.

First, for example, the second calculation unit 505 calculates a degree of margin in processing performance of containers A1$a$, A2$a$, A2$b$, B1$a$, and B2$a$ for each stage of services A and B. The second calculation unit 505 rearranges backup containers A1$b$, A2$c$, B1$b$, and B2$b$ in ascending order of the calculated degree of margin.

In the first stage of service A, the current load is "40 Mbps" while the processing performance of container A1$a$ is "80 Mbps". For this reason, the degree of margin in processing performance of container A1$a$ in the first stage is "40 Mbps". In the second stage of service A, the current load is "40 Mbps" while the processing performance of containers A2$a$ and A2$b$ is "60 Mbps (=30 Mbps×2)". For this reason, the degree of margin in processing performance of containers A2$a$ and A2$b$ in the second stage is "20 Mbps".

In the first stage of service B, the current load is "50 Mbps" while the processing performance of container B1$a$ is "100 Mbps". For this reason, the degree of margin in processing performance of container B1$a$ in the first stage is "50 Mbps". In the second stage of service B, the current load is "50 Mbps" while the processing performance of container B2$a$ is "50 Mbps". For this reason, the degree of margin in processing performance of container B2$a$ in the second stage is "0 Mbps".

In this case, when rearranged in ascending order of the degree of margin in processing performance of the stages corresponding to backup containers A1$b$, A2$c$, B1$b$, and B2$b$, the order is backup container B2$b$, A2$c$, A1$b$, B1$b$. The second calculation unit 505 sequentially groups the rearranged backup containers B2$b$, A2$c$, A1$b$, and B1$b$ such that the backup containers whose degree of margin in processing performance is equal to or less than a threshold value are not in the same group.

The threshold value is "30 Mbps". In this case, the backup containers whose degree of margin in processing performance is equal to or less than the threshold value are backup containers B2$b$ and A2$c$.

First, the second calculation unit 505 classifies backup container B2$b$ into group G1. Next, the second calculation unit 505 classifies backup container A2$c$ into group G2 different from the group to which backup container B2$b$ belongs. Next, the second calculation unit 505 classifies backup container A1$b$ into group G1. The second calculation unit 505 classifies backup container B1$b$ into group G2.

Accordingly, the second calculation unit 505 may group backup containers A1$b$, A2$c$, B1$b$, and B2$b$ such that the backup containers whose degree of margin in processing performance is equal to or less than the threshold value are not in the same group.

Next, the second calculation unit 505 allocates resources to the backup containers in groups G1 and G2 in an overlapping manner such that the resources are shared between the classified backup containers in groups G1 and G2. For example, first, the second calculation unit 505 calculates an amount of resources that have to be used in each of groups G1 and G2 from the amount of resources (resources that have to be used) to be allocated to the backup containers in groups G1 and G2.

Resources that have to be used for backup container B2$b$ in group G1 are "CPU: 1, GPU: 1". Resources that have to be used for backup container A1$b$ in group G1 are "CPU: 2". For this reason, in a case where resources are shared between the backup containers in group G1, the amount of resources that have to be used in group G1 is "CPU: 2, GPU: 1" (see FIG. 27B).

Resources that have to be used for backup container A2$c$ in group G2 are "CPU: 1, GPU: 1". Resources that have to be used for backup container B1$b$ in group G2 are "CPU: 2, GPU: 1". For this reason, in a case where resources are shared between the backup containers in group G2, the amount of resources that have to be used in group G2 is "CPU: 2, GPU: 1" (see FIG. 27B).

Next, the second calculation unit 505 determines the resources to be allocated to groups G1 and G2 based on the amount of resources that have to be used in each of groups G1 and G2. For example, the second calculation unit 505 allocates, to groups G1 and G2, free resources corresponding to the amount of resources that have to be used. CPU 8, CPU 9, and GPU 5 are allocated to group G1. CPU 10, CPU 11, and GPU 6 are allocated to group G2.

The second calculation unit 505 allocates the resources to the backup containers in groups G1 and G2 in an overlapping manner such that the resources are shared between the backup containers in groups G1 and G2.

CPU 8 and GPU 5 are allocated to backup container B2b in group G1 (see FIG. 27B). CPU 8 and CPU 9 are allocated to backup container A1b in group G1 (see FIG. 27B). CPU 8 is allocated to backup containers A1b and B2b in an overlapping manner.

CPU 10 and GPU 6 are allocated to backup container A2c in group G2 (see FIG. 27B). CPU 10, CPU 11, and GPU 6 are allocated to backup container B1b in group G2 (see FIG. 27B). CPU 10 and GPU 6 are allocated to backup containers A2c and B1b in an overlapping manner.

As a result, as illustrated in (26-2) of FIG. 26, CPU numbers and GPU numbers of the resources allocated to each of backup containers A1b, A2c, B1b, and B2b are added to the container management information 2600.

Next, the power management unit 503 powers on the resources allocated to backup containers A1b, A2c, B1b, and B2b. The deployment unit 504 deploys backup containers A1b, A2c, B1b, and B2b related to provision of services A and B. As a result, as illustrated in (26-3) of FIG. 26, "backup" is set as the state of backup containers A1b, A2c, B1b, and B2b in the container management information 2600.

Description will be given with reference to FIG. 28 for the use state of resources allocated to containers (including backup containers) related to provision of services A and B.

Figure 28:
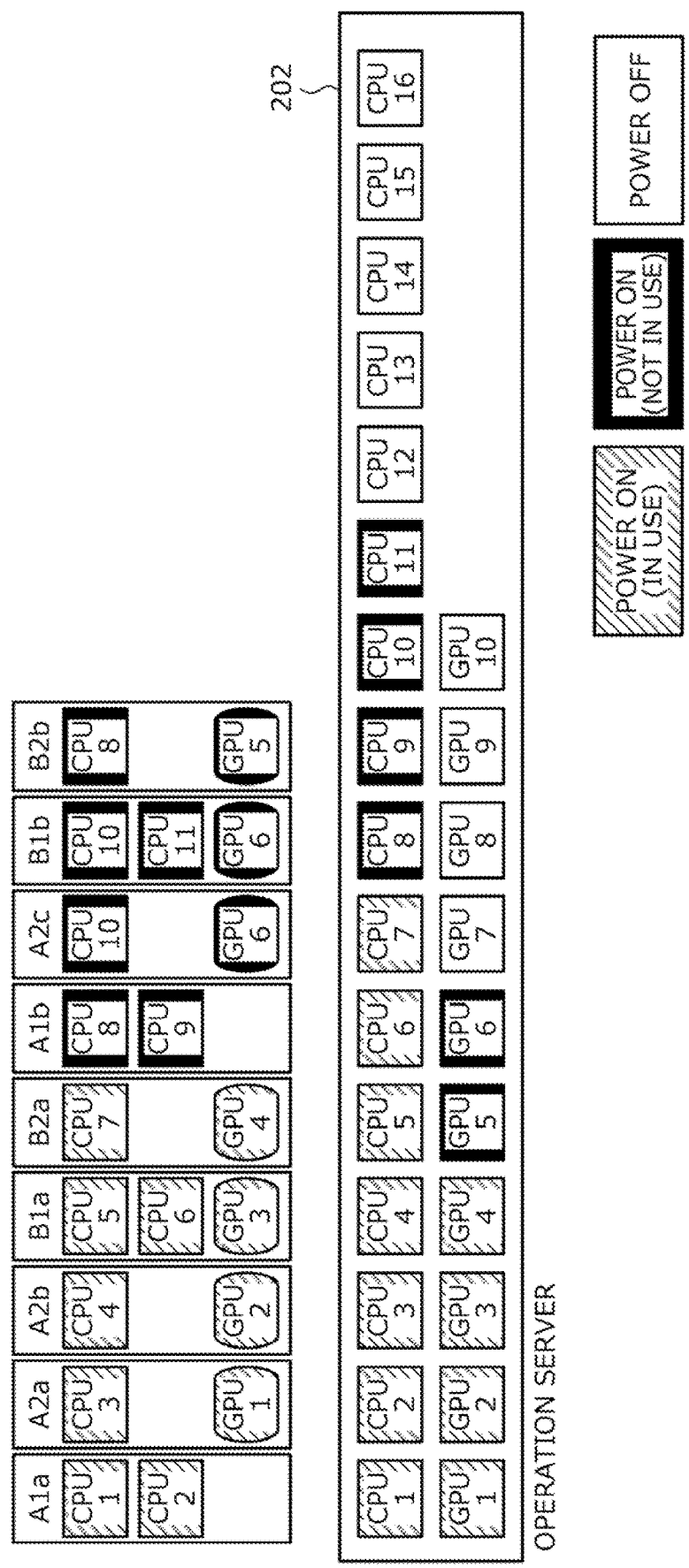
FIG. 28 is an explanatory diagram illustrating the use state of resources according to exemplary embodiment 2.

FIG. 28 is an explanatory diagram illustrating the use state of resources according to exemplary embodiment 2. In FIG. 28, CPU 1 to CPU 16 and GPU 1 to GPU 10 in the operation server 202 represent resources that may be allocated to containers (including backup containers). In FIG. 28, the operation server 202 represents one or more operation servers 202.

In the example illustrated in FIG. 28, the use state of the resources allocated to containers A1a to B2a is "power ON (in use)". The use state of the resources allocated to backup containers A1b to B2b is "power ON (not in use)". The use state of resources other than the resources allocated to containers A1a to B2a and backup containers A1b to B2b is "power OFF".

(Resource Management Processing Procedure of Management Server 201)

Next, description will be given for a specific processing procedure of resource management processing of the management server 201 according to exemplary embodiment 2. However, the processing procedure is similar to the specific processing procedure of resource management processing of the management server 201 according to exemplary embodiment 1, except for the first grouping processing in step S2202 illustrated in FIG. 22. For this reason, only a specific processing procedure of second grouping processing executed instead of the first grouping processing in step S2202 will be described.

Figure 29:
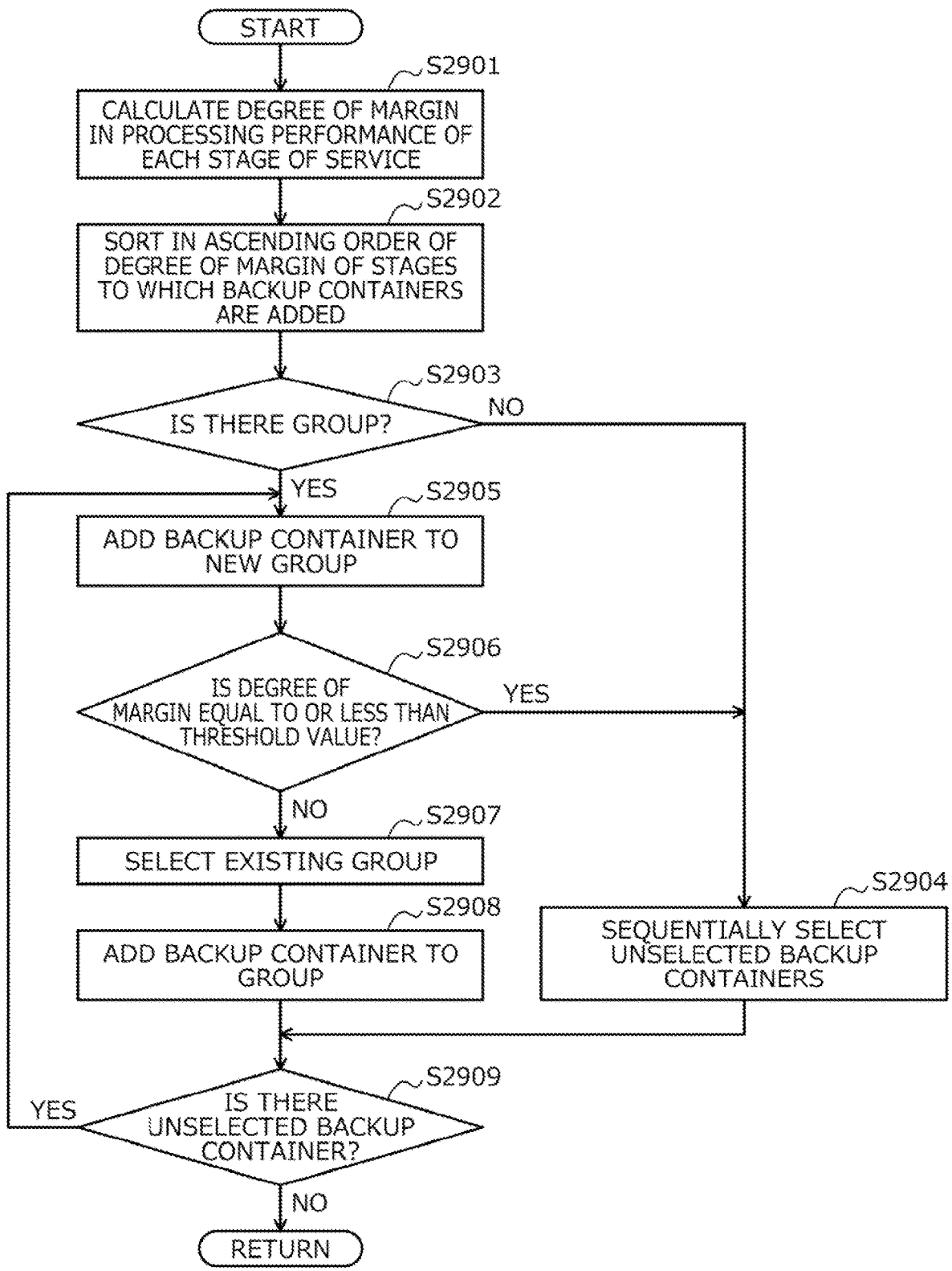
FIG. 29 is a flowchart illustrating an example of a specific processing procedure of second grouping processing.

FIG. 29 is a flowchart illustrating an example of the specific processing procedure of the second grouping processing. In the flowchart of FIG. 29, first, the management server 201 calculates a degree of margin in processing performance of each stage of a service (step S2901). Next, the management server 201 sorts backup containers for backup in ascending order of the degree of margin in processing performance of the stages to which the backup containers are added (step S2902).

Next, the management server 201 determines whether there is a group (step S2903). When there is no group (step S2903: No), the management server 201 selects the first backup container, adds the backup container to a new group (step S2904), and proceeds to step S2909.

When there is a group in step S2903 (step S2903: Yes), the management server 201 sequentially selects unselected backup containers that are not selected among the sorted backup containers (step S2905). Next, the management server 201 determines whether the degree of margin in processing performance of the selected backup container is equal to or less than a threshold value (step S2906).

When the degree of margin in processing performance is equal to or less than the threshold value (step S2906: Yes), the management server 201 proceeds to step S2904. On the other hand, when the degree of margin in processing performance is more than the threshold value (step S2906: No), the management server 201 selects an existing group (step S2907).

The management server 201 adds the selected backup container to the selected group (step S2908). Next, the management server 201 determines whether there is an unselected backup container that is not selected among the sorted backup containers (step S2909). When there is an unselected backup container (step S2909: Yes), the management server 201 returns to step S2905. On the other hand, when there is no unselected backup container (step S2909: No), the management server 201 returns to the step in which the second grouping processing is invoked.

Accordingly, the management server 201 may group backup containers such that the backup containers corresponding to the stages (containers) whose degree of margin in processing performance is equal to or less than a threshold value are not in the same group.

As described above, with the management server 201 according to exemplary embodiment 2, grouping may be performed such that the backup containers for stages with a small margin in the processing performance in the current service configuration are in different groups. Accordingly, the management server 201 enables rapid resource increase, and may reduce power consumption by reducing the number of ICT resources to be powered on and prepared in advance.

Exemplary Embodiment 3

Next, exemplary embodiment 3 of the management server 201 will be described. In exemplary embodiment 3, description will be given for a case in which backup containers for backup are classified such that, among the backup containers for backup, the backup containers corresponding to the containers related to provision of services with the same demand tendency are not in the same group.

Hereinafter, an example of operation according to exemplary embodiment 3 will be described. However, since the service deployment and resource increase according to exemplary embodiment 3 are similar to those in exemplary embodiment 1, illustration and description thereof will be omitted. An example of operation performed when backup containers are prepared according to exemplary embodiment 3 will be described.

In exemplary embodiment 3, services to be deployed are "services A, B, and C". Service configuration information indicating a container configuration related to provision of services A, B, and C will be described with reference to FIG. 30.

FIG. 30 is an explanatory diagram illustrating a specific example of service configuration information 3000. In FIG. 30, the service configuration information 3000 indicates a container configuration and demand tendency related to provision of services A, B, and C. The service configuration information 3000 indicates that, in providing service A, one container A1a that executes app A1 in the first stage and two containers A2a and A1b that execute app A2 in the second stage have to be used. The service configuration information 3000 indicates that the demand tendency of service A is "nighttime type".

The service configuration information 3000 indicates that, in providing service B, one container B1a that executes app B1 in the first stage and one container B2a that executes app B2 in the second stage have to be used. The service configuration information 3000 indicates that the demand tendency of service B is "daytime type".

The service configuration information 3000 indicates that, in providing service C, one container C1a that executes app C1 in the first stage and one container C2a that executes app C2 in the second stage have to be used. The service configuration information 3000 indicates that the demand tendency of service C is "nighttime type".

Next, a specific example of app performance and resource information will be described with reference to FIG. 31.

FIG. 31 is an explanatory diagram illustrating a specific example of app performance and resource information (part 2). In FIG. 31, app performance and resource information 3100 indicates the correspondence between app, performance, and resources that have to be used (CPUs and GPUs). For example, the app performance and resource information 3100 indicates that the performance of app C1 is "100 Mbps" and resources that have to be used for app C1 are "CPU: 1, GPU: 0".

Hereinafter, an example of operation according to exemplary embodiment 3 will be described.

The second calculation unit 505 calculates a backup container configuration related to provision of services A, B, and C based on the service configuration information 3000 illustrated in FIG. 30. For example, the second calculation unit 505 determines to generate backup containers A1b and A2c having the same performance as that of containers A1a and A2a that execute apps A1 and A2 in the stages of service A. A case is assumed in which one backup container is secured for an app in each stage.

The second calculation unit 505 determines to generate backup containers B1b and B2b having the same performance as that of containers B1a and B2a that execute apps B1 and B2 in the stages of service B. The second calculation unit 505 determines to generate backup containers C1b and C2b having the same performance as that of containers C1a and C2a that execute apps C1 and C2 in the stages of service C. For example, the backup container configuration is stored in container management information 3200 such as that illustrated in FIG. 32.

Figure 32:
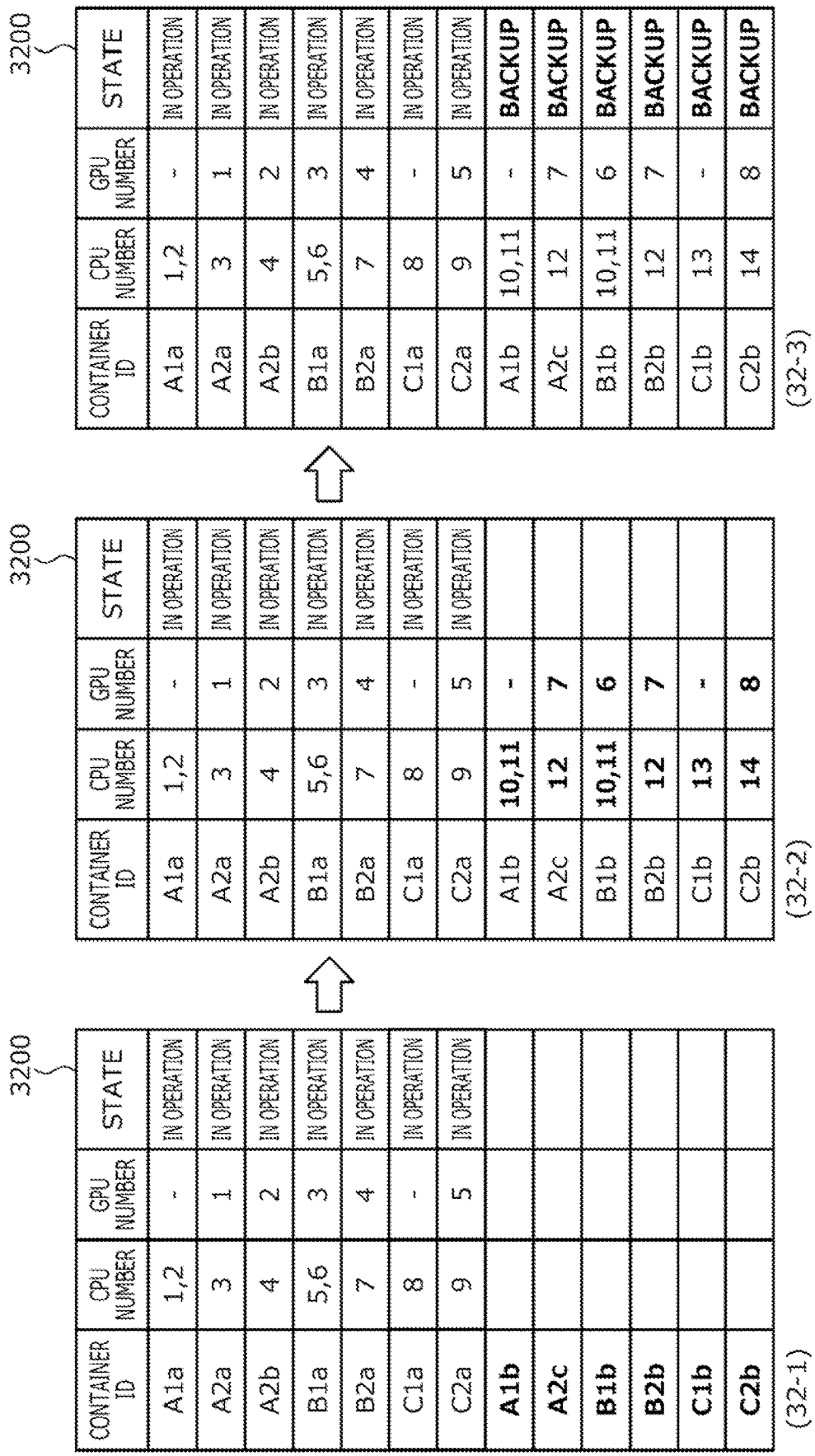
FIG. 32 is an explanatory diagram illustrating an example of changes in the contents stored in container management information.

FIG. 32 is an explanatory diagram illustrating an example of changes in the contents stored in the container management information 3200. In FIG. 32, the container management information 3200 indicates resource allocation results and operation states of containers related to provision of services A, B, and C. In the container management information 3200 illustrated in (32-1), backup containers A1b, A2c, B1b, B2b, C1b, and C2b are added.

Next, the second calculation unit 505 classifies backup containers A1b, A2c, B1b, B2b, C1b, and C2b based on the service configuration information 3000 such that, among backup containers A1b, A2c, B1b, B2b, C1b, and C2b, the backup containers corresponding to the containers related to provision of services with the same demand tendency are not in the same group.

An example of classification of backup containers A1b, A2c, B1b, B2b, C1b, and C2b will be described with reference to FIG. 33.

Figure 33:
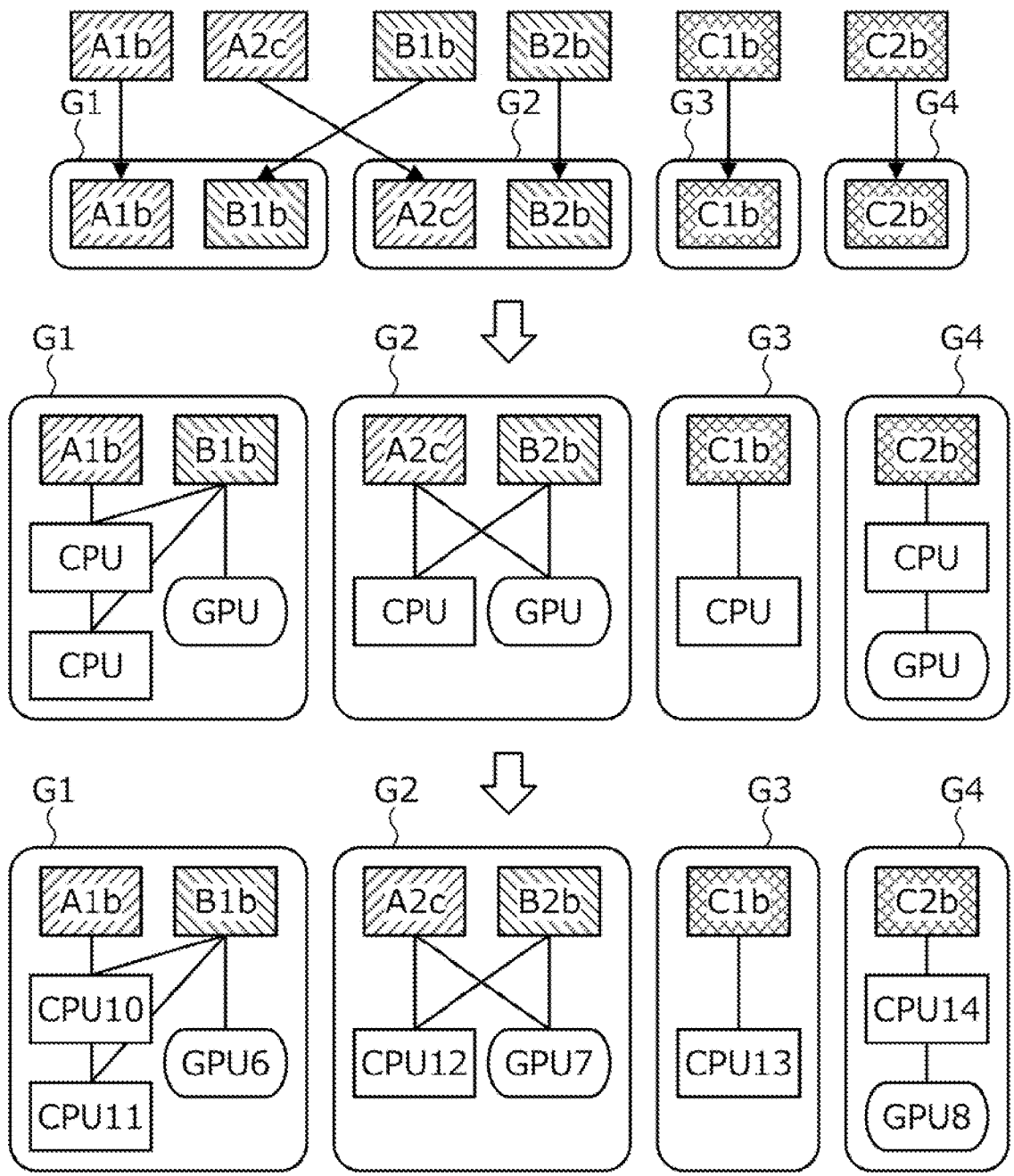
FIG. 33 is an explanatory diagram illustrating a third example of classification of backup containers.

FIG. 33 is an explanatory diagram illustrating a third example of classification of backup containers. In FIG. 33, backup containers A1b, A2c, B1b, B2b, C1b, and C2b are containers for backup related to provision of services A, B, and C.

First, the second calculation unit 505 sequentially groups backup containers A1b, A2c, B1b, B2b, C1b, and C2b based on the service configuration information 3000 such that the backup containers for services with the same demand tendency are not in the same group.

For example, the second calculation unit 505 classifies backup container A1b into group G1. Next, the demand tendency of backup container A2c is the same as that of backup container A1b. For this reason, the second calculation unit 505 classifies backup container A2c into group G2 different from the group to which backup container A1b belongs.

Next, the demand tendency of backup container B1b is different from that of backup container A1b. For this reason, the second calculation unit 505 classifies backup container B1b into group G1 to which backup container A1b belongs. Next, the demand tendency of backup container B2b is the same as that of backup container B1b. For this reason, the second calculation unit 505 classifies backup container B2b into group G2 different from the group to which backup container B1b belongs.

Next, the demand tendency of backup container C1b is the same as those of backup containers A1b and A2c. For this reason, the second calculation unit 505 classifies backup container C1b into group G3 different from the groups to which backup containers A1b and A2c belong. Next, the demand tendency of backup container C2b is the same as those of backup containers A1b, A2c, and C1b. For this reason, the second calculation unit 505 classifies backup container C2b into group G4 different from the groups to which backup containers A1b, A2c, and C1b belong.

Accordingly, the second calculation unit 505 may group backup containers A1b, A2c, B1b, B2b, C1b, and C2b such that the backup containers for services with the same demand tendency are not in the same group.

Next, the second calculation unit 505 allocates resources to the backup containers in groups G1 to G4 in an overlapping manner such that the resources are shared between the classified backup containers in groups G1 to G4. For example, first, the second calculation unit 505 calculates an amount of resources that have to be used in each of groups G1 to G4 from the amount of resources (resources that have to be used) to be allocated to the backup containers in groups G1 to G4.

Resources that have to be used for backup container A1b in group G1 are "CPU: 2". Resources that have to be used for backup container B1b in group G1 are "CPU: 2, GPU: 1". For this reason, in a case where resources are shared between the backup containers in group G1, the amount of resources that have to be used in group G1 is "CPU: 2, GPU: 1" (see FIG. 33).

Resources that have to be used for backup container A2c in group G2 are "CPU: 1, GPU: 1". Resources that have to be used for backup container B2b in group G2 are "CPU: 1, GPU: 1". For this reason, in a case where resources are shared between the backup containers in group G2, the amount of resources that have to be used in group G2 is "CPU: 1, GPU: 1" (see FIG. 33).

A resource that has to be used for backup container C1b in group G3 is "CPU: 1". For this reason, the amount of resources that have to be used in group G3 is "CPU: 1" (see FIG. 33). Resources that have to be used for backup container C2b in group G4 are "CPU: 1, GPU: 1". For this reason, the amount of resources that have to be used in group G4 is "CPU: 1, GPU: 1" (see FIG. 33).

Next, the second calculation unit 505 determines the resources to be allocated to groups G1 to G4 based on the amount of resources that have to be used in each of groups G1 to G4. For example, the second calculation unit 505 allocates, to groups G1 to G4, free resources corresponding to the amount of resources that have to be used. CPU 10, CPU 11, and GPU 6 are allocated to group G1. CPU 12 and GPU 7 are allocated to group G2. CPU 13 is allocated to group G3. CPU 14 and GPU 8 are allocated to group G4.

The second calculation unit 505 allocates the resources to the backup containers in groups G1 to G4 in an overlapping manner such that the resources are shared between the backup containers in groups G1 to G4.

CPU 10 and CPU 11 are allocated to backup container A1b in group G1 (see FIG. 33). CPU 10, CPU 11, and GPU 6 are allocated to backup container B1b in group G1 (see FIG. 33). CPU 10 and CPU 11 are allocated to backup containers A1b and B1b in an overlapping manner.

CPU 12 and GPU 7 are allocated to backup container A2c in group G2 (see FIG. 33). CPU 12 and GPU 7 are allocated to backup container B2b in group G2 (see FIG. 33). CPU 12 and GPU 7 are allocated to backup containers A2c and B2b in an overlapping manner.

CPU 13 is allocated to backup container C1b in group G3 (see FIG. 33). CPU 14 and GPU 8 are allocated to backup container C2b in group G4 (see FIG. 33).

As a result, as illustrated in (32-2) of FIG. 32, CPU numbers and GPU numbers of the resources allocated to each of backup containers A1b, A2c, B1b, B2b, C1b, and C2b are added to the container management information 3200.

Next, the power management unit 503 powers on the resources allocated to backup containers A1b, A2c, B1b, B2b, C1b, and C2b. The deployment unit 504 deploys backup containers A1b, A2c, B1b, B2b, C1b, and C2b related to provision of services A, B, and C. As a result, as illustrated in (32-3) of FIG. 32, "backup" is set as the state of backup containers A1b, A2c, B1b, B2b, C1b, and C2b in the container management information 3200.

Description will be given with reference to FIG. 34 for the use state of resources allocated to containers (including backup containers) related to provision of services A, B, and C.

Figure 34:
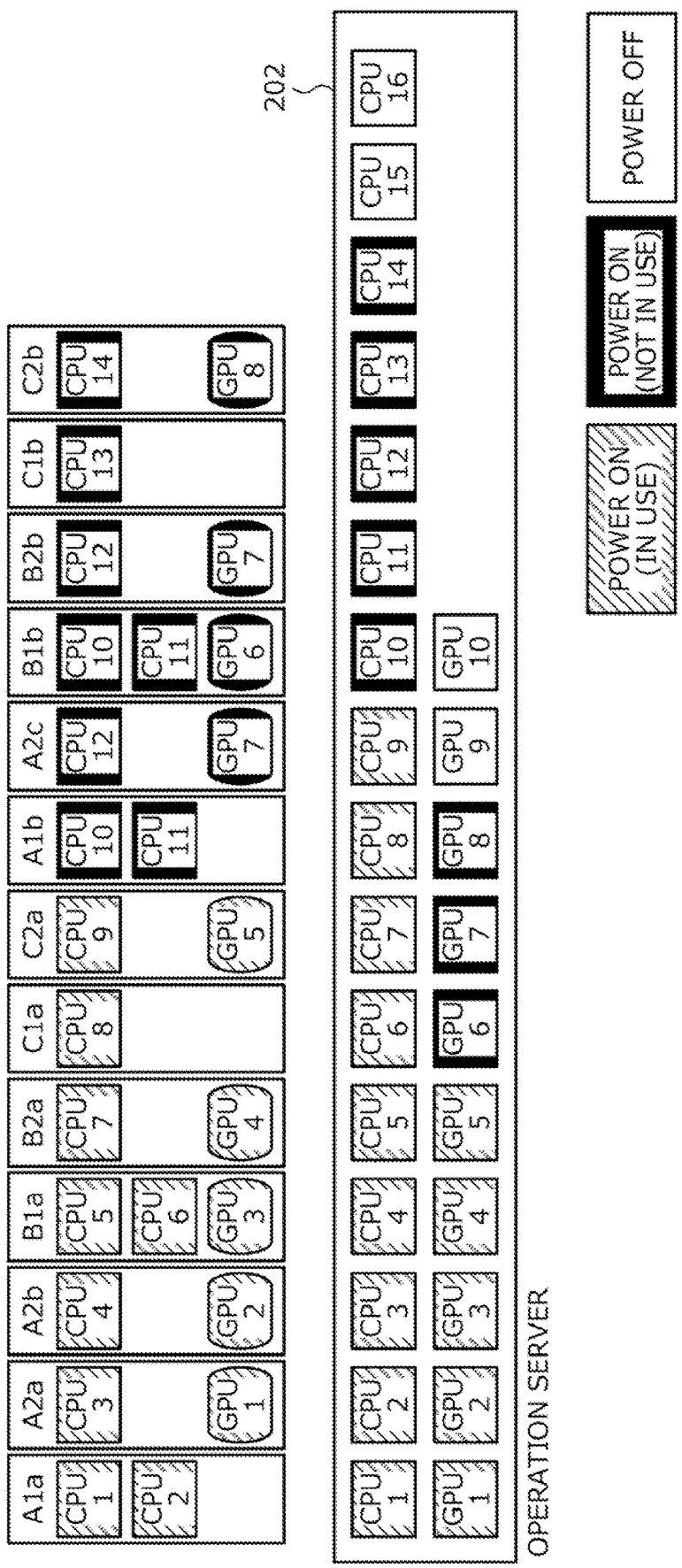
FIG. 34 is an explanatory diagram illustrating the use state of resources according to exemplary embodiment 3.

FIG. 34 is an explanatory diagram illustrating the use state of resources according to exemplary embodiment 3. In FIG. 34, CPU 1 to CPU 16 and GPU 1 to GPU 10 in the operation server 202 represent resources that may be allocated to containers (including backup containers). In FIG. 34, the operation server 202 represents one or more operation servers 202.

In the example illustrated in FIG. 34, the use state of the resources allocated to containers A1a to C2a is "power ON (in use)". The use state of the resources allocated to backup containers A1b to C2b is "power ON (not in use)". The use state of resources other than the resources allocated to containers A1a to C2a and backup containers A1b to C2b is "power OFF".

(Resource Management Processing Procedure of Management Server 201)

Next, description will be given for a specific processing procedure of resource management processing of the management server 201 according to exemplary embodiment 3. However, the processing procedure is similar to the specific processing procedure of resource management processing of the management server 201 according to exemplary embodiment 1, except for the first grouping processing in step S2202 illustrated in FIG. 22. For this reason, only a specific processing procedure of third grouping processing executed instead of the first grouping processing in step S2202 will be described.

Figure 35:
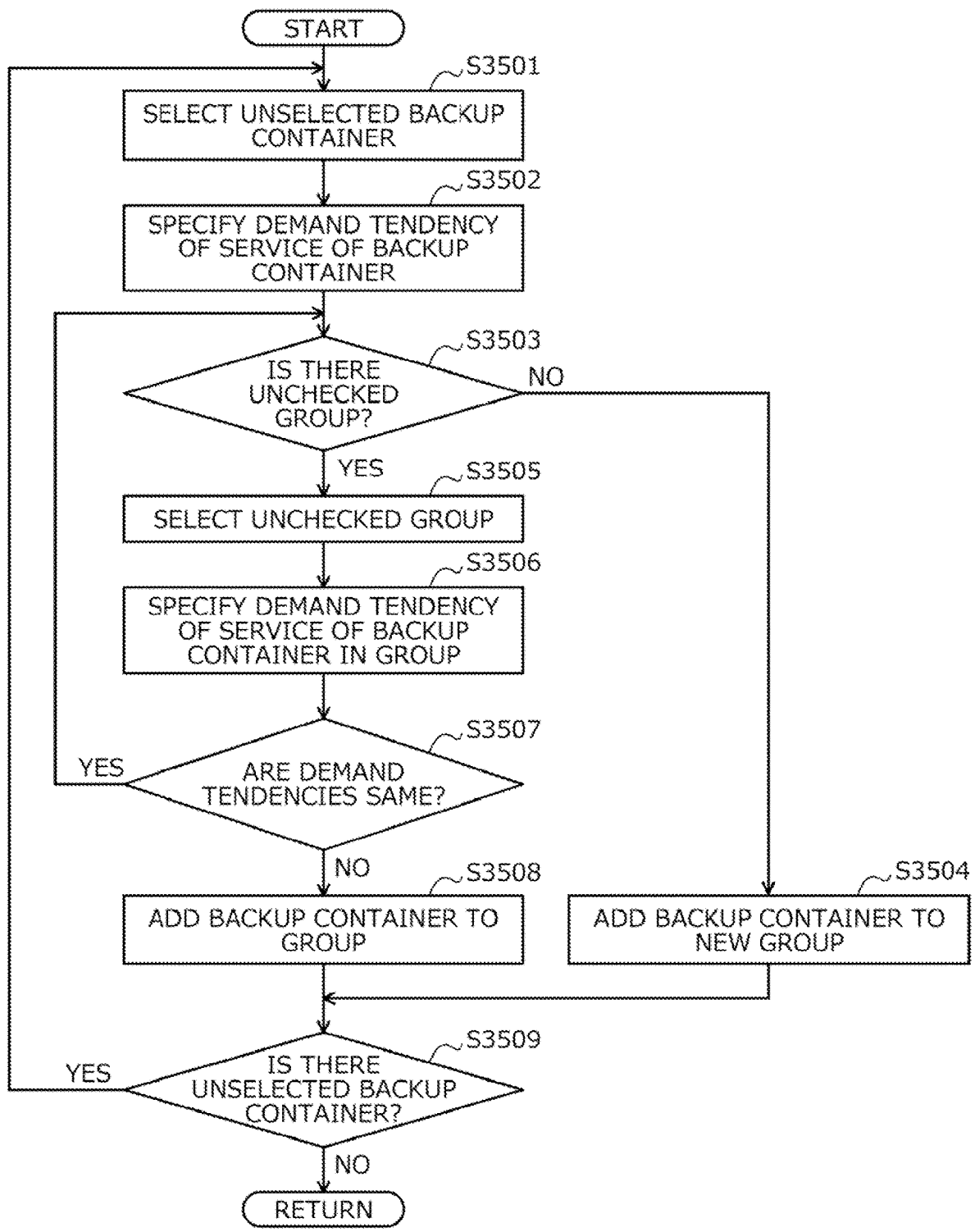
FIG. 35 is a flowchart illustrating an example of a specific processing procedure of third grouping processing.

FIG. 35 is a flowchart illustrating an example of the specific processing procedure of the third grouping processing. In the flowchart of FIG. first, the management server 201 selects an unselected backup container that is not selected among backup containers for backup (step S3501). Next, the management server 201 specifies the demand tendency of the service of the selected backup container based on service configuration information (step S3502).

The management server 201 determines whether there is an unchecked group (step S3503). When there is no unchecked group (step S3503: No), the management server 201 adds the selected backup container to a new group (step S3504), and proceeds to step S3509.

On the other hand, when there is an unchecked group (step S3503: Yes), the management server 201 selects the unchecked group (step S3505). Next, the management server 201 specifies the demand tendency of the service of a backup container in the group (step S3506). The management server 201 determines whether the specified demand tendency of the service is the same as the demand tendency specified in step S3502 (step S3507).

When the demand tendencies are the same (step S3507: Yes), the management server 201 returns to step S3503. On the other hand, when the demand tendencies are different from each other (step S3507: No), the management server 201 adds the selected backup container to the selected group (step S3508).

The management server 201 determines whether there is an unselected backup container that is not selected among backup containers for backup (step S3509). When there is an unselected backup container (step S3509: Yes), the management server 201 returns to step S3501. On the other hand, when there is no unselected backup container (step S3509: No), the management server 201 returns to the step in which the third grouping processing is invoked.

Accordingly, the management server 201 may group backup containers such that the backup containers of services with the same demand tendency are not in the same group.

As described above, with the management server 201 according to exemplary embodiment 3, grouping may be performed such that the backup containers of services with similar contents or demand tendencies are in different groups. Accordingly, the management server 201 enables rapid resource increase, and may reduce power consumption by reducing the number of ICT resources to be powered on and prepared in advance.

Exemplary Embodiment 4

Next, exemplary embodiment 4 of the management server 201 will be described. In exemplary embodiment 4, description will be given for a case in which backup containers for backup are classified such that the amount of resources to be allocated to the backup containers for backup does not exceed an upper limit and that, among the backup containers for backup, the backup containers used at the same timing are not in the same group.

Hereinafter, an example of operation according to exemplary embodiment 4 will be described. However, the container configuration related to provision of services to be deployed is the same as that in exemplary embodiment 3 (see FIG. 30). Since the service deployment and resource increase according to exemplary embodiment 4 are similar to those in exemplary embodiment 1, illustration and description thereof will be omitted. An example of operation performed when backup containers are prepared according to exemplary embodiment 4 will be described.

First, resource upper limit information will be described with reference to FIG. 36.

Figure 36:
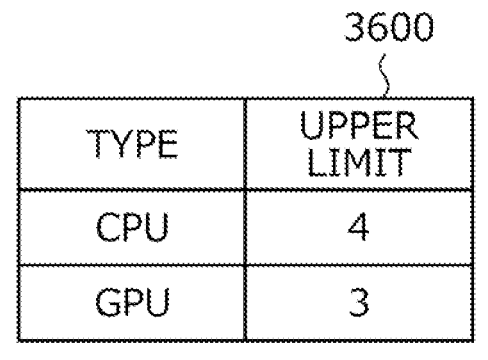

FIG. 36 is an explanatory diagram illustrating a specific example of resource upper limit information 3600. In FIG. 36, the resource upper limit information 3600 is information representing an upper limit of the amount of resources that may be allocated to backup containers for backup. The upper limit of the number of CPUs that may be allocated to backup containers for backup is four and the upper limit of the number of GPUs that may be allocated to backup containers for backup is three.

Hereinafter, an example of operation according to exemplary embodiment 4 will be described.

The second calculation unit 505 calculates a backup container configuration related to provision of services A, B, and C based on the service configuration information 3000 illustrated in FIG. 30. For example, the second calculation unit 505 determines to generate backup containers A1$b$ and A2$c$ having the same performance as that of containers A1$a$ and A2$a$ that execute apps A1 and A2 in the stages of service A.

The second calculation unit 505 determines to generate backup containers B1$b$ and B2$b$ having the same performance as that of containers B1$a$ and B2$a$ that execute apps B1 and B2 in the stages of service B. The second calculation unit 505 determines to generate backup containers C1$b$ and C2$b$ having the same performance as that of containers C1$a$ and C2$a$ that execute apps C1 and C2 in the stages of service C. For example, the backup container configuration is stored in container management information 3700 such as that illustrated in FIG. 37.

FIG. 37 is an explanatory diagram illustrating an example of changes in the contents stored in the container management information 3700. In FIG. 37, the container management information 3700 indicates resource allocation results and operation states of containers related to provision of services A, B, and C. In the container management information 3700 illustrated in (37-1), backup containers A1$b$, A2$c$, B1$b$, B2$b$, C1$b$, and C2$b$ are added.

Next, the second calculation unit 505 classifies backup containers A1$b$, A2$c$, B1$b$, B2$b$, C1$b$, and C2$b$ based on the resource upper limit information 3600 and the service configuration information 3000. For example, the second calculation unit 505 classifies backup containers A1$b$ to C2$b$ such that the amount of resources to be allocated to backup containers A1$b$ to C2$b$ does not exceed the upper limit and that, among backup containers A1$b$ to C2$b$, the backup containers corresponding to the containers related to provision of services with the same demand tendency are not in the same group.

An example of classification of backup containers A1$b$, A2$c$, B1$b$, B2$b$, C1$b$, and C2$b$ will be described with reference to FIG. 38.

Figure 38:
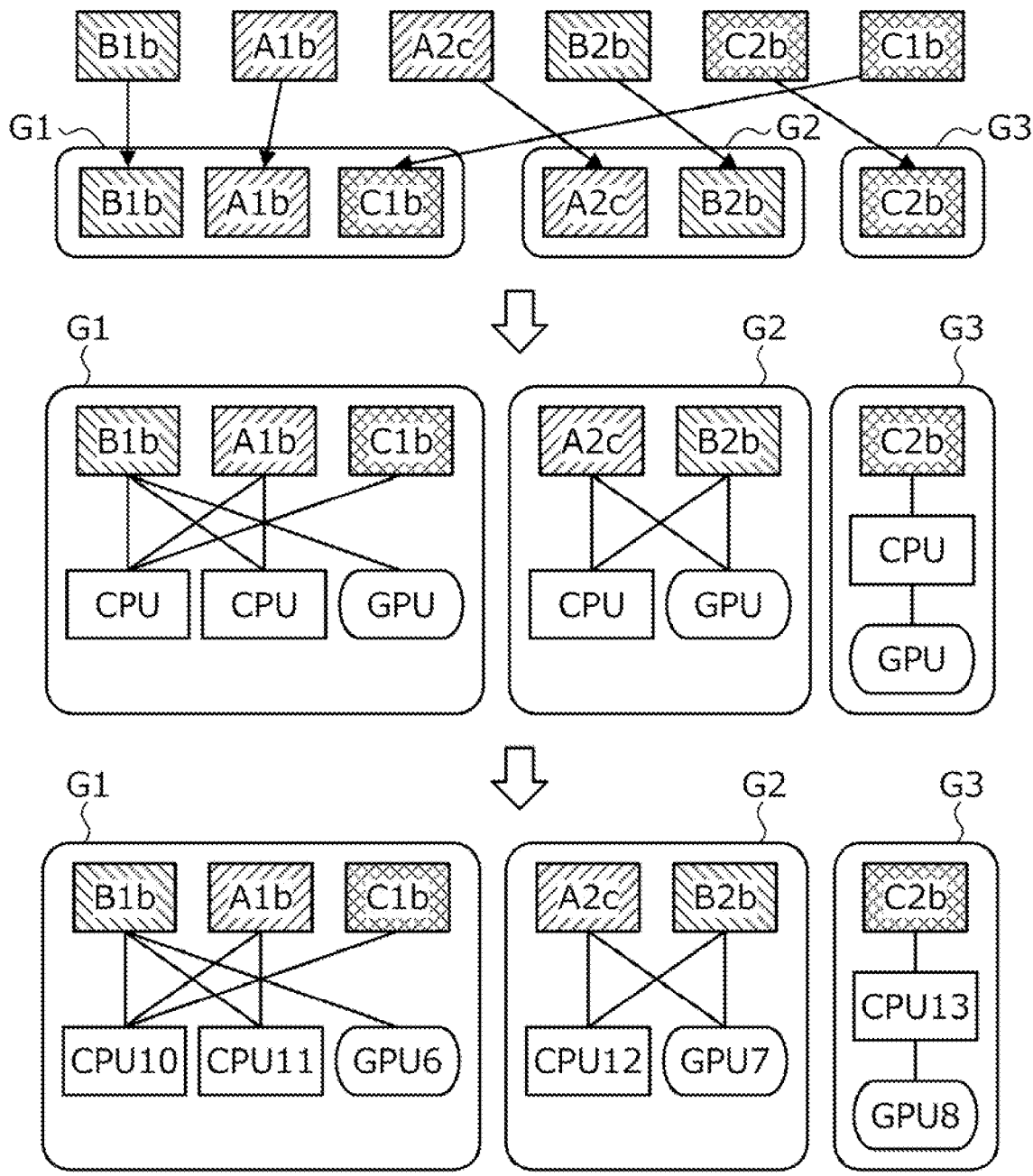
FIG. 38 is an explanatory diagram illustrating a fourth example of classification of backup containers.

FIG. 38 is an explanatory diagram illustrating a fourth example of classification of backup containers. In FIG. 38, backup containers A1$b$, A2$c$, B1$b$, B2$b$, C1$b$, and C2$b$ are containers for backup related to provision of services A, B, and C.

First, the second calculation unit 505 sorts backup containers A1$b$ to C2$b$ in descending order of the amount of resources that have to be used, based on the app performance and resource information 3100 illustrated in FIG. 31. For example, an amount of resources that have to be used is represented by the number of resources. In this case, a total of three resources have to be used for backup container B1$b$. A total of two resources have to be used for backup containers A1$b$, A2$c$, B2$b$, and C2$b$. A total of one resource has to be used for backup container C1$b$.

Next, the second calculation unit 505 sequentially groups the sorted backup containers B1$b$, A1$b$, A2$c$, B2$b$, C2$b$, and C1$b$ based on the service configuration information 3000 illustrated in FIG. 30 such that the backup containers for services with the same demand tendency are not in the same group within a range in which the amount of resources does not exceed the upper limit.

For example, the second calculation unit 505 classifies backup container B1$b$ into group G1. The total amount of resources at this point is "CPU: 2, GPU: 1". Next, the demand tendency of backup container A1$b$ is different from that of backup container B1$b$. Even after allocation of resources to backup container A1$b$ and backup container B1$b$ in an overlapping manner, the total amount of resources does not change. For this reason, the second calculation unit 505 classifies backup container A1$b$ into group G1 to which backup container B1$b$ belongs. The total amount of resources at this point is "CPU: 2, GPU: 1".

Next, the demand tendency of backup container A2$c$ is the same as that of backup container A1$b$. Even after allocation of resources to backup container A2$c$ without overlap, the total amount of resources does not exceed the upper limit. For this reason, the second calculation unit 505 classifies backup container A2$c$ into group G2 different from the group to which backup container A1$b$ belongs. The total amount of resources at this point is "CPU: 3, GPU: 2".

Next, the demand tendency of backup container B2$b$ is the same as that of backup container B1$b$. Even after allocation of resources to backup container B2$b$ and backup container A2$c$ in group G2 in an overlapping manner, the total amount of resources does not change. For this reason, the second calculation unit 505 classifies backup container B2$b$ into group G2 different from the group to which backup container B1$b$ belongs.

Next, the demand tendency of backup container C2$b$ is the same as those of backup containers A1$b$ and A2$c$. Even after allocation of resources to backup container C2$b$ without overlap, the total amount of resources does not exceed the upper limit. For this reason, the second calculation unit 505 classifies backup container C2$b$ into group G3 different from the groups to which backup containers A1$b$ and A2$c$ belong. The total amount of resources at this point is "CPU: 4, GPU: 3".

Next, the demand tendency of backup container C1$b$ is the same as those of backup containers A1$b$, A2$c$, and C2$b$. On the other hand, when resources are allocated to backup container C1*b* without overlap, the total amount of resources exceeds the upper limit. For this reason, the second calculation unit 505 classifies backup container C1*b* into group G1. Although the demand tendency of backup container C1*b* is the same as that of backup container A1*b* in group G1, a new group is not created since the amount of resources that have to be used exceeds the upper limit.

The second calculation unit 505 may allocate backup container C1*b* to group G2. For example, the second calculation unit 505 may determine the group (existing group G1 or G2) to which backup container C1*b* is to be allocated such that the maximum number of containers in groups G1 and G2 does not increase.

Accordingly, the second calculation unit 505 may group backup containers A1*b*, A2*c*, B1*b*, B2*b*, C1*b*, and C2*b* such that the backup containers for services with the same demand tendency are not in the same group within a range in which the amount of resources does not exceed the upper limit.

Next, the second calculation unit 505 allocates resources to the backup containers in groups G1 to G3 in an overlapping manner such that the resources are shared between the classified backup containers in groups G1 to G3. For example, first, the second calculation unit 505 calculates an amount of resources that have to be used in each of groups G1 to G3 from the amount of resources (resources that have to be used) to be allocated to the backup containers in groups G1 to G3.

Resources that have to be used for backup container B1*b* in group G1 are "CPU: 2, GPU: 1". Resources that have to be used for backup container A1*b* in group G1 are "CPU: 2". A resource that has to be used for backup container C1*b* in group G1 is "CPU: 1". For this reason, in a case where resources are shared between the backup containers in group G1, the amount of resources that have to be used in group G1 is "CPU: 2, GPU: 1" (see FIG. 38).

Resources that have to be used for backup container A2*c* in group G2 are "CPU: 1, GPU: 1". Resources that have to be used for backup container B2*b* in group G2 are "CPU: 1, GPU: 1". For this reason, in a case where resources are shared between the backup containers in group G2, the amount of resources that have to be used in group G2 is "CPU: 1, GPU: 1" (see FIG. 38).

Resources that have to be used for backup container C2*b* in group G3 are "CPU: 1, GPU: 1". For this reason, the amount of resources that have to be used in group G3 is "CPU: 1, GPU: 1" (see FIG. 38).

Next, the second calculation unit 505 determines the resources to be allocated to groups G1 to G3 based on the amount of resources that have to be used in each of groups G1 to G3. For example, the second calculation unit 505 allocates, to groups G1 to G3, free resources corresponding to the amount of resources that have to be used. CPU 10, CPU 11, and GPU 6 are allocated to group G1. CPU 12 and GPU 7 are allocated to group G2. CPU 13 and GPU 8 are allocated to group G3.

The second calculation unit 505 allocates the resources to the backup containers in groups G1 to G3 in an overlapping manner such that the resources are shared between the backup containers in groups G1 to G3.

CPU 10, CPU 11, and GPU 6 are allocated to backup container B1*b* in group G1 (see FIG. 38). CPU 10 and CPU 11 are allocated to backup container A1*b* in group G1 (see FIG. 38). CPU 10 is allocated to backup container C1*b* in group G1 (see FIG. 38). CPU 10 is allocated to backup containers A1*b*, B1*b*, and C1*b* in an overlapping manner. CPU 11 is allocated to backup containers A1*b* and B1*b* in an overlapping manner.

CPU 12 and GPU 7 are allocated to backup container A2*c* in group G2 (see FIG. 38). CPU 12 and GPU 7 are allocated to backup container B2*b* in group G2 (see FIG. 38). CPU 12 and GPU 7 are allocated to backup containers A2*c* and B2*b* in an overlapping manner.

CPU 13 and GPU 8 are allocated to backup container C2*b* in group G3 (see FIG. 38).

As a result, as illustrated in (37-2) of FIG. 37, CPU numbers and GPU numbers of the resources allocated to each of backup containers A1*b*, A2*c*, B1*b*, B2*b*, C1*b*, and C2*b* are added to the container management information 3700.

Next, the power management unit 503 powers on the resources allocated to backup containers A1*b*, A2*c*, B1*b*, B2*b*, C1*b*, and C2*b*. The deployment unit 504 deploys backup containers A1*b*, A2*c*, B1*b*, B2*b*, C1*b*, and C2*b* related to provision of services A, B, and C. As a result, as illustrated in (37-3) of FIG. 37, "backup" is set as the state of backup containers A1*b*, A2*c*, B1*b*, B2*b*, C1*b*, and C2*b* in the container management information 3700.

Description will be given with reference to FIG. 39 for the use state of resources allocated to containers (including backup containers) related to provision of services A, B, and C.

Figure 39:
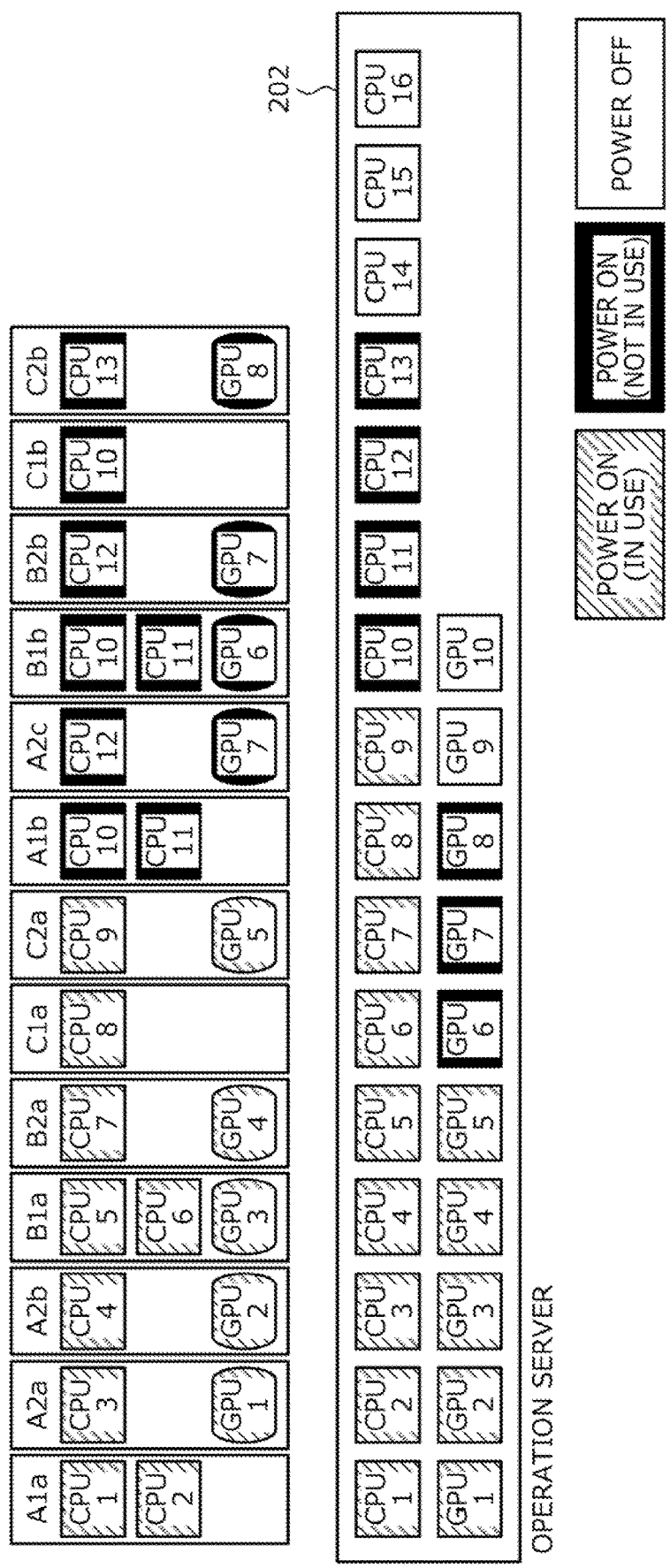
FIG. 39 is an explanatory diagram illustrating the use state of resources according to exemplary embodiment 4.

FIG. 39 is an explanatory diagram illustrating the use state of resources according to exemplary embodiment 4. In FIG. 39, CPU 1 to CPU 16 and GPU 1 to GPU 10 in the operation server 202 represent resources that may be allocated to containers (including backup containers). In FIG. 39, the operation server 202 represents one or more operation servers 202.

In the example illustrated in FIG. 39, the use state of the resources allocated to containers A1*a* to C2*a* is "power ON (in use)". The use state of the resources allocated to backup containers A1*b* to C2*b* is "power ON (not in use)". The use state of resources other than the resources allocated to containers A1*a* to C2*a* and backup containers A1*b* to C2*b* is "power OFF".

(Resource Management Processing Procedure of Management Server 201)

Next, description will be given for a specific processing procedure of resource management processing of the management server 201 according to exemplary embodiment 4. However, the processing procedure is similar to the specific processing procedure of resource management processing of the management server 201 according to exemplary embodiment 1, except for the first grouping processing in step S2202 illustrated in FIG. 22. For this reason, only a specific processing procedure of fourth grouping processing executed instead of the first grouping processing in step S2202 will be described.

Figure 40:
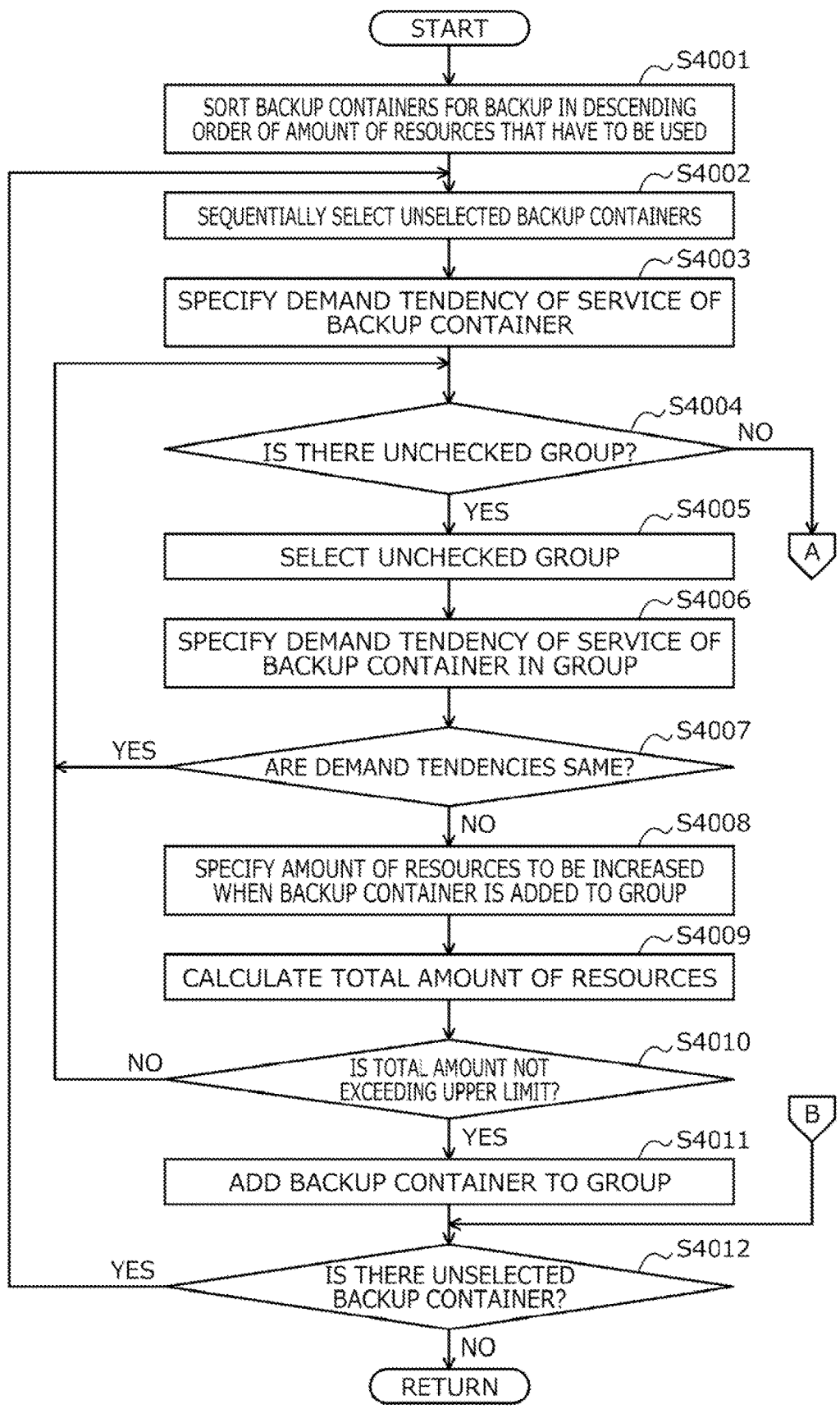
FIG. 40 is a flowchart illustrating an example of a specific processing procedure of fourth grouping processing (part 1)
Figure 41:
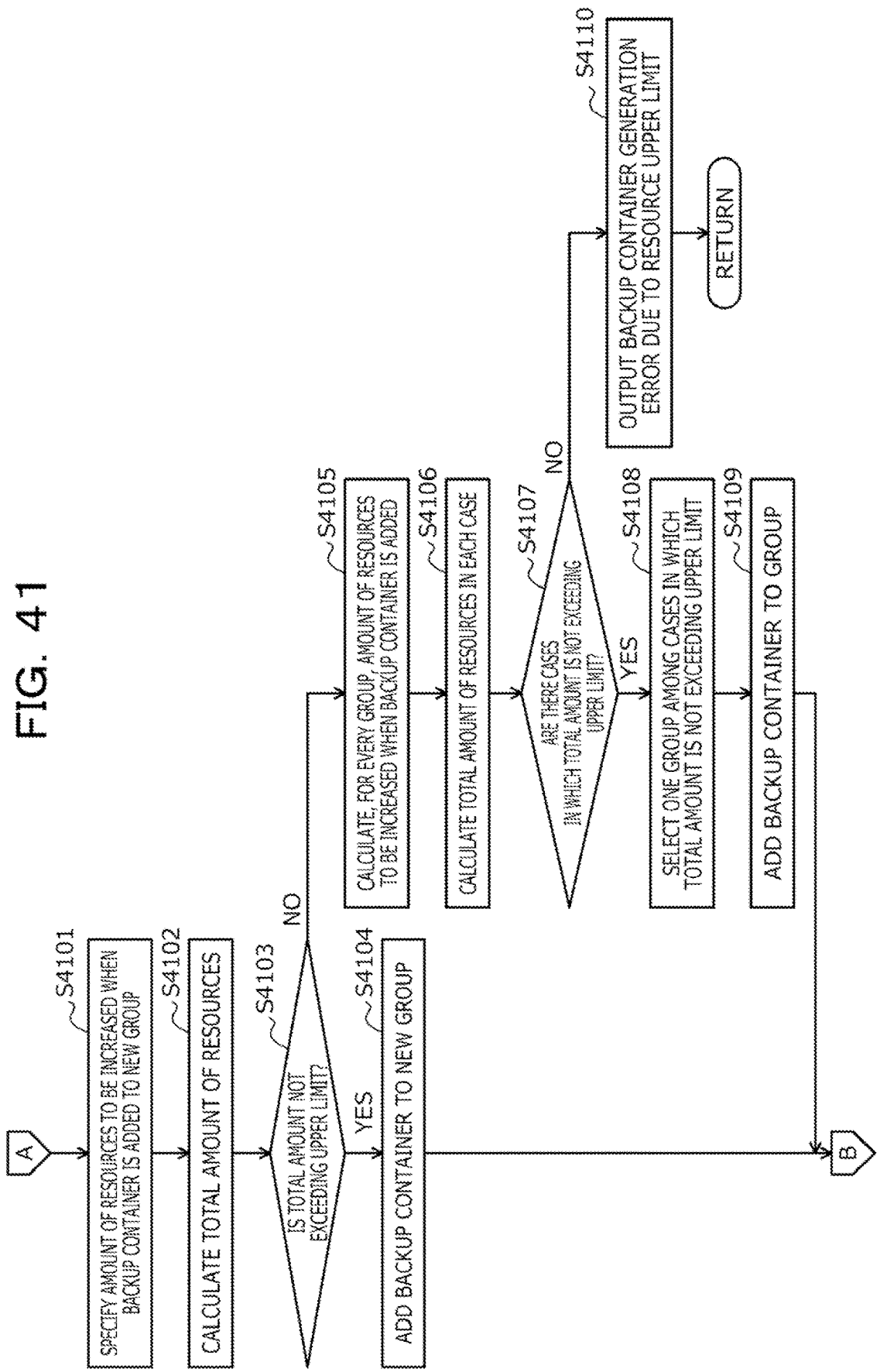
FIG. 41 is a flowchart illustrating an example of a specific processing procedure of fourth grouping processing (part 2).

FIG. 40 and FIG. 41 are flowcharts illustrating an example of the specific processing procedure of the fourth grouping processing. In the flowchart of FIG. 40, first, the management server 201 sorts backup containers for backup in descending order of the amount of resources that have to be used (step S4001). Next, the management server 201 sequentially selects unselected backup containers among the sorted backup containers (step S4002).

The management server 201 specifies the demand tendency of the service of the selected backup container based on service configuration information (step S4003). Next, the management server 201 determines whether there is an unchecked group (step S4004). When there is an unchecked group (step S4004: Yes), the management server 201 selects the unchecked group (step S4005).

Next, the management server 201 specifies the demand tendency of the service of a backup container in the group (step S4006). The management server 201 determines whether the specified demand tendency of the service is the same as the demand tendency specified in step S4003 (step S4007).

When the demand tendencies are the same (step S4007: Yes), the management server 201 returns to step S4004. On the other hand, when the demand tendencies are different from each other (step S4007: No), the management server 201 specifies an amount of resources to be increased when the selected backup container is added to the selected group (step S4008).

The management server 201 calculates the total amount of resources by adding the calculated amount of resources to be increased to the current total amount of resources (step S4009). Next, the management server 201 refers to resource upper limit information and determines whether the calculated total amount of resources is not exceeding an upper limit (step S4010).

When the total amount is exceeding the upper limit (step S4010: No), the management server 201 returns to step S4004. On the other hand, when the total amount is not exceeding the upper limit (step S4010: Yes), the management server 201 adds the selected backup container to the selected group (step S4011).

The management server 201 determines whether there is an unselected backup container that is not selected among the sorted backup containers (step S4012). When there is an unselected backup container (step S4012: Yes), the management server 201 returns to step S4002. On the other hand, when there is no unselected backup container (step S4012: No), the management server 201 returns to the step in which the fourth grouping processing is invoked.

When there is no unchecked group in step S4004 (step S4004: No), the management server 201 proceeds to step S4101 illustrated in FIG. 41.

In the flowchart of FIG. 41, first, the management server 201 specifies an amount of resources to be increased when the selected backup container is added to a new group (step S4101). The management server 201 calculates the total amount of resources by adding the calculated amount of resources to be increased to the current total amount of resources (step S4102).

Next, the management server 201 refers to resource upper limit information and determines whether the calculated total amount of resources is not exceeding an upper limit (step S4103). When the total amount is not exceeding the upper limit (step S4103: Yes), the management server 201 adds the selected backup container to the new group (step S4104), and returns to step S4012 illustrated in FIG. 40.

On the other hand, when the total amount is exceeding the upper limit (step S4103: No), the management server 201 calculates, for every group, an amount of resources to be increased when the selected backup container is added (step S4105). The management server 201 calculates the total amount of resources in each case (step S4106).

Next, based on the calculated total amount of resources in each case, the management server 201 determines whether there are cases in which the total amount is not exceeding the upper limit (step S4107). When there are cases in which the total amount is not exceeding the upper limit (step S4107: Yes), the management server 201 selects any group among cases in which the total amount is not exceeding the upper limit (step S4108).

The management server 201 adds the selected backup container to the selected group (step S4109), and returns to step S4012 illustrated in FIG. 40. In step S4107, when there are no cases in which the total amount is not exceeding the upper limit (step S4107: No), the management server 201 outputs a backup container generation error due to the resource upper limit (step S4110), and returns to the step in which the fourth grouping processing is invoked. For example, the generation error is output to a client terminal used by a user who provides a service.

Accordingly, the management server 201 may group backup containers such that the backup containers of services with the same demand tendency are not in the same group within a range in which the amount of resources does not exceed the upper limit.

As described above, with the management server 201 according to exemplary embodiment 4, grouping may be performed such that the amount of resources to be allocated to backup containers does not exceed an upper limit and that the backup containers of services with similar contents or demand tendencies are in different groups. Accordingly, the management server 201 enables rapid resource increase, and may reduce power consumption by reducing the number of ICT resources to be powered on and prepared in advance. Exemplary embodiments 1 to 4 described above may be combined as long as there is no contradiction.

The resource management method described in the present embodiment may be realized by executing a program prepared in advance on a computer such as a personal computer or a workstation. The resource management program is recorded in a computer-readable recording medium such as a hard disk, a flexible disc, a CD-ROM, a DVD, or a USB memory, and is executed by being read by the computer from the recording medium. The resource management program may be distributed via a network such as the Internet.

The resource management device 101 (management server 201) described in the present embodiment may also be realized by an application-specific integrated circuit (ASIC) such as a standard cell or a structured ASIC, or a programmable logic device (PLD) such as an FPGA.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a resource management program for causing a computer to execute a process comprising:
    classifying backup processing devices for backup based on information representing a feature of each of a plurality of processing devices related to provision of one or more services such that, among the backup processing devices for backup that correspond to each of the plurality of processing devices, backup processing devices used at a same timing are not in a same group; and allocating resources to classified backup processing devices in a group in an overlapping manner such that resources are shared between the backup processing devices in a group, the information represents a demand tendency of a service that corresponds to each of the plurality of processing devices, and, in the classifying, the backup processing devices for backup are classified based on the information such that, among the backup processing devices for backup, backup processing devices that correspond to processing devices related to provision of a service with a same demand tendency are not in a same group.

2. The non-transitory computer-readable recording medium according to claim 1, wherein the information is information that represents provision of a service among the one or more services to which each of the plurality of processing devices relates, and, in the classifying, the backup processing devices for backup are classified based on the information such that, among the backup processing devices for backup, backup processing devices that correspond to processing devices related to provision of a same service are not in a same group.

3. The non-transitory computer-readable recording medium according to claim 1, wherein the information is information that represents a load state of each of the plurality of processing devices, and, in the classifying, the backup processing devices for backup are classified based on the information such that, among the backup processing devices for backup, backup processing devices that correspond to processing devices whose degree of margin in processing performance is equal to or less than a threshold value are not in a same group.

4. The non-transitory computer-readable recording medium according to claim 1, wherein, in the classifying, the backup processing devices for backup are classified based on the information and upper limit information that represents an upper limit of an amount of resources that are capable of being allocated to the backup processing devices for backup such that an amount of resources to be allocated to the backup processing devices for backup does not exceed the upper limit and that, among the backup processing devices for backup, backup processing devices used at a same timing are not in a same group.

5. The non-transitory computer-readable recording medium according to claim 1, wherein resources that are capable of being allocated to the backup processing devices for backup are powered off in an unallocated state, and the computer is caused to execute a process of powering on resources allocated to the backup processing devices in a group among resources that are capable of being allocated to the backup processing devices for backup.

6. The non-transitory computer-readable recording medium according to claim 5, wherein the computer is caused to execute a process of setting power of resources other than resources that have already been allocated, among resources that are capable of being allocated to the backup processing devices for backup, to a power saving mode.

7. The non-transitory computer-readable recording medium according to claim 1, wherein each of the plurality of processing devices is a container or a virtual machine, and the backup processing devices for backup are containers for backup or virtual machines.

8. The non-transitory computer-readable recording medium according to claim 1, wherein the resources include at least one of a CPU, a memory, a storage, or an accelerator.

9. A resource management method comprising:

classifying backup processing devices for backup based on information representing a feature of each of a plurality of processing devices related to provision of one or more services such that, among the backup processing devices for backup that correspond to each of the plurality of processing devices, backup processing devices used at a same timing are not in a same group; and allocating resources to classified backup processing devices in a group in an overlapping manner such that resources are shared between the backup processing devices in a group, the information represents a demand tendency of a service that corresponds to each of the plurality of processing devices, and, in the classifying, the backup processing devices for backup are classified based on the information such that, among the backup processing devices for backup, backup processing devices that correspond to processing devices related to provision of a service with a same demand tendency are not in a same group.

10. A resource management device comprising:

a memory; and a processor coupled to the memory and configured to:

classify backup processing devices for backup based on information representing a feature of each of a plurality of processing devices related to provision of one or more services such that, among the backup processing devices for backup that correspond to each of the plurality of processing devices, backup processing devices used at a same timing are not in a same group; and allocate resources to classified backup processing devices in a group in an overlapping manner such that resources are shared between the backup processing devices in a group, the information represents a demand tendency of a service that corresponds to each of the plurality of processing devices, and in the classify, the backup processing devices for backup are classified based on the information such that, among the backup processing devices for backup, backup processing devices that correspond to processing devices related to provision of a service with a same demand tendency are not in a same group.

* * * * *